(12) United States Patent
Eim et al.

(10) Patent No.: US 10,317,940 B2
(45) Date of Patent: Jun. 11, 2019

(54) WEARABLE SMART DEVICE AND CONTROL METHOD THEREFOR

(71) Applicant: LG Electronics Inc., Seoul (KR)

(72) Inventors: Sanghyun Eim, Seoul (KR); Jiyoung Park, Seoul (KR); Choonghwan Shin, Seoul (KR); Byunghwa Lee, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 15/568,939

(22) PCT Filed: Jan. 19, 2016

(86) PCT No.: PCT/KR2016/000530
§ 371 (c)(1),
(2) Date: Oct. 24, 2017

(87) PCT Pub. No.: WO2016/175429
PCT Pub. Date: Mar. 11, 2016

(65) Prior Publication Data
US 2018/0120891 A1    May 3, 2018

(30) Foreign Application Priority Data

Apr. 29, 2015 (KR) .......................... 10-2015-0060449
May 4, 2015 (KR) .......................... 10-2015-0062468

(51) Int. Cl.
*H05K 7/00* (2006.01)
*G06F 1/16* (2006.01)
(Continued)

(52) U.S. Cl.
CPC .......... *G06F 1/163* (2013.01); *H04M 1/0235* (2013.01); *H04M 1/72519* (2013.01); *H04M 1/027* (2013.01)

(58) Field of Classification Search
CPC ........................................................ G06F 1/16
See application file for complete search history.

(56) References Cited

U.S. PATENT DOCUMENTS

2012/0016793 A1    1/2012  Peters et al.
2012/0075196 A1    3/2012  Ashbrook et al.
(Continued)

FOREIGN PATENT DOCUMENTS

EP          2587345         5/2013
KR     10-2014-0122155     10/2014

OTHER PUBLICATIONS

International Search Report in International Application No. PCT/KR2016/000530, dated May 4, 2016, 41 pages (with English translation).
(Continued)

*Primary Examiner* — Jerry Wu
(74) *Attorney, Agent, or Firm* — Fish & Richardson P.C.

(57) ABSTRACT

A wearable smart device capable of providing both improved appearance and various functions to a user is disclosed. Disclosed are the wearable smart device and a control method therefor, the wearable smart device comprising: a first ring worn on a user's body; a first display unit arranged on the outer circumferential part of the first ring; and a second ring arranged on the outer circumferential part of the first ring and movably coupled to the first ring, wherein the second ring is configured to be selectively moved to a first position covering the first display unit or to a second position exposing the first display unit.

18 Claims, 46 Drawing Sheets

(51) Int. Cl.
*H04M 1/02* (2006.01)
*H04M 1/725* (2006.01)

(56) References Cited

U.S. PATENT DOCUMENTS

| | | |
|---|---|---|
| 2013/0105336 A1 | 5/2013 | Haight |
| 2013/0271495 A1 | 10/2013 | Nguyen et al. |
| 2015/0309535 A1* | 10/2015 | Connor .................. G06F 1/163 |
| | | 361/679.03 |

OTHER PUBLICATIONS

Dainis in Concept, "30 Futuristic Phones We Wish Were Real: NEC's 'Tag' Phone Concept," Nov. 2010, Hongkiat (HKDC), URL: https://www.hongkiat.com/blog/30-futuristic-phones-we-wish-were-real/. 1 page.
"Tuvie Design of the Future: Wearable X Torsion Cell Phone Concept," Dec. 2014, Tuvie, URL: http://www.tuvie.com/wearable-x-torsion-cell-phone-concept/. 1 page.
Yeon Su Kim, "Air Clicker," Nov. 8, 2011, Feel Desain, URL: http://www.feeldesain.com/air-clicker.html. 3 pages.
European Extended Search Report in European Application No. 16786616.9, dated Nov. 12, 2018, 15 pages.

* cited by examiner

FIG. 9
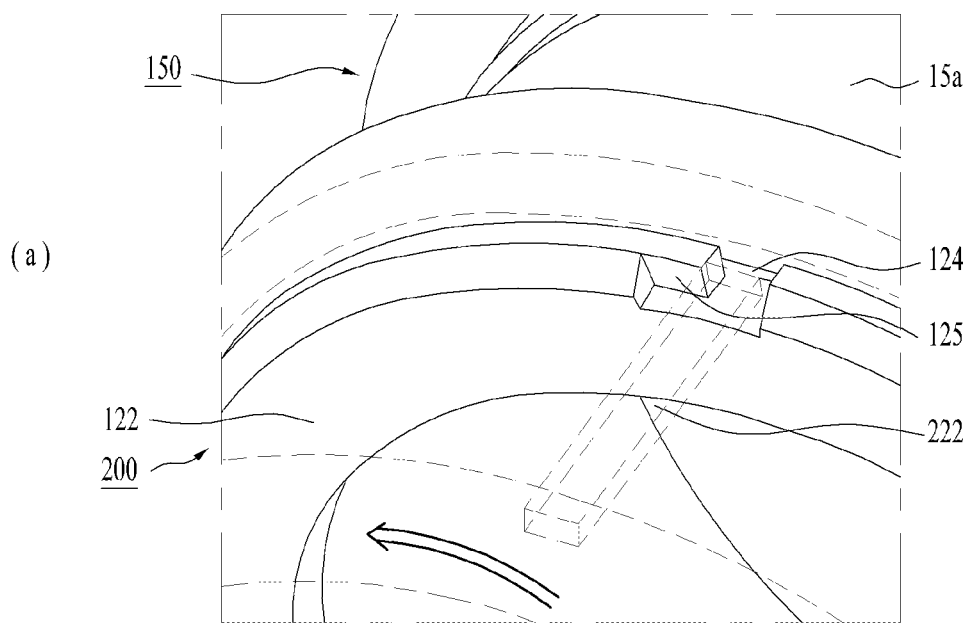
(a)
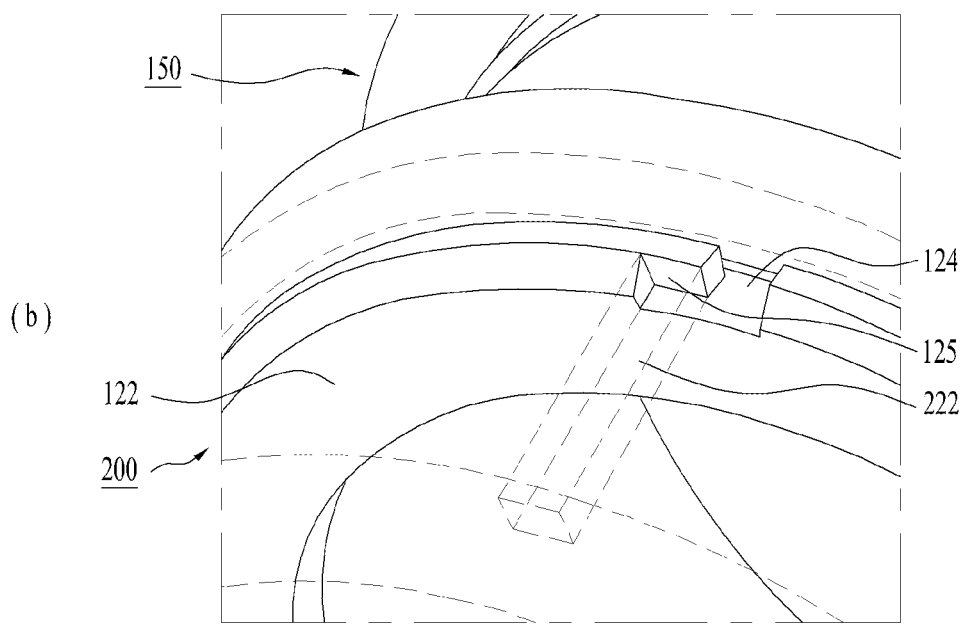
(b)

FIG. 24
(a)
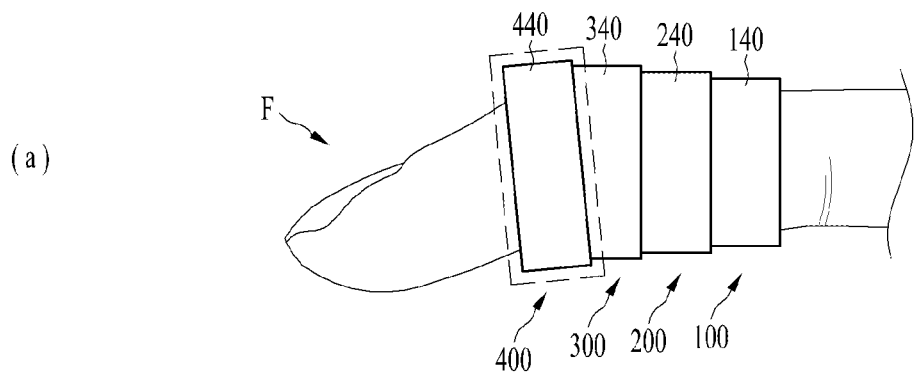
(b)
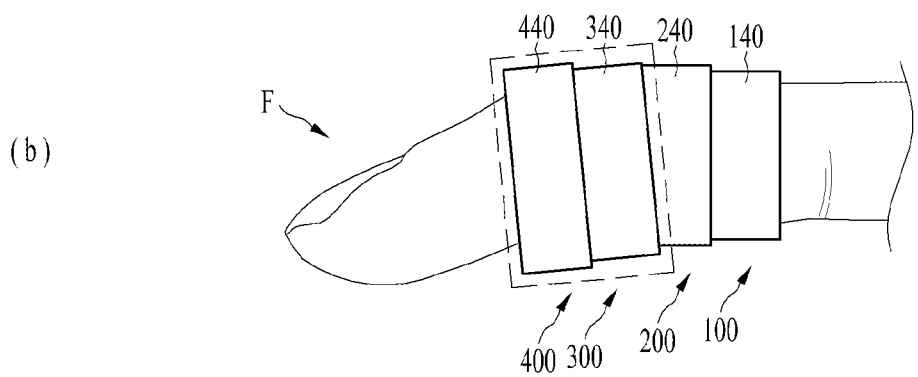
(c)
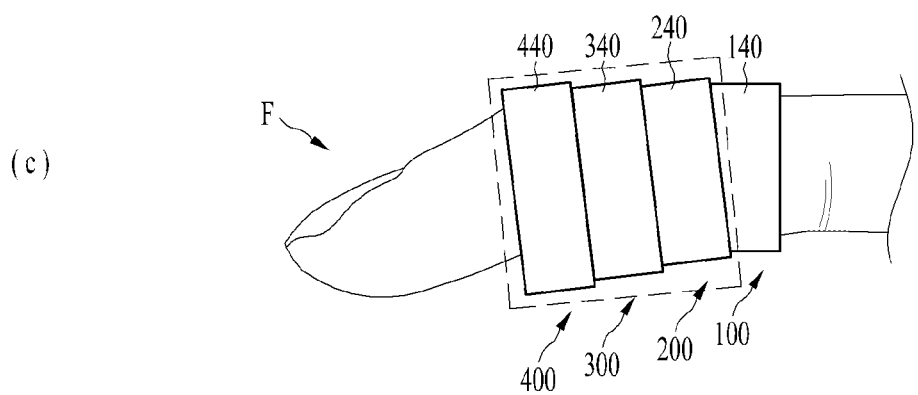

FIG. 27
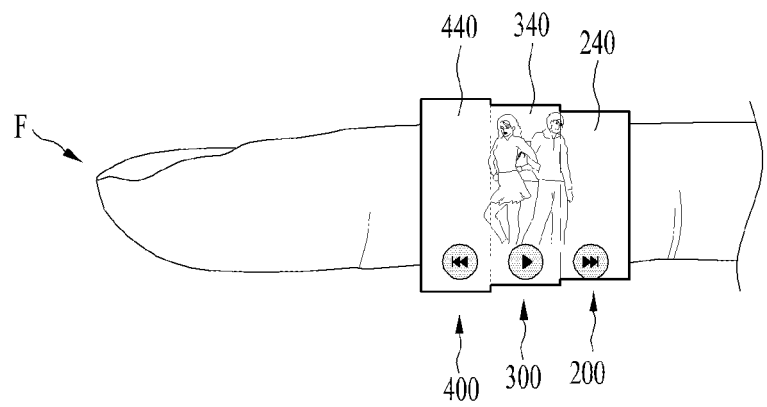
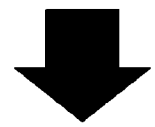
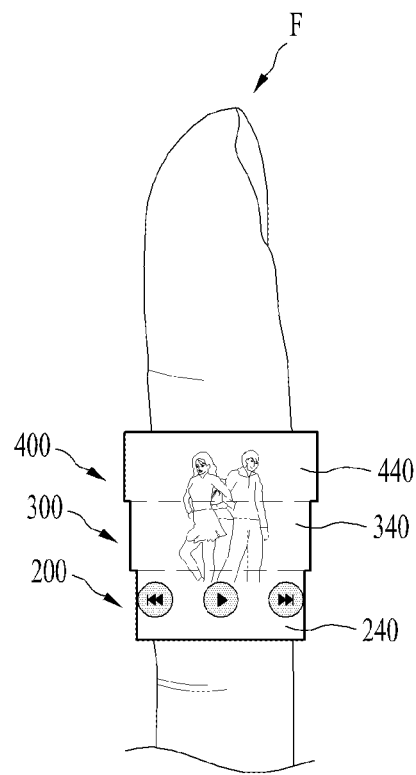

FIG. 35
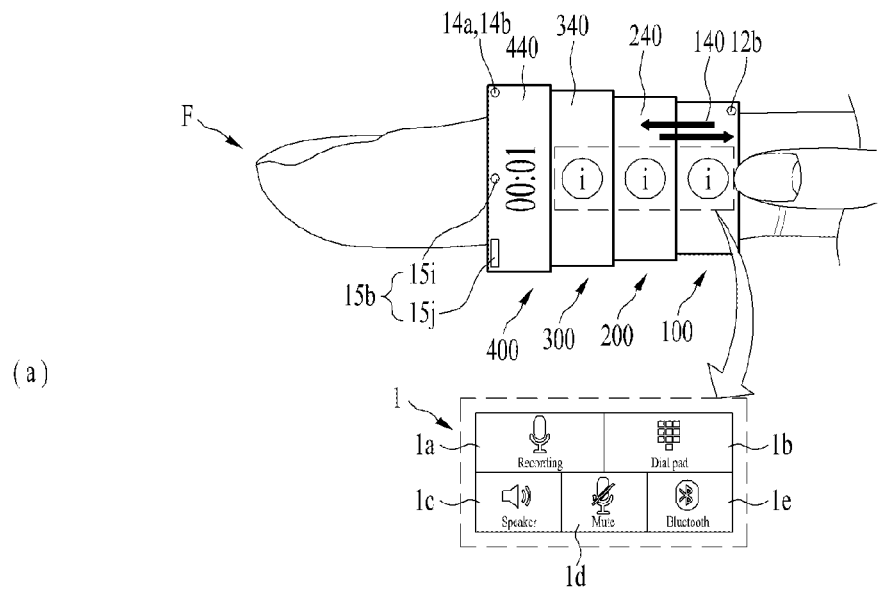
(a)
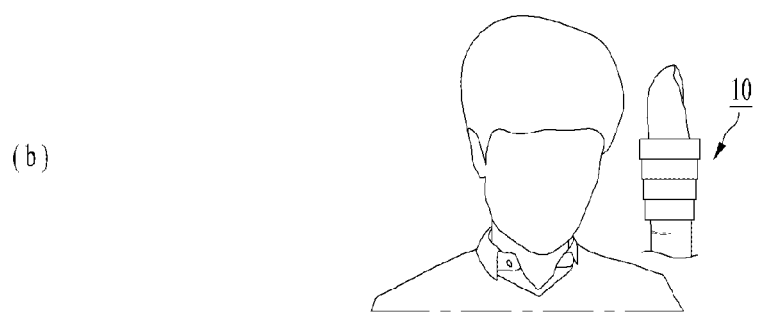
(b) Get close to face
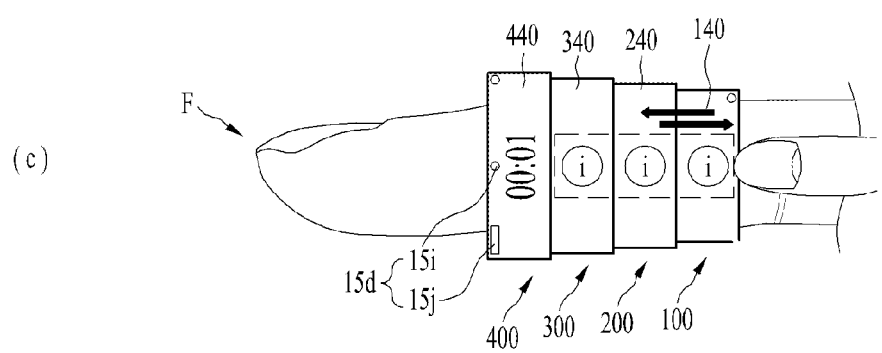
(c) Get away from face FIG. 39
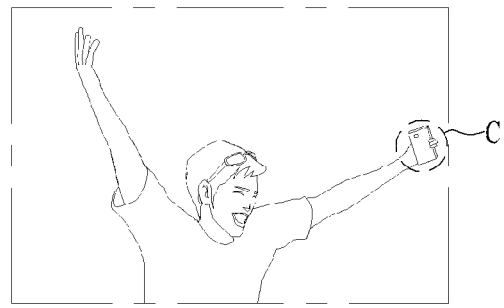
(a) 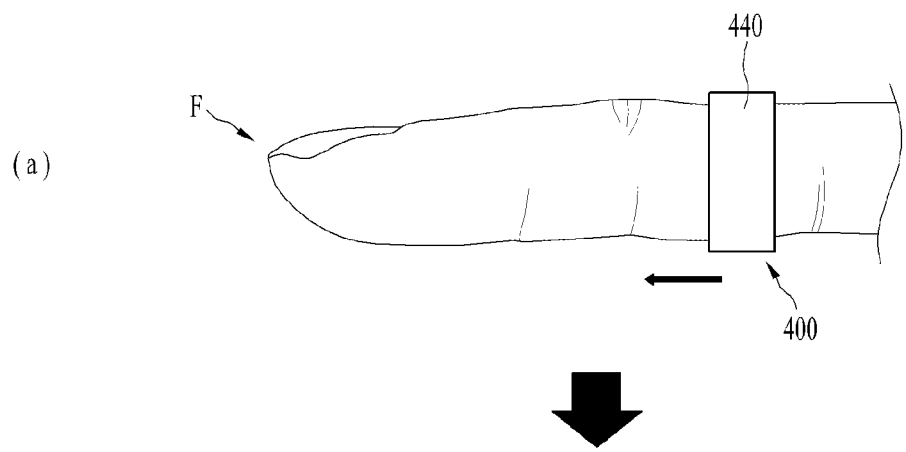
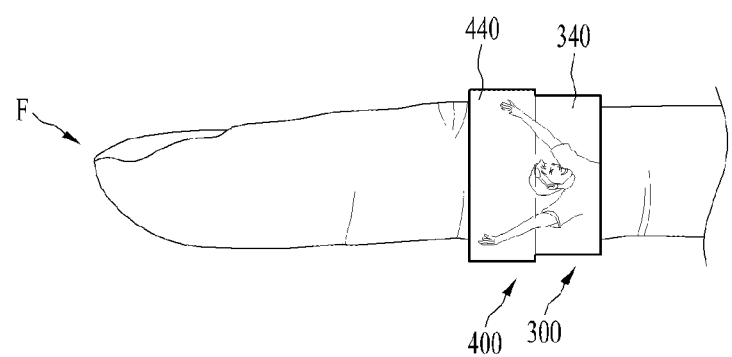
(b) 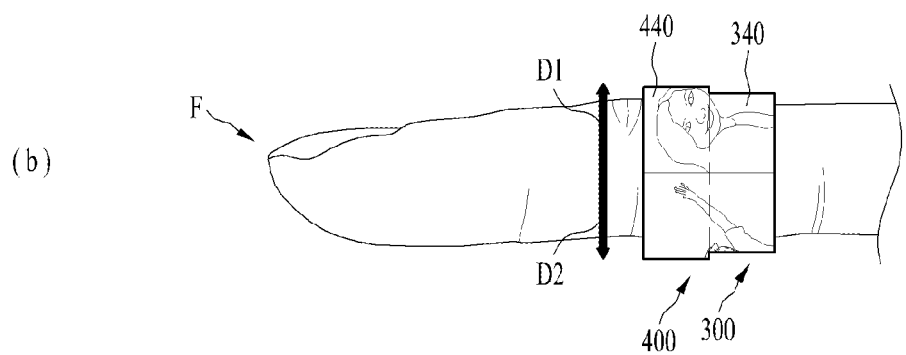

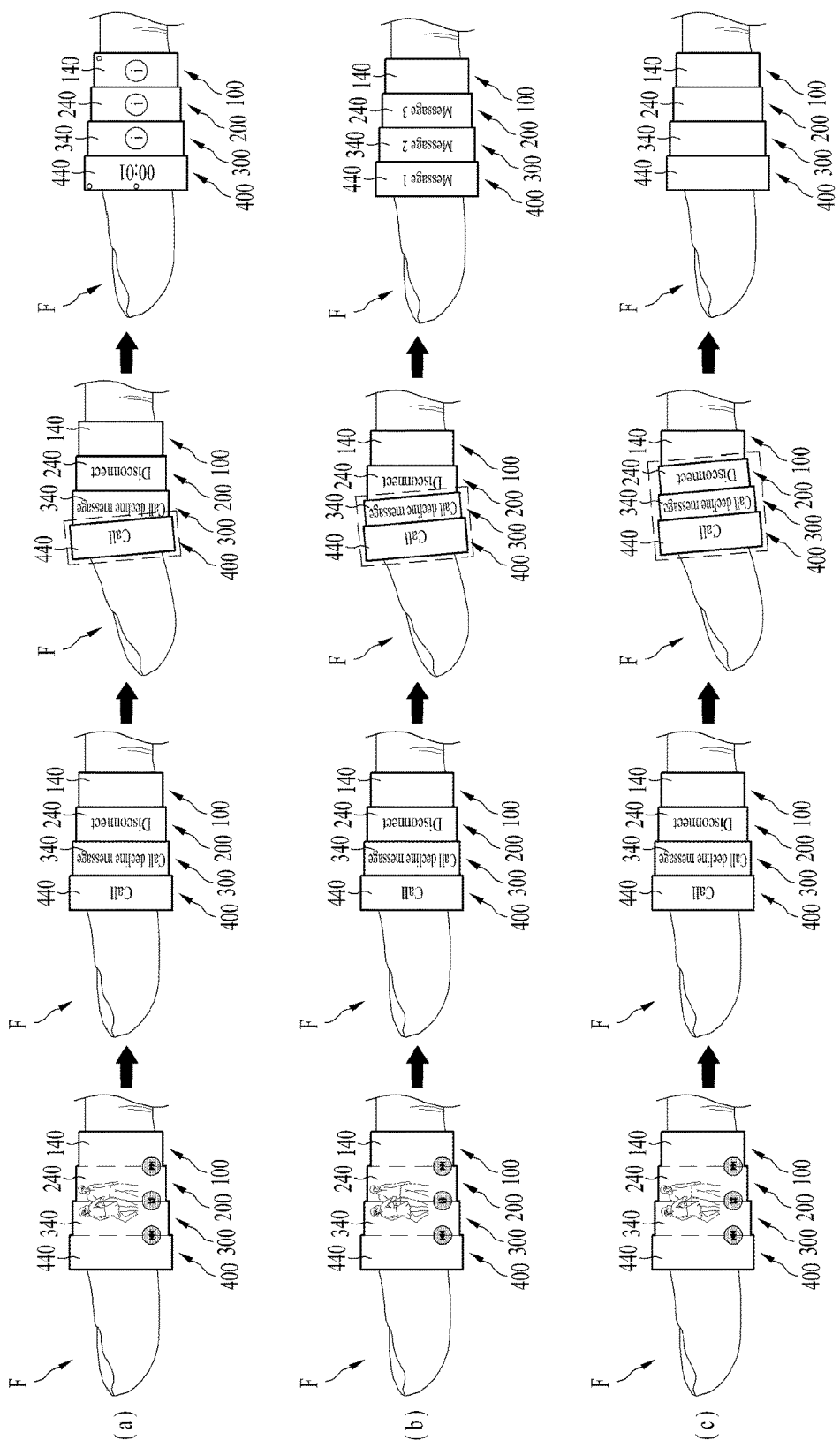

WEARABLE SMART DEVICE AND CONTROL METHOD THEREFOR

CROSS-REFERENCE TO RELATED APPLICATIONS

This application is a National Stage application under 35 U.S.C. § 371 of International Application No. PCT/KR2016/000530, filed Jan. 19, 2016, which claims the benefit of Korean Application No. 10-2015-0062468, filed on May 4, 2015, and Korean Application No. 10-2015-0060449, filed on Apr. 29, 2015. The disclosures of the prior applications are incorporated by reference in their entirety.

TECHNICAL FIELD

The present invention relates to a smart device including a mobile terminal, and more particularly, to a wearable smart device wearable on a user's finger or wrist and control method thereof.

BACKGROUND ART

Terminals may be classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some terminals include additional functionality which supports electronic game playing, while other terminals are configured as multimedia players. More recently, mobile terminals have been configured to receive broadcast and multicast signals which permit viewing of contents such as videos and television programs. In order to run such functions, a mobile terminal is basically connected to other devices or network using various communication protocols and can provide a user with ubiquitous computing. In particular, a mobile terminal has been evolved into a smart device that enables the connectivity to networks and the ubiquitous computing.

Thus, a smart device as a mobile terminal has been manufactured in a traditional size for a user to hold the smart device with a hand, whereby the user carries the smart device in a manner of holding the smart device with his hand or putting the smart device in a bag or pocket. Recently, owing to the technological developments, a smart device tends to be manufactured in further smaller size and is developed into a wearable smart device directly worn on a user's body.

The wearable smart device has been developed in wearable small size to be equipped with a variety of improved functions as a mobile terminal. On the other hand, the wearable smart device has been designed in a traditional accessory shape such as a ring, a bracelet (bangle), necklace, or the like to be wearable on a user's body. Therefore, users tend to demand wearable smart devices to have charming exteriors as accessories capable of representing their individualities. For these reasons, a wearable smart device is requested to have an improved exterior as well as various functions as a smart device. Furthermore, in order to implement the requested improved exterior and various functions, an optimized control method is requested for a wearable smart device as well.

DISCLOSURE OF THE INVENTION

Technical Tasks

Accordingly, the present invention is directed to substantially obviate one or more problems due to limitations and disadvantages of the related art. One technical task t of the present invention is to provide a wearable smart device having various functions and an improved exterior.

Another technical task t of the present invention is to provide a method of optimally controlling a wearable smart device for an improved exterior and various functions.

Technical Solutions

In one technical aspect of the present invention, provided herein is a wearable smart device, including a first ring worn on a body of a user, a first display unit disposed on an outer circumference of the first ring, and a second ring movably coupled with the first ring by being disposed on the outer circumference of the first ring, the second ring configured to selectively move to a first position covering the first display unit or a second position exposing the first display.

The second ring may slidably move on the first ring along a center axis direction. The second ring may be configured to return to the first position from the second position automatically. Particularly, the wearable smart device may further include an elastic member installed between the first ring and the second ring, the elastic member configured to be compressed when the second ring moves to the second position.

The second ring may be configured to continue to maintain the second position. Particularly, one of the first ring and the second ring may include a rib configured to be coughed on the other when the second ring moves to the second position.

The second ring may include a shock absorbing member formed of an elastic material to come into contact with the first ring when returning to the second position. The wearable smart device may further include an indicator configured to display various operational states, the indicator installed at the first ring. Particularly, the indicator may be projected in a prescribed length from the first ring and the second ring may include a seat portion configured to accommodate the projected indicator. Moreover, the wearable smart device may further include a terminal installed at the first ring, the terminal configured to charge a battery or exchange data with an external device.

The wearable smart device may further include a second display unit installed on an outer circumference of the second ring, the second display unit configured to selectively provide a screen connected to a screen of the first display unit. Particularly, the second display unit may further include an extension part disposed adjacent to the first display unit to disperse the screen of the second display unit to be connected to the screen of the first display unit.

The wearable smart device may further include a multitude of additional rings provided to the second ring to be telescopically coupled with the second ring. The second ring and additional rings may be configured to be turned together with a flexed finger of the user. Moreover, at least one of the second ring and additional rings may include a switch configured to be pressed by a ring adjacent to the user's finger when the user's finger is flexed.

In another aspect of the present invention, provided herein is a method of controlling a wearable smart device including a main ring worn on a user, a multitude of outer rings telescopically coupled with an outer circumference of the main ring, and displays respectively provided to the rings, the method including the steps of receiving an instruction of a desired operation by manipulations of the rings and displays and performing the instructed operation.

The receiving step may include the step of extending at least one outer ring or extending two or more outer rings simultaneously. The receiving step may include the step of touching at least one display, touching two or more displays simultaneously, or pressing at least one display strongly.

The receiving step may include the step of rotating at least one outer ring or rotating two or more outer rings simultaneously. The receiving step may include the step of turning at least one outer ring or turning two or more outer rings simultaneously.

The receiving and performing steps may include the step of receiving an incoming call to the wearable smart device and the incoming call receiving step may include the steps of extending at least one outer ring to answer the incoming call and making a call using the wearable smart device. The incoming call receiving step may further include the steps of displaying information on the incoming call through a display unit of an outer ring before the extending, informing the user that the call will start through the display unit of the outer ring while the extending is performed, or providing an interface for functions related to the call in the course of the calling step. The call making step may include the step of if the user brings the wearable smart device close to a face, using a microphone and a receiver installed at the outer ring and the main ring or if the user spaces the wearable smart device apart from the face, using the microphone and a loud speaker installed at the outer ring and the main ring.

The receiving and performing steps may include the step of disconnecting the call, the disconnecting step may include the step of retracting at least one of extended outer rings to end the call, and the disconnecting step may include the steps of informing the user that the call will be stopped through the display or providing call related information after the retracting step and turning off the displays after performing the providing step for a prescribed time.

The receiving and performing steps may include the step of holding the incoming call to the wearable smart device, and the holding step may include the steps of extending the outer rings, retracting the extended outer rings right after the extending step, and informing that the incoming call will be held during the extending step.

The receiving and performing steps may include the step of controlling a camera remote from the wearable smart device using the wearable smart device, the controlling step may include the steps of extending at least one outer ring to instruct the remote camera to take a photo and receiving and displaying the photos taken by the camera on the display. The controlling step may include the step of swiping the display in a specific direction to sequentially display the received photos on the display during the displaying step. The controlling step may further include the step of deleting the photo, and the deleting step may include the steps of further extending at least one outer ring in addition to the outer ring extended in the extending step after the displaying step and retracting the at least one extended outer ring again. The controlling step may further include the step of cancelling the deletion of the photo, and the cancelling step may include the steps of further extending at least one outer ring in addition to the outer ring extended in the additionally extending step after the retracting step and retracting the at least one extended outer ring again.

The receiving and performing steps may include the step of changing settings in the wearable smart device, the settings changing step may include the steps of rotating a prescribed one of the outer rings extended to enter a setup mode, displaying settable items on the displays, respectively, and rotating the outer ring displaying a specific item to change settings of the specific item, and the settings changing step may further include the step of enlarging and displaying a changed content of the specific item across the displays all during the rotating step.

Advantageous Effects

According to the present invention, a display is not provided to a second ring that forms an exterior of a wearable smart device, and a display unit of a first ring can be selectively exposed for user's need in response to a relative motion of the second ring to the first ring. Hence, when the display unit is hidden by the second ring, the wearable smart device has an improved exterior so as to function as a traditional accessory correspondingly. Meanwhile, if the display unit is exposed, the wearable smart device can provide a user with sufficient functions. For such reasons, the wearable smart device of the present invention can provide sufficient functions to a user as well as the improved exterior. Moreover, if necessary, as an additional structure is included, the wearable smart device of the present invention can provide a user with further extended functions.

On the other hand, a control method according to the present invention can control each function optimally by means of efficiently using various motions enabled by the structural features of the wearable smart device. Hence, the control method can achieve facilitation and convenience of use as well as functions of a smart device effectively.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

DESCRIPTION OF DRAWINGS

FIG. 9 is a partial perspective diagram showing a mechanism for maintaining an extension of a wearable smart device.

FIG. 24 is a schematic diagram showing steps of instructing an operation using turnings of outer rings of a wearable smart device.

FIG. 27 is a schematic diagram showing steps of adjusting a screen displayed on a display unit of a wearable smart device.

FIG. 35 is a schematic diagram showing details of steps of making a phone call in a wearable smart device.

FIG. 39 is a schematic diagram showing details of steps of taking a photo in a camera using a wearable smart device.

FIG. 50 is a schematic diagram showing details of steps of controlling a phone using a turning motion of an outer ring in a wearable smart device.

BEST MODE FOR INVENTION

Figure 1:
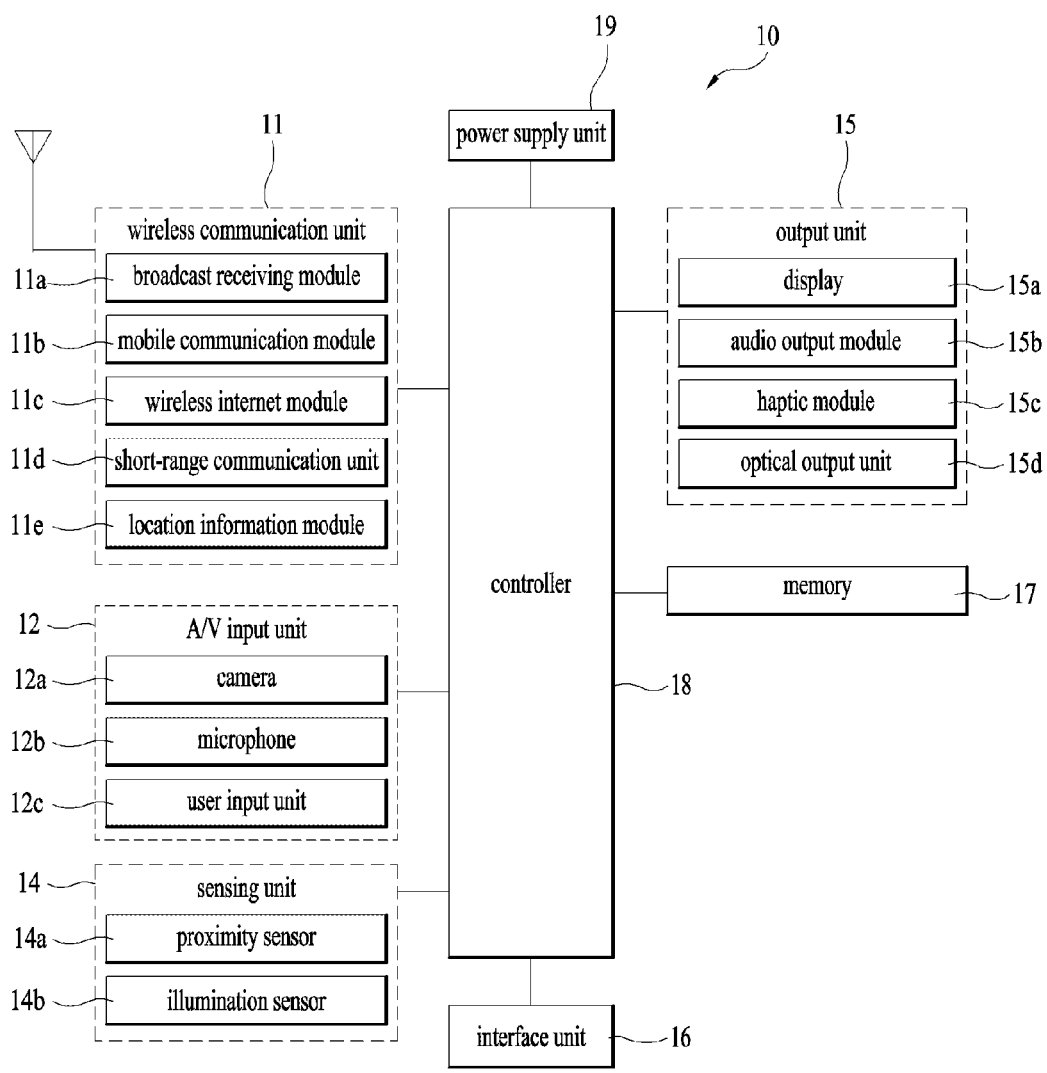
FIG. 1 is a block diagram showing a configuration of a wearable smart device related to the present application.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a term such as "module" and "unit" may be used to refer to elements or components. Use of such a term herein is merely intended to facilitate description of the specification, and the term itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms such as first, second and the like may be used herein to describe various elements, these elements should not be limited by these terms. These terms are generally only used to distinguish one element from another.

It will be understood that when an element is referred to as being "connected with" or "coupled with" another element, the element can be directly connected with the other element or intervening elements may also be present. In contrast, when an element is referred to as being "directly connected with" or "directly coupled with" another element, there are no intervening elements present.

A singular representation may include a plural representation unless it represents a definitely different meaning from the context.

Terms such as "comprise", "include" or "have" are used herein and should be understood that they are intended to indicate an existence of several components, functions or steps, disclosed in the specification, and it is also understood that greater or fewer components, functions, or steps may likewise be utilized. Moreover, due to the same reasons, it is also understood that the present invention includes a combination of features, numerals, steps, operations, components, parts and the like partially omitted from the related or involved features, numerals, steps, operations, components and parts described using the aforementioned terms unless deviating from the intentions of the disclosed original invention.

Smart devices mentioned in the present specification may be implemented using a variety of different types of terminals. Examples of such terminals include cellular phones, smart phones, laptop computers, digital broadcast terminals, personal digital assistants (PDAs), portable multimedia players (PMPs), navigators, slate PCs, tablet PCs, ultrabooks, wearable devices (for example, smart watches, smart glasses, head mounted displays (HMDs)), and the like.

By way of non-limiting example only, further description will be made with reference to particular types of smart devices. However, such teachings apply equally to other types of smart devices, such as those types noted above.

FIG. 1 is a block diagram to describe a wearable smart device related to the present application. A general configuration of the wearable smart device is described with reference to FIG. 1 as follows.

First of all, the wearable smart device 10 may include components such as a wireless communication unit 11, an input unit 12, a sensing unit 14, an output unit 15, an interface unit 16, a memory 17, a controller 18, a power supply unit 19, and the like. It is appreciated that implementing all of the components shown in FIG. 1 is not a requirement, and that greater or fewer components may alternatively be implemented. Moreover, the real shapes and structures of the aforementioned components are not illustrated all but the shapes and structures of some significant components are shown in the drawings following FIG. 1. Yet, it is apparent to those skilled in the art that components described without being illustrated can be included in the wearable smart device to embody the functions of a smart device.

In particular, among the above-listed components, the wireless communication unit 110 typically includes one or more modules which permit communications such as wireless communications between the wearable smart device 10 and a wireless communication system, communications between the wearable smart device 10 and another wearable smart device, communications between the wearable smart device 10 and an external server. Further, the wireless communication unit 110 typically includes one or more modules which connect the wearable smart device 10 to one or more networks.

The wireless communication unit 110 may include at least one of a broadcast receiving module 11a, a mobile communication module 11b, a wireless Internet module 11c, a short-range communication module 11d, and a location information module 11e.

The input unit 120 includes a camera 12a (or an image input unit) for an image or video signal input, a microphone 12b (or an audio input unit) for an audio signal input, and a user input unit 12c (e.g., a touch key, a push key, etc.) for receiving an input of information from a user. Audio or image data collected by the input unit 12c may be analyzed and processed into a user's control command.

The sensing unit 14 is typically implemented using one or more sensors configured to sense internal information of the wearable smart device, the surrounding environment of the wearable smart device, user information, and the like. For example, the sensing unit 14 may include a proximity sensor 14a and an illumination sensor 14b. If desired, the sensing unit 14 may alternatively or additionally include other types of sensors or devices, such as a touch sensor, an acceleration sensor, a magnetic sensor, a gravity sensor (G-sensor), a gyroscope sensor, a motion sensor, an RGB sensor, an infrared (IR) sensor, a finger scan sensor, a ultrasonic sensor, an optical sensor (for example, the camera 12a), the microphone 12b, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. Meanwhile, the wearable smart device disclosed in the present specification may combine to utilize informations obtained from at least two of such sensors.

The output unit 15 is typically configured to output various types of information, such as audio, video, tactile output, and the like. The output unit 15 may include a display unit 15a, an audio output unit 15b, a haptic module 15c, and an optical output module 15d. The display unit 15a may have an inter-layered structure or an integrated structure with a touch sensor in order to facilitate a touchscreen. The touchscreen may provide an output interface between the wearable smart device 10 and a user, as well as function as the user input unit 12c which provides an input interface between the wearable smart device 10 and the user.

The interface unit 16 serves as an interface with various types of external devices that can be coupled to the wearable smart device 10. The interface unit 16, for example, may include at least one of wired or wireless headset ports, external power supply ports, wired or wireless data ports, memory card ports, ports for connecting a device having an identification module, audio input/output (I/O) ports, video I/O ports, earphone ports, and the like. In some cases, the wearable smart device 10 may perform assorted control functions associated with a connected external device, in response to the external device being connected to the interface unit 16.

The memory 17 is typically implemented to store data to support various functions or features of the wearable smart device 10. For instance, the memory 170 may be configured to store application programs (or applications) run in the wearable smart device 10, data or instructions for operations of the wearable smart device 10, and the like. Some of these application programs may be downloaded from an external server via wireless communication. Other application programs may be installed on the wearable smart device 10 at time of manufacturing or shipping, which is typically the case for basic functions of the wearable smart device 10 (for example, receiving a call, placing a call, receiving a message, sending a message, and the like). It is common for application programs to be stored in the memory 17, installed on the wearable smart device 10, and launched by the controller 18 to perform operations (or functions) for the wearable smart device 10.

The controller 18 typically functions to control overall operations of the wearable smart device 10, in addition to the operations associated with the application programs. The controller 18 may provide or process information or functions appropriate for a user by processing signals, data, information and the like, which are inputted or outputted by the various components depicted in the above description, or running application programs stored in the memory 17.

Moreover, in order to launch an application program stored in the memory 17, the controller 18 can control at least one portion of the components described with reference to FIG. 1. Furthermore, the controller 18 controls at least two of the components included in the wearable smart device 10 to be activated in combination to launch the application program.

The power supply unit 19 can be configured to receive external power or provide internal power in order to supply appropriate power required for operating elements and components included in the wearable smart device 10. The power supply unit 19 may include a battery (19a: refer to FIG. 4). In particular, the battery 19a may include at least one of a built-in battery or a replaceable (or detachable) battery.

At least some of the components can operate cooperatively to implement the operations, controls or control methods of the wearable smart device 10 according to various embodiments mentioned in the following description. And, the operation, control or control method of the wearable smart device 10 may be implemented on the wearable smart device 10 by launching at least one application program saved in the memory 17.

In the following drawings, the wearable smart device 10 is illustrated as having a type wearable on a user's body, and more particularly, on a user's finger, i.e., a ring shape. And, the wearable smart device 10 may have a shape of a watch similarly worn on a wrist, i.e., a watch type or a bangle type. Yet, the present invention is non-limited by the above configurations and is applicable to various structures such as a clip type, a glass type, and a type having two or more bodies coupled together to be relatively movable (e.g., a folder type, a flip type, a slide type, a swing type, a swivel type, etc.). However, such configurations and teachings with regard to a particular type of the wearable smart device 10 will generally apply to other types of wearable smart devices 10 as well.

Figure 2:
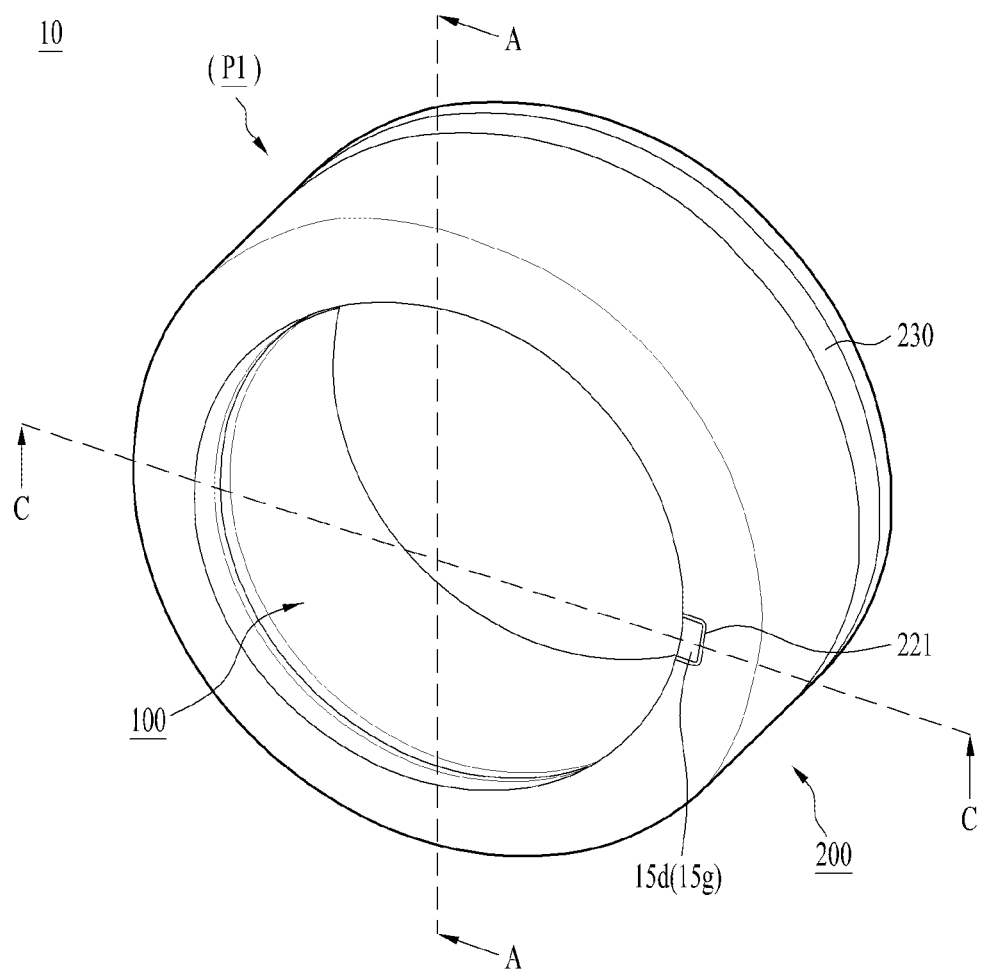
FIG. 2 is a perspective diagram showing a front part of a wearable smart device.
Figure 3:
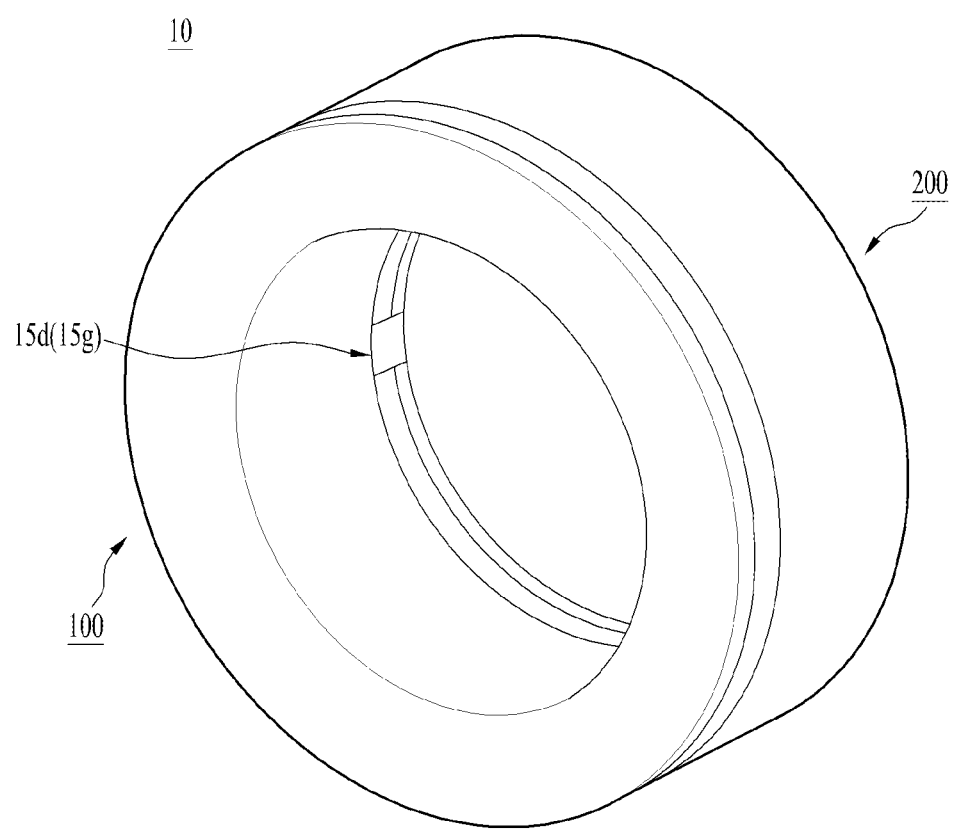
FIG. 3 is a perspective diagram showing a rear part of a wearable smart device.
Figure 4:
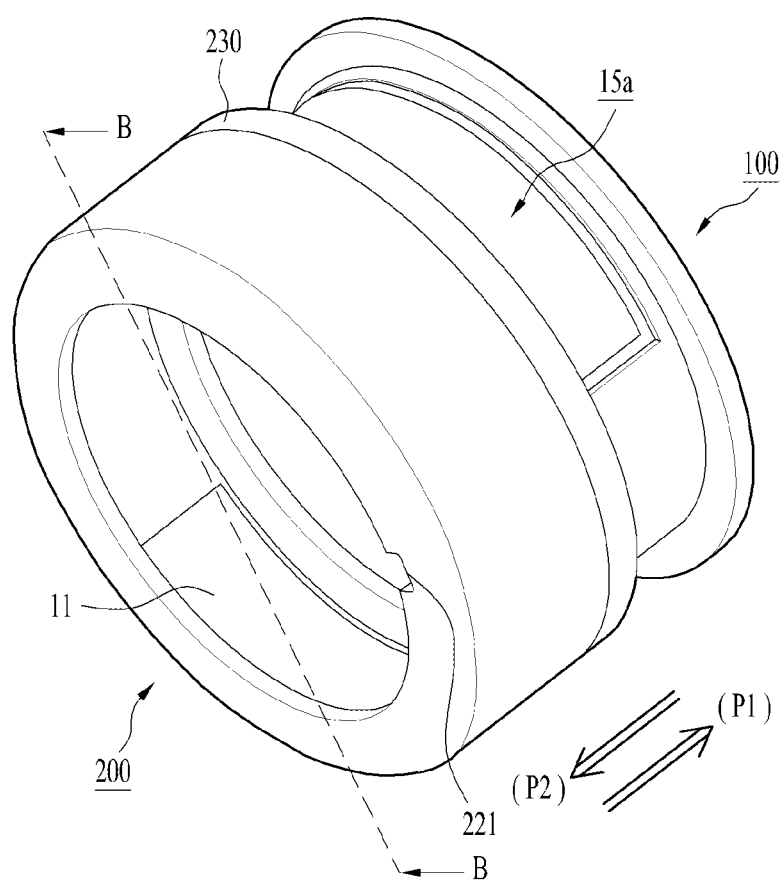
FIG. 4 is a perspective diagram showing an extended wearable smart device.
Figure 5:
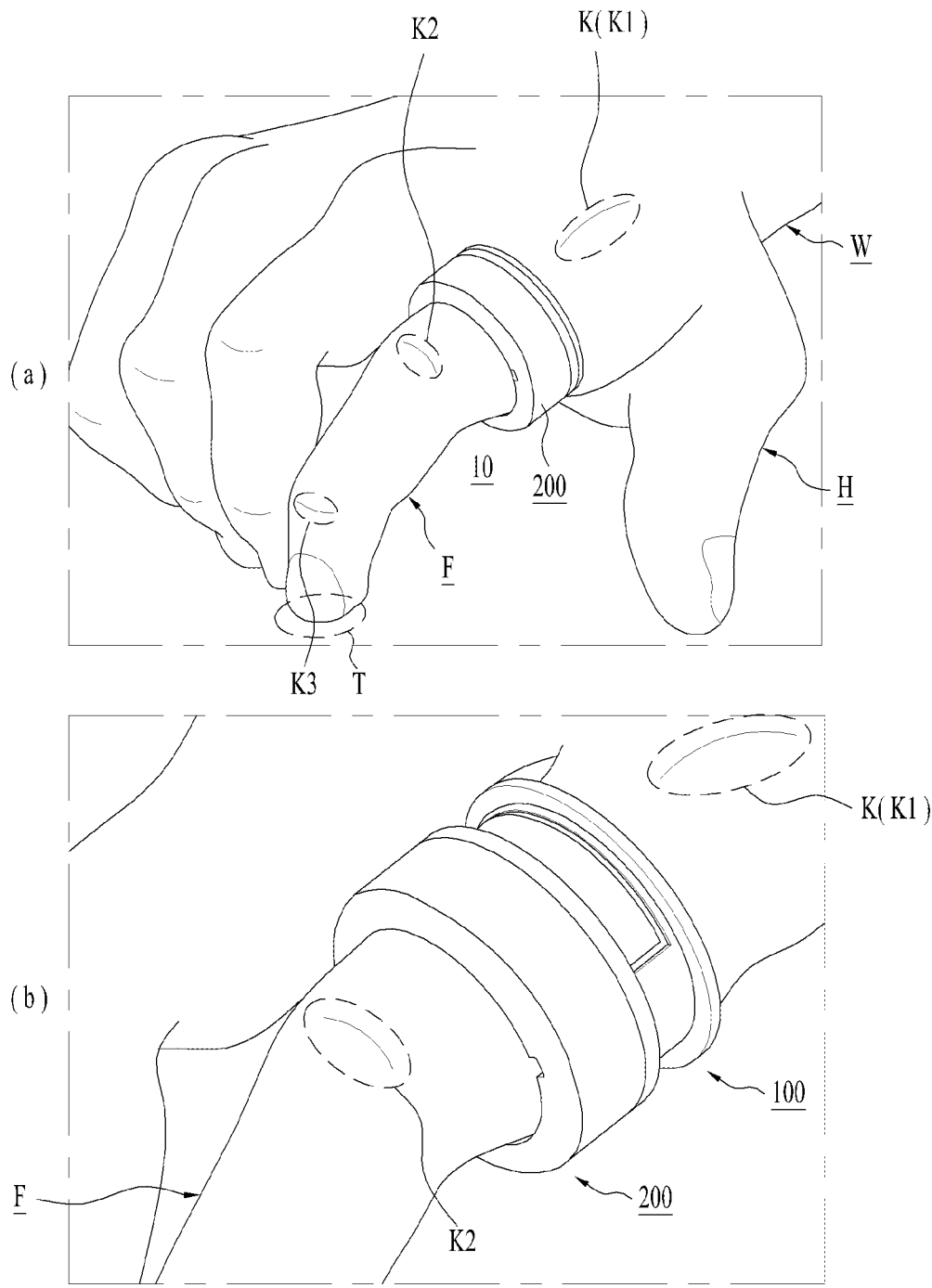
FIG. 5 is a perspective diagram showing a wearable smart device worn on a finger.
Figure 6:
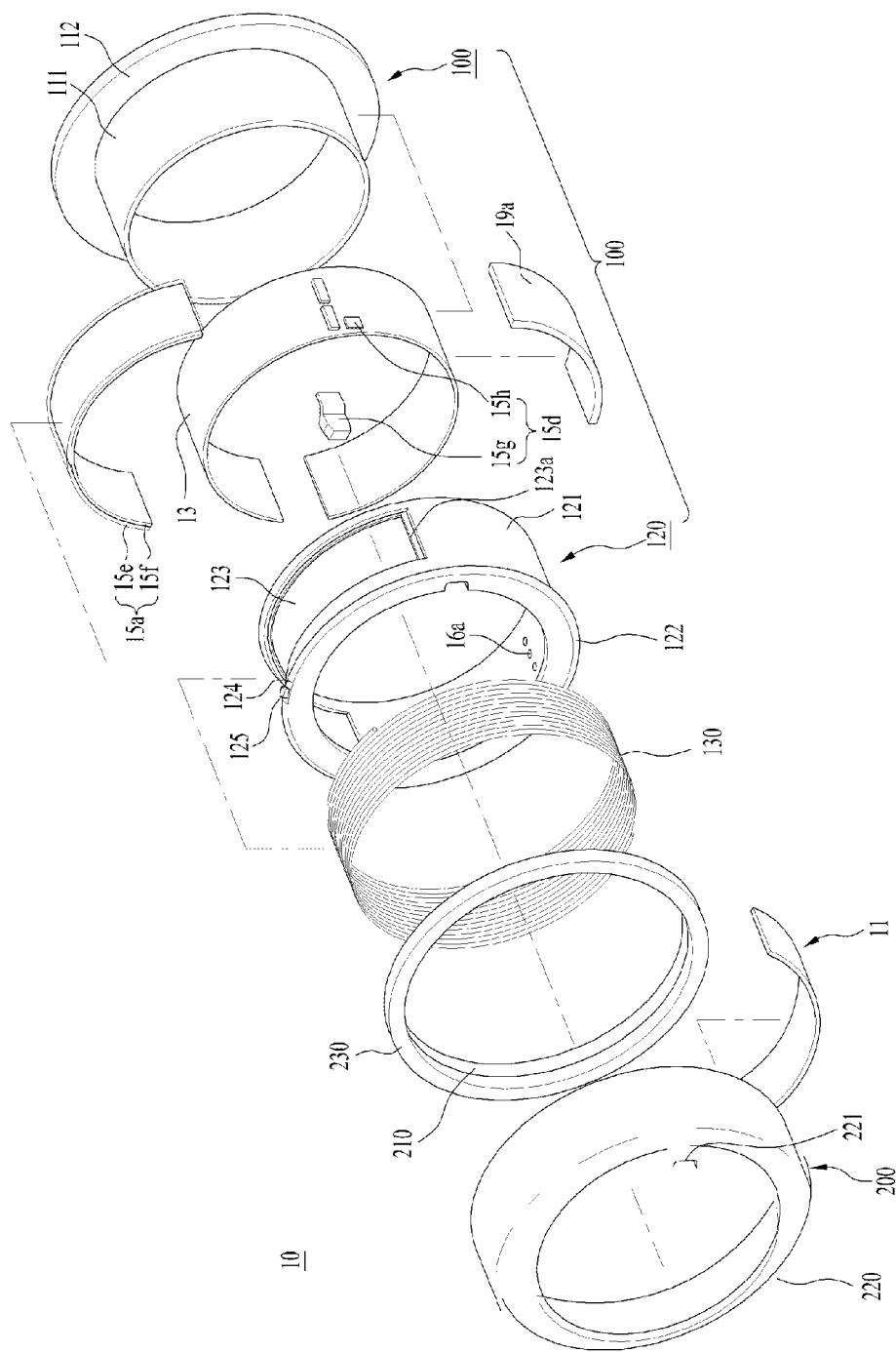
FIG. 6 is an exploded perspective diagram showing a wearable smart device.

In continuation with the general configuration of the wearable smart device 10 mentioned in the foregoing description, a whole structure of the wearable smart device 10 is schematically described with reference to the related drawings as follows. With respect to this, FIG. 2 is a perspective diagram showing a front part of a wearable smart device, FIG. 3 is a perspective diagram showing a rear part of a wearable smart device, and FIG. 4 is a perspective diagram showing an extended wearable smart device. Moreover, FIG. 5 is a perspective diagram showing a wearable smart device worn on a finger and FIG. 6 is an exploded perspective diagram showing a wearable smart device. Since FIG. 6 shows the overall structure of the wearable smart device, all the following description of the present application shall always refer to FIG. 6 basically unless prescribed drawings are mentioned to be specially referred to.

The wearable smart device 10, as shown in FIGS. 2 to 6, may include a first ring 100 and a second ring 200 disposed on the first ring 100. The first ring 100 is wearable on a user's body together with the second ring 200 and has a size and shape fit for such wearing. Although the first and second rings 100 and 200, as shown in FIG. 5, is configured as a ring worn on a finger F of a user hand H, they can become a bangle wearable on a user wrist W by being increased in size only.

Actually, the first ring 100 is directly put on a user's finger and the second ring 200 may be disposed on an outer circumference of the first ring 100. Namely, the second ring 200 may have a diameter greater than that of the first ring 100. In particular, the second ring 200 may be configured to enclose the whole outer circumference of the first ring 100, and the first ring 100 may be inserted in the second ring 200 to oppose an inner circumference of the second ring 200. In order to form a single assembly, the second ring 200 may be coupled with the first ring 100. And, the second ring 200 can slide on the first ring 100 along a center axis direction of the device 10 or the first and second rings 100 and 200. Hence, the second ring 200 is movably coupled with the first ring 100, thereby being able to move relatively to the first ring 100.

In more particular, the inner circumference surface of the second ring 200 is supported by an outer circumference surface, and the second ring 200 is movable away from the first ring 100. And, the moved-away second ring 200 is movable again toward the first ring 100. The first ring 100 is put on a finger and fixed thereto, and the aforementioned motion of the second ring 200 becomes a motion relative to the fixed first ring 100. As a result of such a relative motion, the second ring 200 is selectively extendable or retractable on the first ring 100, whereby the wearable device can be selectively elongated or shortened. Likewise, the wearable smart device 10 itself can be described as extended or retracted. Hence, the second ring 200 can be telescopically coupled with the first ring 100. Considering the aforementioned structural relation, the first ring 100 and the second ring 200 can be described as an inner ring and an outer ring, respectively. Furthermore, considering the telescopic relation, the first ring 100 and the second ring 200 may be represented as a main ring and a stage, respectively. Hence, in the following description, the first ring 100 and the second ring 200 may be changed into the above terms. Meanwhile, since the inner circumference surface of the second ring 200 is slidably supported by the outer circumference surface of the first ring 100, considering the aforementioned structural relation between the first ring 100 and the second ring 200, the second ring 200 200 may rotate or revolve relatively on the first ring 100 in a circumferential direction centering on the same center axis of the first ring. Such a rotation or revolution of the second ring 200 can be performed clockwise or counterclockwise in front view of the device 10. Namely, the second ring 200 can rotate in a first direction (i.e., counterclockwise) or a second direction (i.e., clockwise) opposite to the first direction.

In functional aspect, the first ring 100 may be basically configured to support various electronic parts required for operation of the wearable smart device 10. Moreover, the first ring 100 may be configured to form a space for accommodating the electronic parts. As FIG. 6 well shows the parts of the wearable smart device 10, such parts are described with reference to FIG. 6 as follows. Additionally, since such parts are well shown in the cross-sectional diagrams of FIG. 7, FIG. 8 and FIG. 10, such diagrams shall be referred to for the following description.

The wearable smart device 10 may include a display unit 15a as an output unit 15. The display unit 15a may be exposed from the device 10 to be well seen to a user while the wearable smart device 10 is worn. The display unit 15a may be disposed on the outer circumference of the first ring 100 so as to be exposed to a user. Hence, the display unit 15a may be externally exposed from the first ring 100 and form an exterior of the first ring 100. The display unit 15a may provide a user with various informations. In particular, the display unit 15a can display information processed by the wearable smart device 10. For example, the display unit 15a basically outputs various images and text informations, and is able to display running screen information of an application run on the wearable smart device 10 or UI (user interface), GUI (graphic user interface) or the like according to such running screen information.

The display unit 15a may include at least one of a liquid crystal display (LCD), a thin film transistor-liquid crystal display (TFT-LCD), an organic light emitting diode (OLED), a flexible display, a 3-dimensional (3D) display, and an e-ink display. Moreover, two or more display units 15a may be provided to the wearable smart device 10 if necessary. For instance, in order to be exposed to a user, i.e., the additional display unit may be provided to a bottom portion of the first ring 100 opposing the above display unit 15a shown in FIG. 6.

Figure 7:
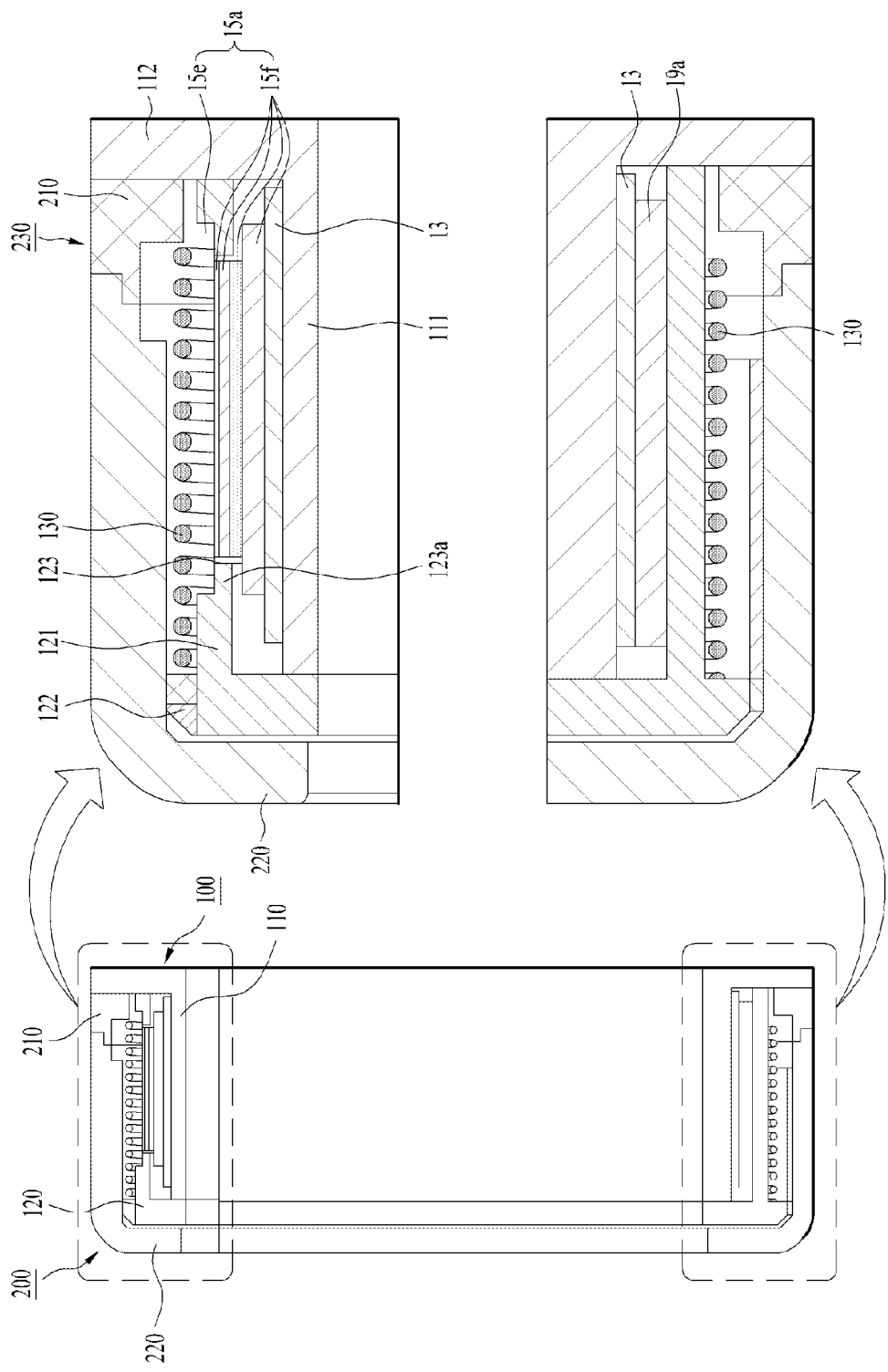
FIG. 7 is a cross-sectional diagram obtained along a line A-A shown in FIG. 2.
Figure 8:
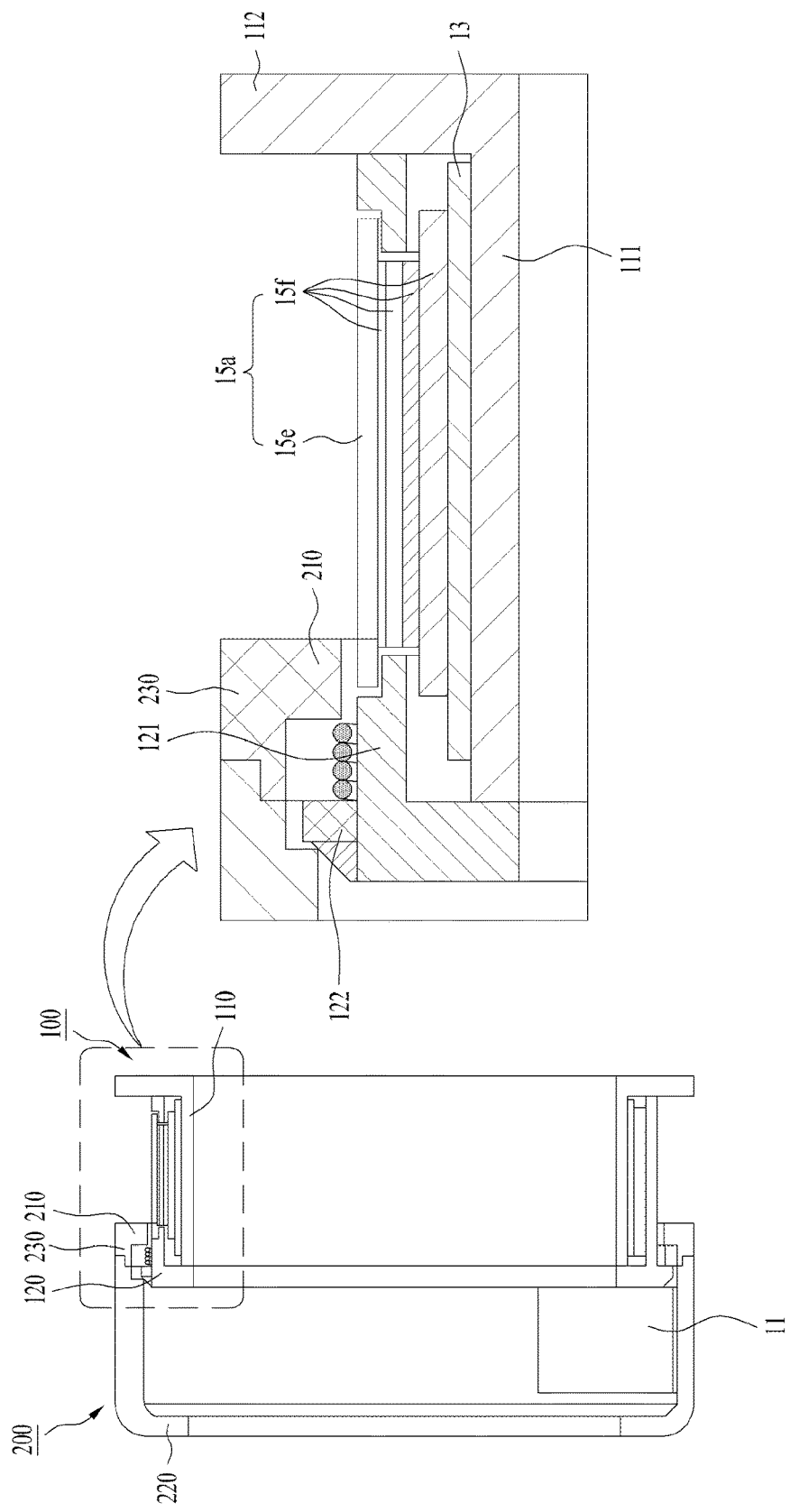
FIG. 8 is a cross-sectional diagram obtained along a line B-B for the extended wearable smart device shown in FIG. 4.
Figure 10:
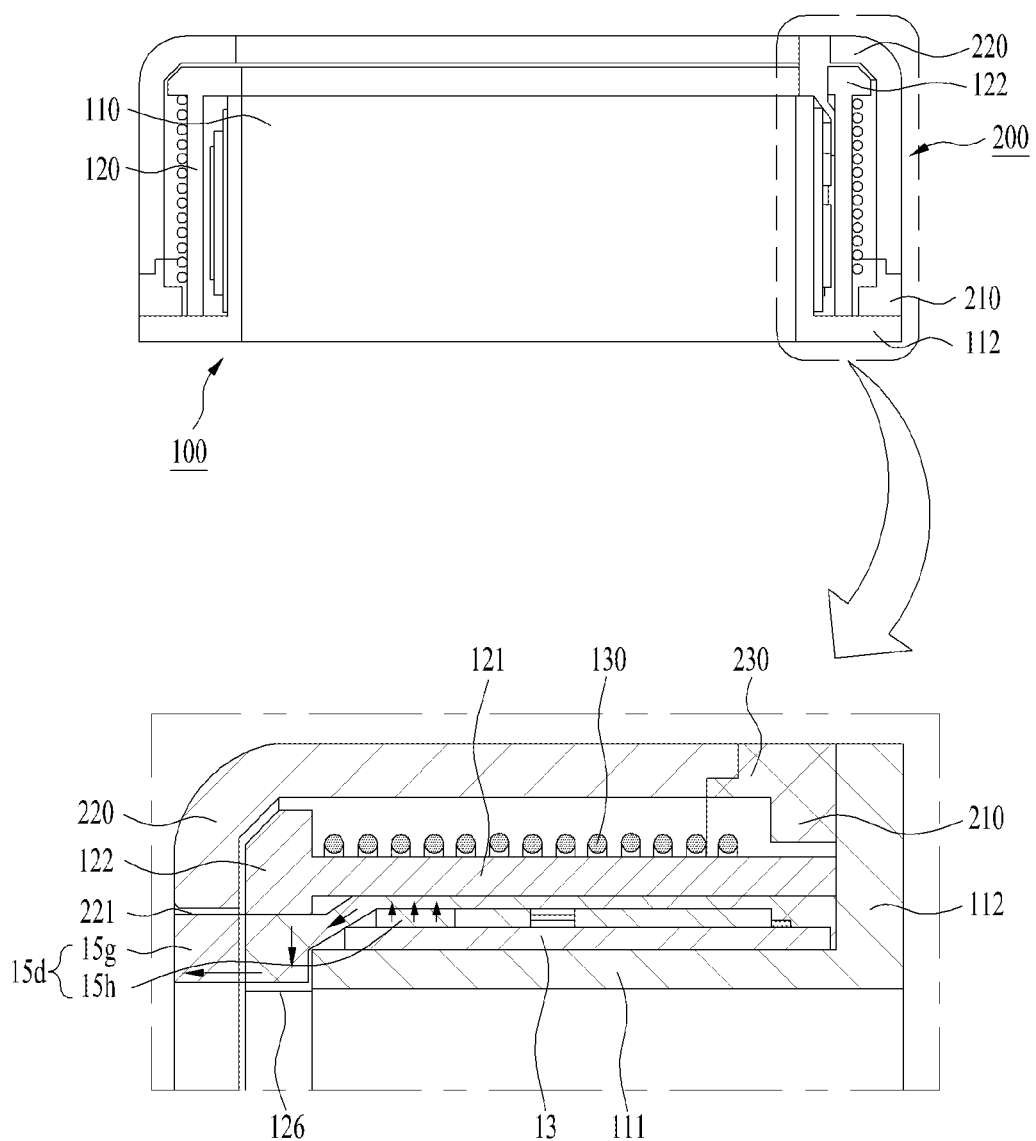
FIG. 10 is a cross-sectional diagram obtained a line C-C of FIG. 2 to show an indicator.

The display unit 15a, as shown in FIG. 7, FIG. 8 and FIG. 10, may include a display module 15f and a window 15e configured to cover the display module 15f. The display module 15f may include the aforementioned display device such as LCD, OLED, or the like and is the component that actually displays image information. The window 15e may be disposed on a portion of the display module 15f exposed to a user and is able to protect the display module 15f externally. In addition to the protective functions, the window 15e should be configured to allow the information, which is displayed on the display module 15f, to be viewed by a user. Therefore, the window 15e may be formed of material having proper strength and transparency. Moreover, if the window 15e is formed of a transparent material overall, other parts or inner parts of the wearable smart device 10 may be exposed to a user as well as the display module 15f. Hence, such exposure may degrade the exterior of the device 10. Preferably, a portion of the window 15e except a prescribed region for exposing the image information of the display module 15f can be configured non-transparent. In particular, a non-transparent layer may be coated on or attached to an outer circumference configured to enclose the display module 15f on a backside of the window 15e. Such a non-transparent layer may be called a bezel. The display module 15, as shown in the drawings, can be directly attached to the backside of the window 15e. In doing so, the display module 15f can be directly attached to the window 15e in various ways. For instance, an adhesive is most conveniently available for the direct attachment.

In order to receive a control command by a touch mechanism, the display unit 15a may include a touch sensor configured to sense a touch to the display unit 15a. Using this, if a touch is applied to the display unit 15a, the touch sensor senses the corresponding touch and is then able to generate a control command corresponding to the touch based on the sensed touch. Contents inputted by the touch mechanism may include texts, numerals, menu items indicated or designated in various modes, and the like. The touch sensor may be configured in a form of a film having a touch pattern and disposed between the window 15e and the display module 15f, or include a metal wire which is patterned directly on a backside of the window 15e. Alternatively, the touch sensor may be integrally formed with the display module 15f. For instance, the touch sensor may be disposed on a circuit board of the display module 15f or inside the display module 15f. Thus, the display unit 15a may also form a touchscreen together with the touch sensor. In this case, the touchscreen may serve as the user input unit 12c (see FIG. 1). If necessary, a physical key (e.g., a push key) may be additionally provided as the user input unit 12c adjacent to the display unit 15a corresponding to the touchscreen to facilitate user's inputs. According to the complicated configuration of the display module 15f, the display module 15f is depicted as a module or assembly consisting of a multitude of layers or parts in the accompanying drawings.

The wearable smart device 10 may include an optical output unit 15d as the output unit 15. If an event occurs, the optical output unit 15d may output light to indicate the event occurrence. The optical output unit 15d, as shown, may include a light source 15h and a light guide unit 15g installed in the first ring 100. Moreover, the wearable smart device 10 may include a terminal 16a as an interface unit 16. The terminal 16a is provided to the first ring 100 as well. The optical output unit 15d and the interface unit 16 shall be further described in detail together with the related components and drawings. Moreover, the wearable smart device 10 may have a wireless communication unit 11. The wireless communication unit 11, as shown in the drawing, can be provided as a single module into which the broadcast receiving module 11a, the mobile communication module 11b, the wireless Internet module 11c, the short-range communication module 11d, and the location information module 11e are integrated together. Moreover, an antenna may be additionally integrated with the wireless communication unit 11. Hence, the wireless communication unit 11 can communicate with an external device and/or a network in all possible ways. Like other parts, the wireless communication unit 11 may be installed in the first ring 100. Yet, in consideration of the limited inner space of the first ring 100, the wireless communication unit 11, as shown, may be disposed on the inner circumference surface of the second ring 200.

A circuit board 13 is the component on which various electronic parts, and more particularly, various processors configuring the controller 18 are mounted together with other circuits and devices supporting them and may be installed in the first ring 100 likewise. Hence, the circuit board 13 can overall control operations of the wearable smart device 10, and more particularly, all components 11 to 19 of the wearable smart device 10. The wearable smart device 10 may include a battery 19a (cf. FIG. 1) as the power supply unit 19 configured to supply power. The battery 19a may be built in the device 10, i.e., installed within the first ring 100 or detachably attached to the device 10. The battery 19a can be charged through a power cable connected to the terminal 16a. Moreover, the battery 19a may be configured to enable the wireless charging through a wireless charging device. In this case, the wireless charging may be embodied by magnetic induction or resonance (e.g., magnetic resonance).

The rest of the parts except the small parts such as the optical output unit 15d and the terminal 16a have considerably large sizes. Hence, they should have exteriors fit for the device 10 in order to be accommodated or installed in the wearable smart device, and more particularly, in the first ring 100 or the second ring 200. For this reason, the wireless communication unit 11, the circuit board 13, the display unit 15a, the battery 19a and the like can be manufactured to have prescribed curvatures. Particularly, the display unit 15a, i.e., the module 15e and the window 15f may include a flexible display formed of such deformable material as plastics overall.

The second ring 200 is configured to form an exterior of the wearable smart device 10. The second ring 200 encloses the first ring 100, thereby protecting parts attached to or received in the first ring 100 as well as the first ring. Moreover, as described above, since the second ring 200 is coupled with the first ring movably, i.e., telescopically, it can hide or expose the first ring 100 selectively. Namely, the outer circumference of the first ring 100 can be selectively covered or exposed in response to a relative motion of the second ring 200. In particular, as shown in FIG. 4 and FIG. 5 (b), if the second ring 200 is extended, the outer circumference of the first ring 100 and the display unit 15a installed thereon can be exposed. Moreover, if the second ring 200 is retracted, as shown in FIG. 2, FIG. 3 and FIG. 5 (a), the outer circumference of the first ring 100 and the display unit 15a installed thereon can be covered or hidden. Hence, the second ring 200 can be configured to selectively expose or cover the display unit 15a by relatively moving on the first ring 100. Namely, the second ring 200 can be configured to move to a first position {a covering the display unit 15a [cf. FIG. 2] or a second position P2 exposing the display unit 15a [cf. FIG. 4]. If the second ring 200 is extended, the second ring 200 is disposed at the second position P2. If the second ring 200 is retracted, the second ring 200 can be disposed at the first position P1. Hence, the display unit 15a is exposed only if necessary. And, the display unit 15a can be covered with the second ring 200 if unused. Namely, the wearable smart device 10 can have an improved exterior by the second ring 200 covering the display unit 15a that is not in use. For such a reason, by the mechanism of selectively exposing the display unit 15a, the wearable smart device 10 may become a ring as a substantial accessory.

Structures of the first and second rings 100 and 200 are described in detail with reference to FIG. 6, FIG. 7, FIG. 8 and FIG. 10 again.

The first ring 100, as shown in FIG. 6, may include an inner frame 110 and an outer frame 120 coupled with the inner frame 110. The inner fame 110 has a body 111 in tube or ring shape overall, and can be put on a user's finger F. Hence, the inner frame 110 becomes a portion directly coming into contact with the finger F in the device 10 and plays a role in fixing the first ring 100 to the finger F owing to through a tight-fit. The outer frame 120 has a body 121 in tube or ring shape overall, as shown in FIG. 7, FIG. 8 and FIG. 10, and may be spaced apart from the inner frame 110 in an outer radius direction. In particular, the body 111 of the inner frame 110 can be inserted in the body 121 of the outer frame 120 while maintaining a space in a prescribed size. By the spacing between the inner and outer frames 110 and 120, the first ring 100 has an inner space in a prescribed size and most of parts (e.g., display unit 15a, circuit board 13, battery 19a, etc.) can be accommodated in the inner space. Moreover, the outer frame 210 has an opening 123, and the display unit 15a can be inserted to be exposed from the first ring 100 through the opening 123. To be supported more stably, the display unit 15a may be additionally supported by the first ring 100, and more particularly, by the outer frame 120. Namely, a seating portion 123a may be provided around the opening 123, and the window 15e can be supported by the seating portion 123a.

The first ring 100, and more particularly, the inner frame 110 may include a first flange 112 provided to a first edge of the inner frame 110 adjacent to a knuckle K (cf. FIG. 5) of a user hand H. Referring to FIG. 5, a user's finger F substantially includes first to third knuckles K1 to K3. Yet, since the first knuckle K1 among the knuckles is a portion that directly connects the user's hand H and the user's finger F (particularly, a base of the finger F), it is generally called a knuckle. Hence, for clarity of the following description, the first knuckle K1 is described as a knuckle K. The first flange 112 can be extended from the first edge in the outer radius direction. Hence, the second ring 200, which is moved, i.e., retracted in a direction of the knuckle K, is unable to further moved due to the first flange 112, whereby the first flange 112 can restrict the movement (i.e., retraction) of the second ring 200 in the direction of the knuckle K. Moreover, the first ring 100, and more particularly, the outer frame 120 may include a second flange 122 provided to a second edge adjacent to a fingertip T (cf. FIG. 5). The second flange 122 may be extended from the second edge in the outer radius direction. Moreover, the second flange 122 may be extended in an inner radius direction from the second edge in order to close the inner space of the first ring 100. Hence, the second ring 200, which is moved (i.e., extended) in the direction of the fingertip T is caught on the second flange 122, whereby the second flange 122 can restrict the movement of the second ring 200 in the direction of the fingertip T, i.e., the extension of the second ring 200.

Similarly, the second ring 200 may include a first flange 210 provided to a first edge adjacent to the knuckle K. The first flange 210 may be extended in an inner radius direction of the second ring 200. Hence, when the second ring 200 is moved in the direction of the fingertip T, i.e., extended, the first flange 210 is caught on the first ring 100, and more particularly, on the second flange 112, whereby the first flange 210 can restrict the movement of the second ring 200 toward the fingertip T. moreover, by the engagement of the first and second flanges 210 and 122, when the second ring 200 is extended, i.e., moved to the second position P2, the second ring 200 can be prevented from being separated from the first ring 100. Moreover, when the second ring 200 is fully extended, as the first flange 210 is supported by the second flange 122, the second ring 200 can be rotated stably. Meanwhile, the second ring 200 may have a second flange 220 provided to the second edge adjacent to the fingertip T. Like the first flange 210, the second flange 220 can be extended in the inner radius direction of the second ring 200. Hence, when the second ring 200 is moved toward the knuckle K, i.e., retracted, the second flange 220 is caught on the first ring 100, and more particularly, on the second flange 122, whereby the second flange 220 can restrict the movement of the second ring 200 toward the knuckle K. Moreover, simultaneously, the first flange 210 is caught on the first flange 112, whereby the movement of the second ring 200 toward the knuckle K can be restricted more stably. Hence, by the engagement of the flanges, when the second ring 200 is retracted, i.e., moved to the first position P1, the second ring 200 can be disposed at an intended position accurately, thereby providing an aligned exterior as well as covering the display unit 15a.

Meanwhile, as aforementioned, since the outer circumference of the first ring 100 provides a bearding surface enough for a sliding of the second ring 200, the second ring 200 can be manually moved to the first position P1 or the second position P2. Namely, the second ring 200 can be manually extended or retracted. Yet, for user's convenience, the wearable smart device 10 may be configured to enable the second ring 200 to automatically move or return to the first position P1. As shown in FIGS. 6 to 8, the wearable smart device 10 may include an elastic member 130 disposed between the first and second rings 100 and 200. The elastic member 130 may be configured to have elasticity capable of storing energy enough to move the second ring 200 when deformed. Although various structures are applicable to the elastic member 130, a coil spring capable of facilitating deformation and storing sufficient energy may be used as the elastic member 130. Moreover, although the elastic member 130 of the coil spring may have a size occupying a portion of a space between the first and second rings 100 and 200, as shown, it may be configured to be wound on the whole outer circumference surface of the first ring 100. Thus, it is preferable that the overall wound elastic member 130 can store sufficient energy without occupying a considerable space.

As shown in FIG. 7 and FIG. 8, one end portion of the elastic member 130 may be engaged with the first ring 100, and more particularly, with the second flange 122. On the other hand, the other end portion of the elastic member 130 may be engaged with the second ring 200, and more particularly, with the first flange 210. Hence, when the second ring 200 makes a relative motion to the first ring 100, the elastic member 130 can be deformed. Particularly, when the second ring 200 is located at the first position P1, the elastic member 130 is installed in a non-deformed state. Hence, as shown in FIG. 8, when the second ring 200 is moved to expose the first display unit 15a, the elastic member 130 can be compressed. Namely, when the second ring 200 is moved to the second position P2, i.e., extended, the elastic member 130 can be compressed. Hence, if an external force applied to the second ring 200 is removed, the elastic member 130 returns to an original state and the second ring 200 engaged with the elastic member 130 can be also moved to the first position P1 to cove the first display unit 15a. Hence, according to such an auto-return mechanism, after exposing the first display unit 15a, the second ring can be configured to automatically return to cover the exposed first display unit 15a. Namely, the second ring 200 can be configured to automatically return to the first position P1 from the second position P2 and provide substantial convenience to a user. Meanwhile, since the second ring 200 is moved by a restoring force of the elastic member 130, it may collide with the first ring 100, and more particularly, with the first flange 112 when returning to the first position P1. Since such collision may cause vibration and noise to the first ring 100, it is not preferable. Hence, as shown in FIGS. 6 to 8, a shock absorbing member 230 may be provided to the first ring 100 or the second ring 200. In the related drawings, the shock absorbing member 230 is provided to the second ring 200, but may be provided to the first ring 100 to perform the same function. The shock absorbing member 230 may be installed at a portion of the second ring 200 coming into contact with the first ring 100 when the second ring 200 is located at the first position P1, i.e., when the second ring 200 covers the display unit 15a. Particularly, the shock absorbing member 230 may be installed at the first edge adjacent to the knuckle K of the second ring 200. As aforementioned, since the first flange 210 of the second ring 200 is formed on the first edge, the first flange 210, as shown, may be formed as a portion of the shock absorbing member 230. The shock absorbing member 230 may be formed of elastic material. Hence, when the second ring 200 returns to the first position P1 to cover the display unit 15a, i.e., when the second ring 200 is retracted, the shock absorbing member 230 can absorb the shock generated from coming into contact with the first ring 100. For such a reason, owing to the shock absorbing member 230, when the second ring 200 returns to the first position P1, noise or vibration is not generated and a user can conveniently use the wearable smart device 10.

Meanwhile, if a mechanism working in a manner contrary to the former description is applied, the second ring 200 can automatically move to the second position P2 from the first position P1. Namely, when the second ring 200 is located at the second position P2, the elastic member 130 is installed in a non-deformed state. If so, when the second ring 200 is moved (i.e., retracted) to the first position P2, the elastic member 130 is pulled. Hence, if an external force applied to the second ring 200 is removed, the elastic member 130 returns to an original state and the second ring 200 can be automatically moved (i.e., extended) to the second position P2. According to such an auto-extension mechanism, a user can use the wearable smart device 10 more conveniently.

Moreover, the wearable smart device 10 may include both of the auto return mechanism and the auto extension mechanism for user's convenience.

The second ring 200, which is extended by a frictional force between the outer circumference surface of the first ring 100 and the inner circumference surface of the second ring 200, may not be retracted unless there is an additional external force. Yet, if an unexpected external force works on the second ring 200, the second ring 200 may be unintentionally retracted. While a user is using the display unit 15a, if an unintended retraction of the second ring 200 occurs, it may cause considerable inconvenience. Particularly, if the aforementioned auto return mechanism is applied to the wearable smart device 10, in order for a user to continue to use the display unit 15a, an external force should be continuously applied to the second ring 200 to prevent the second ring 200 from being directly retracted. For such a reason, the wearable smart device 10 may further include a mechanism capable of holding the extended second ring 200 continuously. Namely, the holding mechanism may include a mechanism of restricting the second ring 200 extended to the second position P2 from moving toward the knuckle K again, i.e., restricting the second ring 200 from being retracted or returning to the first position P1.

In particular, as shown in FIG. 9 and FIG. 6, the first ring 100 may include a recess or groove 124 in prescribed size. The groove 124, as shown, may extend in a circumferential direction of the device 10 or the first ring 100. The grove 124 may be formed in any portion of the first ring 100 adjacent to the second ring 200. Preferably, since the second flange 122 is directly engaged with the second ring 200 despite being adjacent to the second ring 200, the groove 124 may be formed in the second flange 122. Moreover, the first ring 100 may have a stopper 125 in prescribed size. Like the groove 124, since the stopper 125 is provided for interworking with the second ring 200, it can be formed in the second flange 122. Furthermore, since the stopper 125 is configured to restrict the motion of the second ring 200 together with the groove 124, as described in the following, the stopper 125 can be provided within the groove 124. The stopper 125 may extend in a circumferential direction within the groove 124 but may not extend across the groove 124 overall. Namely, the stopper 125 partially closes the groove 124 and is able to form a channel within the groove 124 relatively. The second ring 200, as shown in FIG. 9, may include a rib 222 formed on an inner circumference surface of the second ring 200. The rib 222 extends in a direction across the circumferential direction, i.e., a direction of a center axis of the device 10 or the second ring 200 vertical to the circumferential direction.

The rib 222, as shown in FIG. 9 (a), can be inserted in the groove 124, and more particularly, in the channel formed by the stopper 125 in the groove 124. When the second ring 200 moves, the rib 222 can slide by being guided by the first ring 100, and more particularly, by the groove 124 or a channel within the groove 124. Hence, the restriction or holding mechanism may guide the motion of the second ring 200 stably as well as the originally intended function. If the second ring 200 is fully extended, i.e., after the second ring 200 has been located at the second position P2, as shown in FIG. 9 (b), the second ring 200 can be rotated at a prescribed angle in a first direction. In the drawing, the first direction may include a counterclockwise direction. If the second ring 200 is rotated, the rib 222, and more particularly, one end portion of the rib 222 is caught on the stopper 122 and the extended second ring 200 is then held at the second position P2. Thus, the movement or retraction of the second ring 200 to the first position P1 may be restricted. If a user desires to cove the display unit 15a again, the second ring 200 may be rotated in a second direction opposite to the first direction. In the drawing, the second direction may include a clockwise direction. Once the second ring 200 is rotated in the second direction, the rib 22 is released from the stopper 125 and is then able to move along the groove 125. Namely, the second ring 200 can be moved or retracted to the first position P1 together with the rib 222. In case that the aforementioned auto return mechanism is applied to the wearable smart device 10, if the second ring 200 is rotated in the second direction, the second ring 200 can be automatically moved or retracted to the first position P1. In order to perform the same function, the rib 222 may be formed in the first ring 100 instead of the second ring 200 and the groove 124 and the stopper 125 may be formed in the second ring 200 instead of the first ring 100 as well. Hence, when the second ring 200 is located at a position for exposing the display unit 15a, i.e., when the second ring 200 is moved to the second position P2, one of the first ring 100 and the second ring 200 may include a rib 222 configured to be caught on the other. By such a restriction or holding mechanism, the second ring 200 may be configured to continue to maintain the position of exposing the display unit 15a, i.e., the second position P2. Hence, a user can extend the second ring 200 for a desired time or use the display unit 15a conveniently.

Meanwhile, if the second ring 200 is not extended, the display unit 15a is not exposed. Hence, it may be difficult for the wearable smart device 10 to inform a user of an operational state of the wearable smart device 10 in direct. Hence, the wearable smart device 10, as shown in FIG. 2, may include an indicator 15d for displaying such an operational state. The indicator 15d corresponds to the optical output unit 15d described in FIG. 1, and, as shown in FIG. 6 and FIG. 10, may include a light source 15h emitting light. As the light source 15h, various elements are usable. And, an LED (light emitting diode) emitting bright light despite having a small size is applicable to the wearable smart device 10. The light source 15h may be installed on the circuit board 13 so as to be controlled by the controller 18, thereby being installed in the first ring 100 together with the circuit board 13. Moreover, the light source 15h may include a single light source emitting light in a single color. Or, the light source 15h may include a single light source emitting lights in multiple colors or a multitude of light sources respectively emitting lights in a multitude of colors.

The indicator 15d may include a light guide part 15g configured to guide the light of the light source 15h to an outside of the first ring 100, and more particularly, to an outside of the wearable smart device 10. The light guide part 15g may have a body adjacent to or coming into contact with the light source 15h. Moreover, the light guide part 15g, as well shown in FIG. 10, can be exposed to an outside of the first ring 100 by starting from the light source 16h. In order to expose the light guide part 15g, the first ring 100 includes a recess or opening 126. And, the light guide part 15g is inserted in the opening 126. The opening 126 may be formed in a front portion of the first ring 100, and more particularly, in the second flange 122 or an extension portion of the second flange 122 in order to enable the indicator 15d to be well seen by a user. Moreover, although the light guide part 15g is exposed from the first ring 100, it is blocked by the second ring 200 so as not to be well seen by a user. Hence, the second ring 200 may include a bedding part 221 configured to accommodate the light guide part 15g. The exposed light guide part 15g may further extend so as to be further projected from the first ring 100. And, the projected light guide part 15g may be received in the bedding part 221. Hence, when the second ring 200 is retracted or moved to the first position P1, i.e., when the display unit 15a is covered with the second ring 200, the light guide part 15g projected from the first ring 100, i.e., the indicator 15d, as shown in FIG. 2 and FIG. 5 (a), can be externally exposed from the second ring 200 so as to be well seen by a user. If the light source 15h emits light, the emitted light, as denoted by an arrow in FIG. 10, may be guided to an outside of the second ring 200 or the wearable smart device 10 along the light guide part 15g in sequence. Hence, a user can be conveniently aware of a state of the wearable smart device 10 by the light from the indicator 15d when the display unit 15a is covered. As aforementioned, since the light source 15h can emit lights in various colors and project light in various ways such as flickering, always-on, and the like, the light source 15h can inform a user of various operational states. For example, the indicator 15d may inform a user of a message reception, a call signal reception, a missed call, an alarm, a schedule indication, an email reception, an information reception through application, and the like. Meanwhile, if the second ring 200 is extended or moved to the second position P2, as shown in FIG. 4 and FIG. 5 (b), the indicator 15d may be blocked by the second ring 200. Yet, as the display unit 15a is exposed, the wearable smart device 10 can inform a user of an operational state in detail using the display unit 15a.

Figure 11:
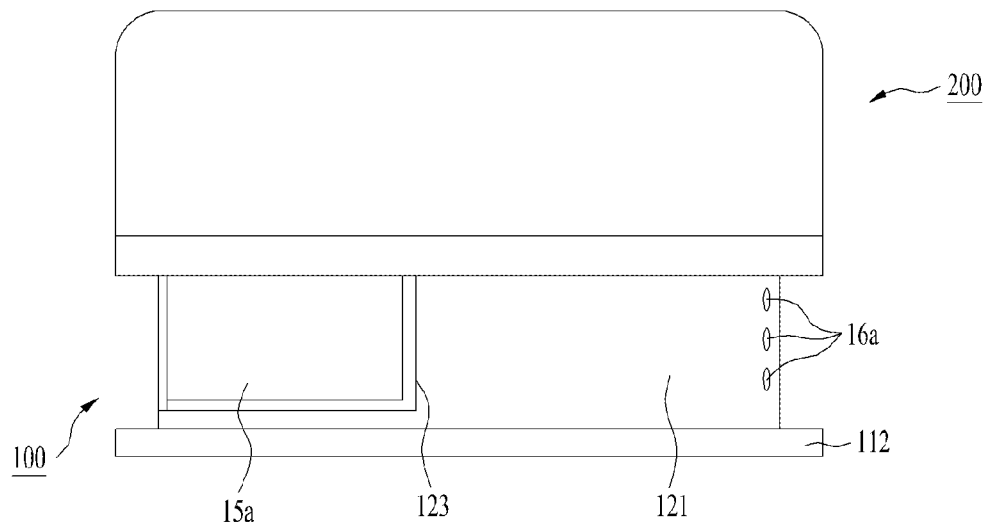
FIG. 11 is a lateral view diagram showing a terminal of a wearable smart device.

The wearable smart device 10 may communicate by wireless or be supplied with power by wireless. Yet, if a wireless environment is not provided, the device 10 should be connected externally by wire for an appropriate operation. Hence, as shown in FIG. 6 and FIG. 11, the device 10 can include the terminal 16a corresponding to the interface unit 16. The terminal 16a plays a role as a passage to all external devices connected to the wearable smart device 10. The terminal 16a receives data from an external device, is supplied with power, delivers the supplied power to the respective components in the device 10, and enables data in the device 10 to be transmitted to the external device. Since the circuit board 13 and the battery 19a are installed in the first ring 100, as shown in FIG. 10, the terminal 16a is installed in the first ring 100, and more particularly, in the body 121 of the first ring 100 and can be electrically connected to the adjacent circuit board 13 and the battery 19a. Hence, when the second ring 200 is extended or moved to the second position P2, i.e., when the display unit 15a is exposed, the terminal 16a may be externally exposed as well. For such a reason, in order for the device 10 to be connected to the power source or an external device, the second ring 200 can be extended to expose the terminal 16a.

Figure 12:
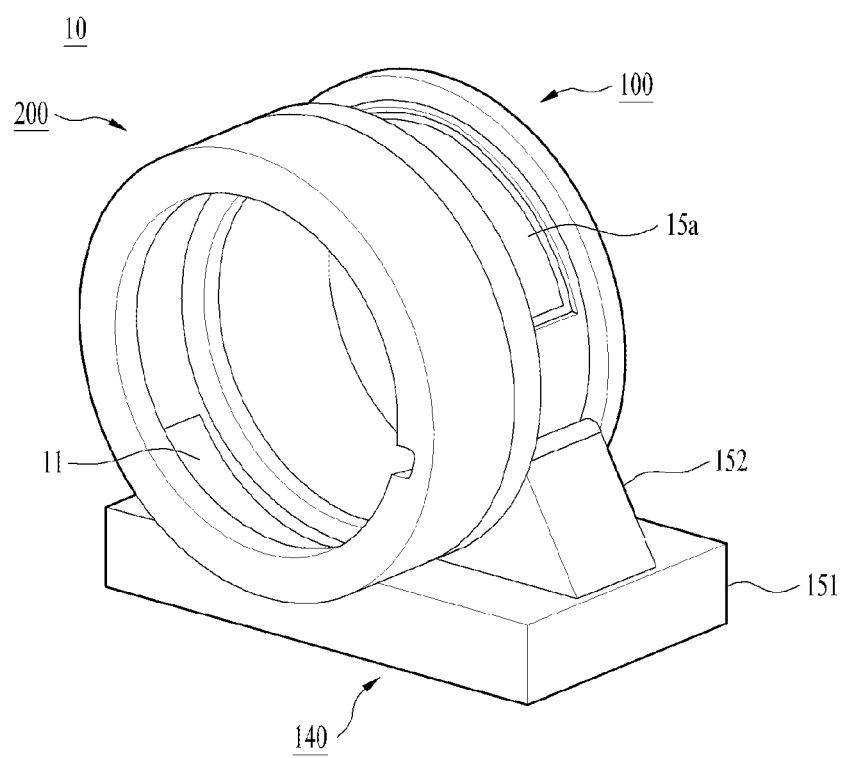
FIG. 12 is a perspective diagram showing a wearable smart device seated in a cradle.

Moreover, as an accessory of the wearable smart device 10, as shown in FIG. 12, a cradle 150 may be provided. The cradle 150 may include a base 151 placed on a floor and a supporter 152 provided on the base 151. The supporter 152 may be configured to support the wearable mart device 10. In particular, the device 10 is supported by the cradle 150 in a state that the second ring 200 is extended to expose the terminal 16a. Hence, the supporter 152 may have a shape (i.e., a curved surface) matching the outer circumference surface of the first ring 100 including the terminal 16a, thereby supporting the device 10 stably. The supporter 152 may include a terminal connected to the terminal 16a, and the supporter 152 or the base 151 may include a terminal connected to an external power source or an external device. Hence, the terminal 16a may become a passage for supplying a power to the device 10 through the cradle 150 when the device 10 is connected to the cradle 150. And, the terminal 165a may become a passage for forwarding various command signals inputted to the cradle 150 by a user to the device 10. For such reasons, the cradle 150 enables a user to use the wearable mart device 10 more conveniently.

Figure 13:
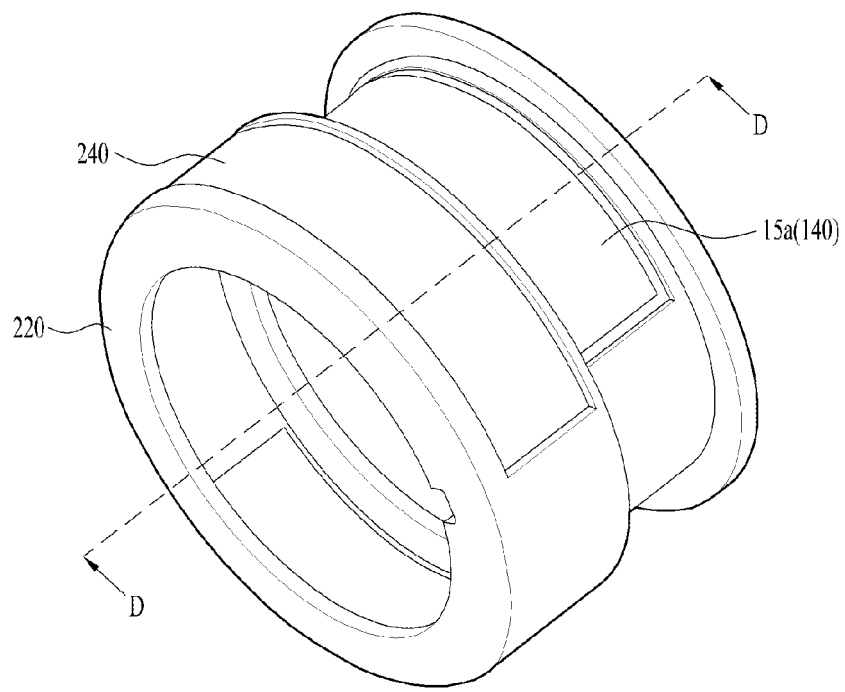
FIG. 13 is a perspective diagram showing a wearable smart device including an additional display unit.

As aforementioned, the second ring 200 may not have a display unit to be used as a substantial ring. Instead, in order to provide a function as a smart device, the display unit 15a of the first ring 100 can be selectively exposed in response to a relative motion of the second ring 200. Yet, a function as a smart device can be considered more important than a function as an accessory, depending on user's preference. Hence, as shown in FIG. 13, the wearable mart device 10 may include an additional display unit 240 disposed in the second ring 200. Here, if the display unit 15a of the first ring 100 is referred to as a first display unit, the additional display 240 of the second ring 200 may be named a second display unit. For clarity of the description, a reference number of the first display unit 15a can become '140' to be associated with a reference number of the second display unit 240. Hence, unless there is a specially opposed description, the reference number of the first display unit can become '15a' and '140' both.

Figure 14:
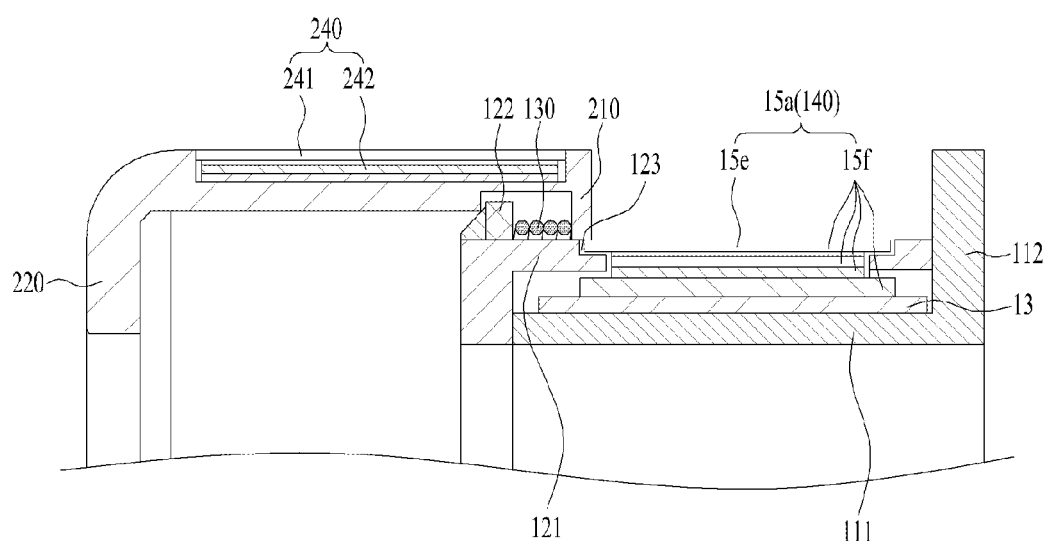
FIG. 14 and FIG. 15 are cross-sectional diagrams obtained along a line D-D of FIG. 13.

The second display unit 240, as shown in FIG. 14, is disposed on an outer circumference of the second ring 200. Like the opening 123 of the first ring 100, a similar opening may be formed in the second ring 200, and the second display unit 240 can be installed in such an opening. The second display unit 240 includes a window 241 and a display module 242 like the window 15e and the module 15f of the first display unit. Thus, since the installation and structure of the second display unit 240 are identical to those of the first display unit 15a, the drawings and descriptions related to the first display unit 15a are included in those on the second display unit 240 unless mentioned differently. The second display unit 240 may be controlled by the controller 180 together with the first display unit 15a. Hence, the second display unit 240 can be connected to the circuit board 13 disposed in the first ring 100 in various ways. For example, the second display unit 240 can be directly connected to the circuit board 13 by wires installed not to interrupt the motion of the second ring 200 [not shown].

While the wearable mart device 10 is operating, when the first display unit 15a is exposed, the second display unit 240 may be configured to provide a screen (i.e., a content) connected to a screen (i.e., a content displayed on the first display unit 15a) of the first display unit 15a. Namely, when the second ring 200 is extended, the second display unit 240 can configure a single screen together with the first display unit 15a, thereby showing a single content to a user. For example, a single application, photo, video or the like can be displayed across the mutually-connected screens of the first and second display units 15a and 240. Hence, the wearable mart device 10 substantially has an extended display unit, thereby providing more contents to a user conveniently. If the first display unit 15a is covered, i.e., if the second ring 200 is retracted, the second display unit 240 may be configured to provide a screen independent from the screen of the first display unit 15a. Namely, since the first display unit 15a is not viewable by a user, the second display unit 240 can show an independent content in response to an instruction of the controller 18. Hence, a user may confirm various states of the device 10 without extending the second ring 200 and instruct additional operations in direct. When a separate application is running, a screen of the application may be displayed on the second display unit 240 only. Meanwhile, if the first display unit 15a is exposed, i.e., if the second ring 200 is extended, the second display unit 240 can directly provide a screen and content connected to a screen of the first display unit 15a. Considering such an operation, the second display unit 240 can selectively provide a screen and content connected to the screen of the first display unit 15a depending on whether the first display unit 15a is exposed. On the other hand, although the first display unit 15a is exposed, i.e., although the second ring 200 is extended, the second display unit 240 can be configured to provide a screen and content independent from the screen of the first display unit 15a. Namely, the second display unit 240 can show a photo while the first display unit 15a shows a screen of an application. Hence, the second display unit 240 may selectively provide a screen and content connected to or independent from a screen and content of the first display unit 15a irrespective of whether the first display unit 15a is exposed, whereby the wearable mart device 10 can have expandability capable of performing various functions together.

Figure 15:
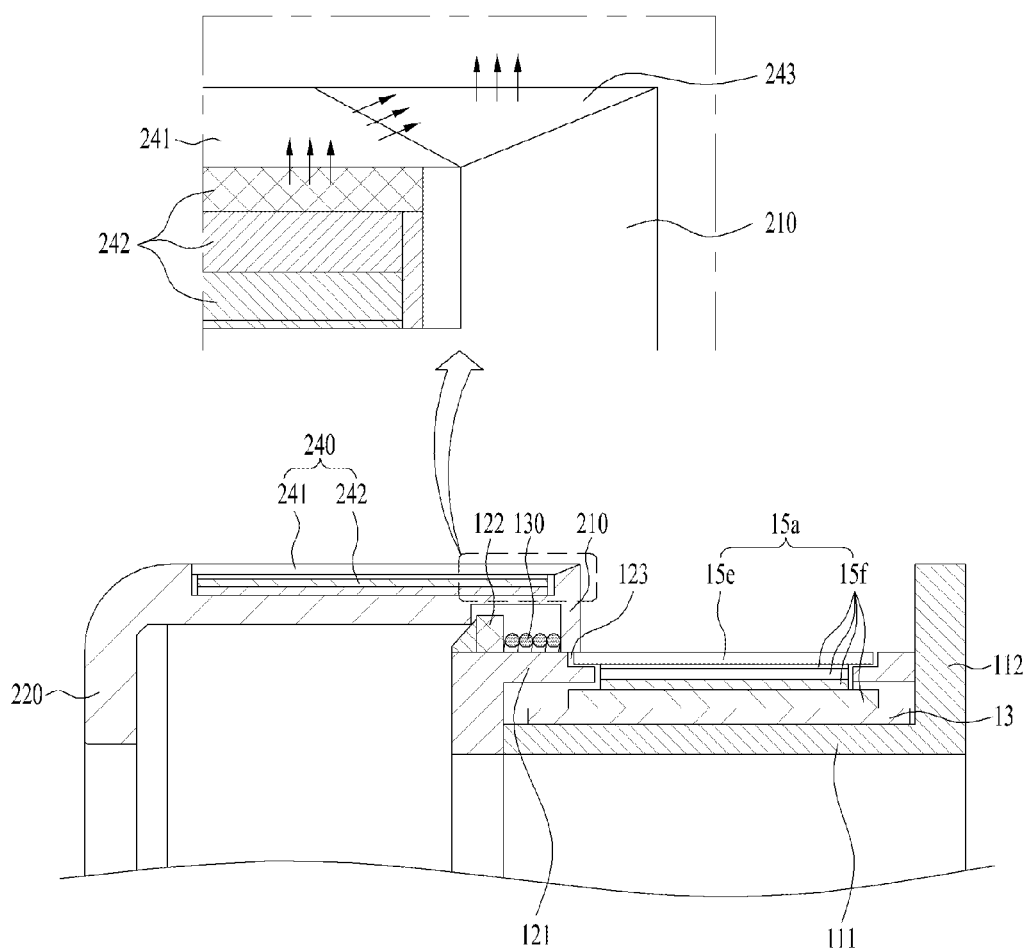

Since the second ring 200 encloses the wearable mart device 10 to support stably, as shown in FIG. 13 and FIG. 14, a portion of the second ring 200 may be inserted between the first display unit 15a and the second display unit 240. Hence, although the second display unit 240 can provide a screen connected to a content of the first display unit 151a, the screens of the display units 15a and 240 may be visually separated from each other due to the inserted portion of the second ring 200. In order to implement a visually connected screen, the second display unit 240 can extend to the first edge adjacent to the knuckle K of the second ring 200 in FIG. 14 without the inserted portion of the second ring 200. Yet, such extension enables a portion of the second display unit 240 to be exposed without being protected by the second ring 200. For such a reason, as shown in FIG. 15, the second display unit 240 may further include an extension part 243 configured to visually connect a screen of the second display unit 240 to the first display unit 15a.

The extension part 243, as shown, may be basically disposed adjacent to the first display unit 15a to provide a connected screen. In particular, the extension part 243 may be disposed between adjacent edges of the first and second display units 15a and 240, and more particularly, on a portion of the second ring 200 inserted between the edges. The extension part 243 may be connected to the edge of the second display unit 240 adjacent to the first display unit 15a. Yet, the extension part 243 is not connected to the whole edge of the second display unit 240 but may be substantially connected to the window 241 only for the visual connection only instead. Hence, despite having the extension part 243, the second display unit 240, as shown, can be still enclosed by the second ring 200. Namely, the module 242, which is the sensitive part except the basically exposed window 241, can be still protected by the second ring 200. Moreover, the extension part 243 structurally extends toward the adjacent edge of the first display unit 15a from the second display unit 240 and may extend to the first edge of the second ring 200 adjacent to the knuckle K. since the first edge of the second ring 200 is aligned with the edge of the first display unit 15a, the second display unit 240 can be seen to a user as if extending to the first display unit 15a owing to the extension part 243 extending to the first edge. Namely, when the second ring 200 is extended, since the extension part 243 fills the gap between the first and second display units 15a and 240, the first and second display units 15a and 240 may be seen to a user as if structurally connected to each other.

The extension part 243 has a prism structure and is configured to disperse incident lights correspondingly.

Hence, a screen outputted from the module 242 enters the extension part 243 through the window 241 and can be then dispersed in the extension part 243. By such dispersion, a screen of the second display 240 can be viewed as if displayed on the extension part 243. Namely, the extension part 243 can substantially extend the screen of the second display unit 240. Together with such a screen extension, as aforementioned, the extension part 243 is disposed in a plane different from that of the first display unit 15a but extends to the first display unit 15a structurally. Hence, the screen of the second display unit 240 can be visually connected to the screen of the first display unit 15a by the extension part 243, and a user is able to conveniently use the wearable smart device 10.

Figure 16:
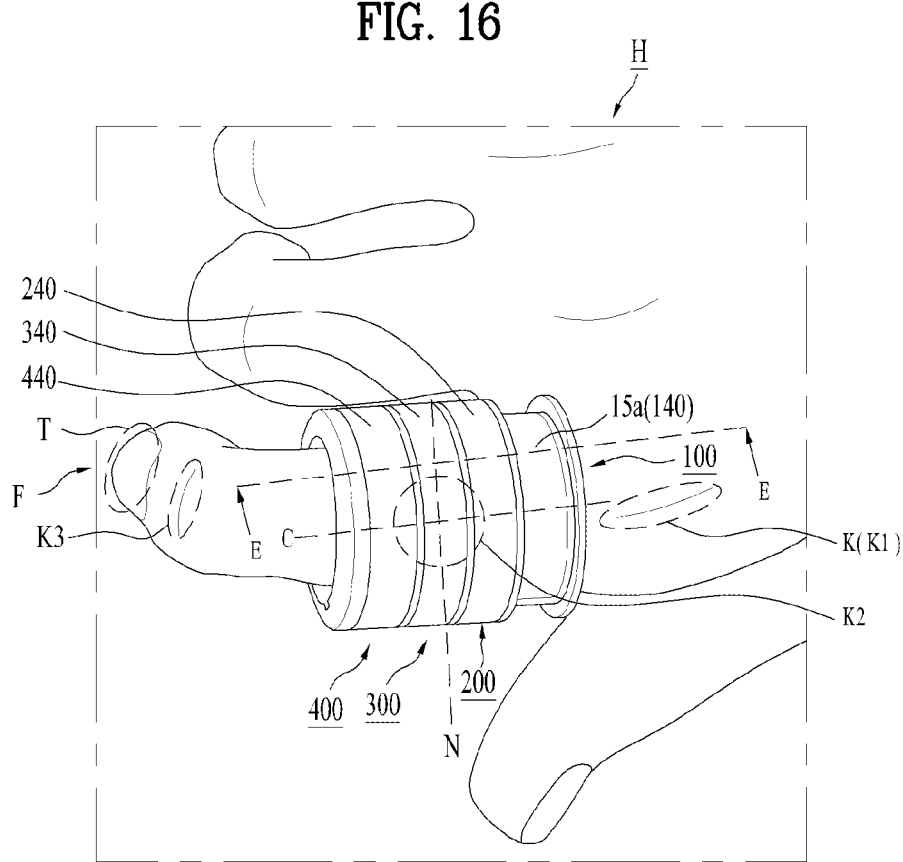
FIG. 16 is a perspective diagram showing a wearable smart device including a multitude of extended rings.
Figure 17:
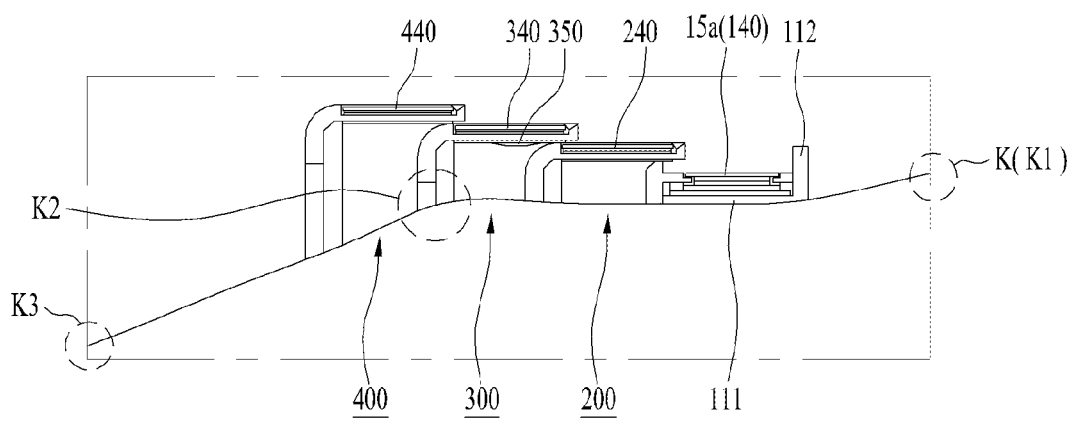
FIG. 17 is a cross-sectional diagram obtained a line E-E of FIG. 16.

Furthermore, in order to provide further improved functions as a smart device, considering the limited structures of the first and second rings 100 and 200, i.e., limited sizes and spaces thereof, it is necessary for the wearable smart device 10 to be further extended structurally. Hence, as an additionally extended structure, the wearable smart device 10, as shown in FIG. 16 and FIG. 17, may include additional rings 300 and 400. Although the drawings show 2 additional rings 300 and 400, the wearable smart device 10 may include more additional rings. The additional rings 300 and 400 are provided to the second ring 200 and coupled to the second ring 200 telescopically. Moreover, the additional rings 300 and 400 may be coupled with each other telescopically. Since the second ring 200 is telescopically coupled with the first ring 100, the additional rings 300 and 400 are telescopically coupled with the first ring 100 together with the second ring 200. Furthermore, the first, second and additional rings 100 to 400 may be described as telescopically coupled together overall. Considering the mutually identical coupling relation, the additional rings 300 and 400 may be sequentially called a third ring 300 and a fourth ring 400, respectively, in continuation with the first ring 100 and the second ring 200. And, such names continue to apply to the following description. Moreover, considering a structural disposition, the first ring 100 may be described as an inner ring. With respect to the first ring 100, the second to fourth rings 200 to 400 may be described as outer rings. Furthermore, considering the telescopic relation, the first ring 100 may be represented as a main ring and the second to fourth rings 200 to 400 may be represented as stages. Hence, the first to fourth rings 100 to 400 can be replaced by the above terms.

Figure 18:
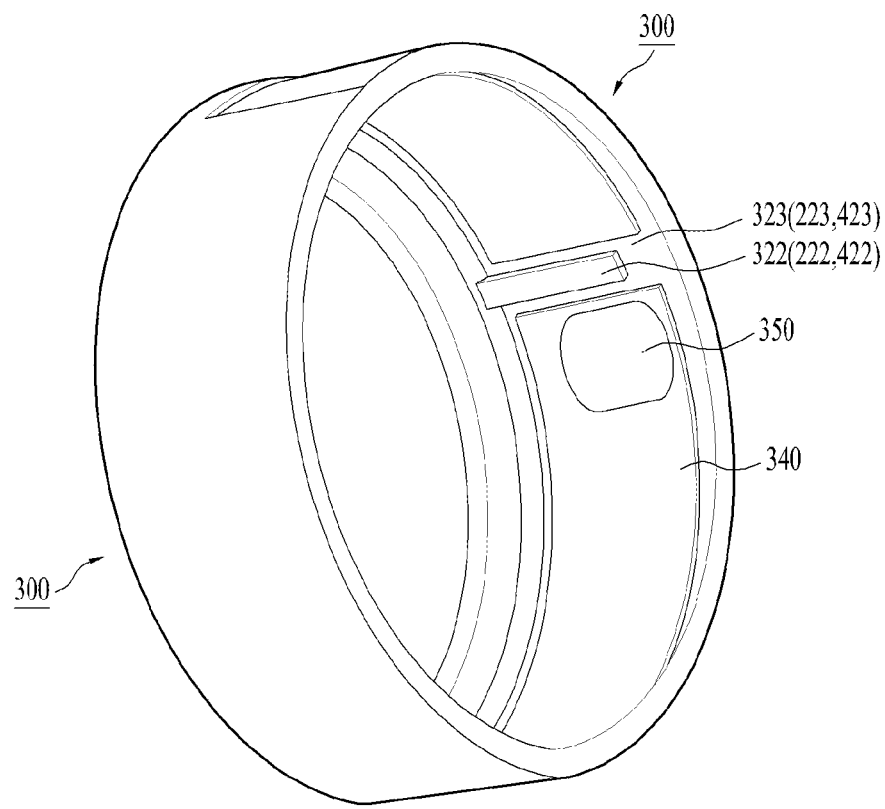
FIG. 18 is a perspective diagram showing one of additional rings of a wearable smart device.

In particular, the first to fourth rings 100 to 400 can be configured to have progressively bigger diameters for relative motions to adjacent rings, respectively. Hence, one ring can be slidably fitted into another adjacent ring. Namely, when the wearable smart device 10 is extended, the second to fourth rings 200 to 400 may get far away from the first ring 100 gradually. As the relative motions of the adjacent rings according to the telescopic coupling are already described in association with the first and second rings 100 and 200, such description identically applies to the motions of the third and fourth rings 300 and 400 and additional description shall be omitted from the following description. Likewise, the detailed coupling structure of the first and second rings 100 and 200 is identically applicable to the third and fourth rings 300 and 400. For example, as shown in FIG. 18 that illustrates the third ring 300 in detail, the rib 222 of the second ring 200, which guides the relative motion to the adjacent ring (e.g., first ring) and maintains the extended state, can be identically provided as ribs 322 and 422 of the third and fourth rings 300 and 400. Therefore, the description and drawings related to the coupling structure of the first and second rings 100 and 200 are included in the description and drawing of the third and fourth rings 300 and 400. Consequently, the wearable smart device 10 can have a further extended structure owing to the additional third and fourth rings 300 and 400 and maintain a small size conveniently wearable if retracted by the telescopic coupling among the rings 100 to 400.

Moreover, for the same reason of the aforementioned second display 240, in order to provide a further extended function, the wearable smart device 10 may have third and fourth display units 340 and 440 disposed in the third and fourth rings 300 and 400, respectively. Since the second to fourth display units 240 to 440 have considerably large sizes, the second to fourth rings 200 to 400 can have considerably large openings to accommodate them. Unlike the first ring 100 having a dual-structured body, a body of each of the second to fourth rings 200 to 400 includes a single piece, structural rigidity may be reduced due to the openings. In order to reinforce the structural rigidity, as shown in FIG. 18, the second to fourth rings 200 to 400 may include auxiliary ribs 223, 323 and 423 configured to support the second to fourth display units 240, 340 and 440 by extending across the openings, respectively. Besides, since other structures, e.g., the self-structures of the display units and the extension part 243 are identically applicable to the third and fourth rings 300 and 400 and the display units 340 and 440 thereof, additional description shall be omitted from the following. Moreover, except the aforementioned relative motion, coupling structure and display unit related structures, all other structures and features described for the first and second rings 100 and 200 are applicable to the third and fourth rings 300 and 400. Therefore, unless specially mentioned to the contrary, the description and drawings for the first and second rings should be regarded as included in the description and drawings for the third and fourth rings 300 and 400.

Figure 19:
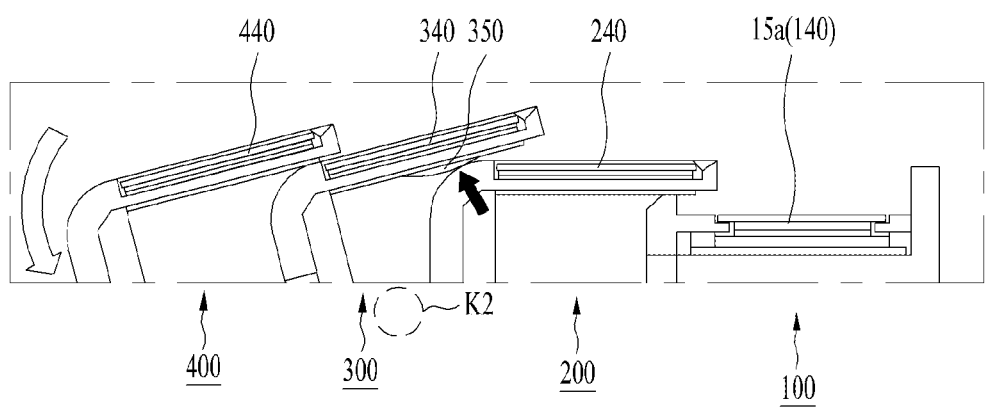
FIG. 19 is a perspective diagram showing a turning of a wearable smart device

As the aforementioned third and fourth rings 300 and 400 are additionally included, when the wearable smart device 10 is fully extended, i.e., when the second to fourth rings 200 to 400 are extended all, the device 10 has a considerably long length. As shown in FIG. 16 and FIG. 17, the device 10 can be extended over the second knuckle K2 toward a tip T of a finger F of a user. Moreover, the second to fourth rings 200 to 400 have diameters gradually increasing in size, respectively. And, a clearance in a radial direction may be provided between such rings. Hence, each of the rings 200 to 400 can be moved together with the user's finger F flexed relatively to the adjacent ring. For example, as shown in FIG. 19, when a section of the user's finger F is flexed on the adjacent second knuckle K2, the third ring 300 can be moved relatively to the second ring 200 together with the flexed finger, and more particularly, the flexed section thereof. Namely, one of the second and third rings can be turned together with the finger F flexed on an adjacent ring. The number of moved or turned rings may vary depending on a flex level of the finger F. Once the finger F is flexed, at least one ring can be moved or turned together. Depending on a flexed level of the finger F, two or more rings can be simultaneously moved or turned.

In particular, since the turned ring has a changed orientation for an unturned ring, when the finger F is turned, the orientation of at least one of the second to fourth rings may be changed against another ring. Namely, the orientation of one of the second to fourth rings may be different from that of another ring. Moreover, considering the geometric relation of the wearable smart device 10, when the finer F is turned, at least one of the second to fourth rings may be configured to be pivoted centering on an axis N (cf. FIG. 16) vertical to the center axis C of the wearable smart device 10 or the rings.

Such a turning corresponds to a featured (or unique) motion of the wearable smart device 10 and is enabled by the distinctive structure of the aforementioned device 10. Hence, using the motion, the wearable smart device 10 can provide the improved manipulability capable of providing various functions to a user. Meanwhile, in order to give a prescribed instruction to the wearable smart device 10 directly according to the turning motion, as shown in FIGS. 17 to 19, the device 10 may include a switch 350 configured to be pressed when one of the second to fourth rings is turned. When one of the second to fourth rings 200 to 400 is turned by a flex of the finger F, the corresponding ring may include a switch 350 configured to be pressed by another ring adjacent to the turned ring, i.e., by a ring located relatively inside. For example, the switch 350 is provided to an inner circumference surface of the third ring 300 and may be disposed adjacent to a ring, which is adjacent when the third ring 300 is extended, and more particularly, to an edge (specifically, the second edge) of the second ring 200 that is the ring located relatively inside. Hence, as shown in FIG. 19, when the third ring 300 is turned in response to the flex of the finger F, the switch 350 may be pressed, as indicated by an arrow, by the adjacent second ring 200 or the edge thereof. The switch 250 may include one of switches of various types. Typically, the switch 250 may include a dome switch. Although the switch 350 is described above in association with the third ring 300, it can be identically provided to each of the second and fourth rings 200 and 400 and have the same structure likewise. By applying such a switch 350, the wearable smart device 10 can control its operation through the turning motion more quickly and directly.

As appearing in the former drawings and description all, the wearable smart device 10 of the present application has an exterior improved by a mechanism enabling a selective exposure of the display unit 15a and is also able to provide sufficient functions as a smart device. Moreover, if necessary, the wearable smart device 10 includes an additional structure, thereby providing further expanded functionality to a user.

Meanwhile, the improved exterior and the various functions can be primarily achieved by the aforementioned structure of the wearable smart device 10. Yet, in order for such an intended technical object to be achieved more particularly, the device 10 needs to be supported by an appropriate control in consideration of the structure and property thereof. In implementing a function, the wearable smart device 10 is basically accompanied by interaction with a user. Hence, through the optimization of various controls including a user environment and a user interface, the aforementioned technical objects, and more particularly, provision of various functions can be achieved effectively and efficiently and user experience (e.g., use facilitation, use convenience, etc.) on the wearable smart device 10 can be improved remarkably. Namely, the optimal control can considerably increase the product value of the wearable smart device 10. According to the additional technical intention, a method of controlling the wearable smart device 10 shown in FIGS. 1 to 19 has been developed and shall be described with reference to the drawings additionally related to FIGS. 1 to 19 as follows.

For clarity of the following description of a control method, the first ring 100 is called a main ring. The second to fourth rings 200 to 400 are called first to third outer rings or first to third stages, respectively. As already described in association with FIGS. 1 to 19, the above terms are interchangeable in the structural aspect of the wearable smart device 10. Hence, according to the use of such new terms, in the control method, the wearable smart device 10 may be defined as a main ring 100 directly worn on a user and a multitude of outer rings coupled with the main ring 100 telescopically. And, the first to third outer rings 200 to 400 can be telescopically coupled with each other as well. Hence, the main ring 100 and the first to third outer rings 200 to 400 mutually have the telescopic relation overall. In particular, the first to third outer rings 200 to 400 have diameters gradually increasing in size. If the device is fully extended, the first to third outer rings 200 to 400 gradually get away from the main ring 100. Yet, first or fourth display units are maintained for the display units 140 to 440. Hence, the main ring and the first to third outer rings 200 to 400 can have the first to fourth display units 140 to 440, respectively. Except the change of the terms for the rings 100 to 400, all structural features are identical. Hence, unless there is a specially opposed description, FIGS. 1 to 19 and the descriptions thereof are basically included in and referred to for a description and drawings of a control method as follows.

Figure 20:
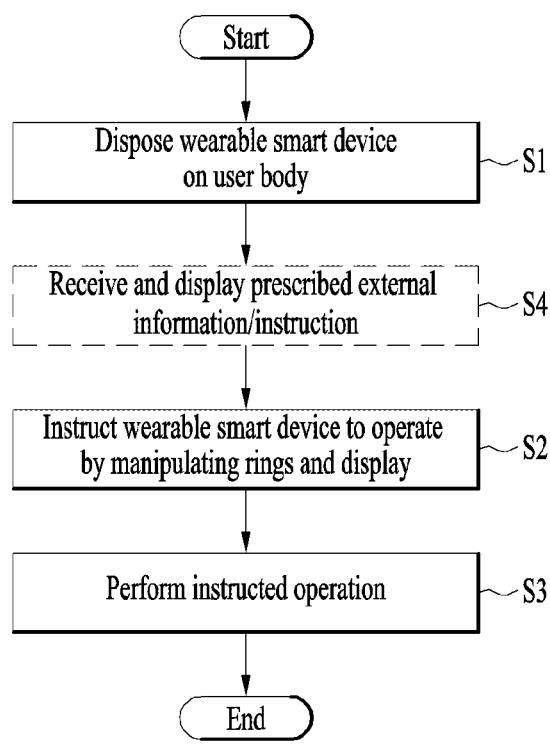
FIG. 20 is a flowchart schematically showing a method of controlling a wearable smart device related to the present invention.

FIG. 20 is a flowchart schematically showing a method of controlling a wearable smart device related to the present invention. Prior to a detailed control of the wearable smart device 10, a general control is described first with reference to FIG. 20 as follows.

First of all, in order to use the wearable smart device 10, a user can dispose the device 10 on a body of the user [S1]. Since the wearable smart device 10 described in the present specification has a ring shape overall, the user can wear the device 10 on a finger F (cf. FIGS. 21 to 24). As shown in the accompanying drawings, the control method is described with reference to the wearable smart device 10 worn on the user's finger F. Yet, if the wearable smart device 10 is simply increased in size, it can be worn on a user's wrist as well. Moreover, by changing a shape slightly without altering a basic structure and operation principle, the wearable smart device 10 can be worn on other body parts instead of finger or wrist. Meanwhile, a user may use the wearable smart device 10 by grabbing the wearable smart device 10 with a hand instead of wearing it on user's body. Hence, the disposing step S1 includes all types of contacts between a user and the device 10 to use the wearable smart device 10. And, control methods described in the following are applicable to all types (e.g., wearing on user's finger F) of dispositions on or contacts with user's body After the disposing step S1, the user can instruct a desired operation to the wearable smart device 10 [S2]. The device 10 can implement various functions satisfying user's needs, as described later, and such functions can be achieved by the linked operation of prescribed components of the device 10. Hence, a user can input a prescribed instruction to the wearable smart device 10 for the execution of an operation for an intended function, whereby the instructing step S2 may become a most basic step in function implementation, and more particularly, in control. In particular, in the instructing step S2, the user can manipulate the device 10, e.g., the input unit to give instruction for example. Such a manipulation may generate a prescribed electrical signal. And the electrical signal may be inputted to the controller 18. The device 10 may receive such an electrical signal as an instruction for an intended operation. Hence, the instructing step S2 may be described as the device 10 receives an instruction of a desired operation by a manipulation of the input unit of the device 10. For such reason, despite absence of separate description in the following description of the control method, all the mentioned instructing steps S2 should be interpreted and regarded as a step for the device 10 to receive an instruction of a desired operation.

After the instructing step S2, the wearable smart device 10 can perform the instructed operation. In particular, a user's instruction is inputted to the device 10, and the corresponding components perform the instructed operation according to the inputted instruction. Hence, an intended function can be finally provided by the wearable smart device 10.

The instructing step S2 may be basically based on an input according to user's intention or will for a prescribed function. On the other hand, a request or instruction for an operation of the wearable smart device 10 may be inputted from a network or another device. Hence, according to the control method, a prescribed information or instruction can be received from an external network or another device [S4]. According to the instruction inputted in the receiving step S4, the wearable smart device 10 can perform the corresponding operation. Moreover, the information received in the receiving step S4 may be displayed on the device 10, and more particularly, on the display units 140 to 440 to be shown to a user. Since the wearable smart device 10 works as an information processing device for communicating externally and display a result of the communication, the displaying step S4 may become one of major functions of the device 10 independently.

Figure 21:
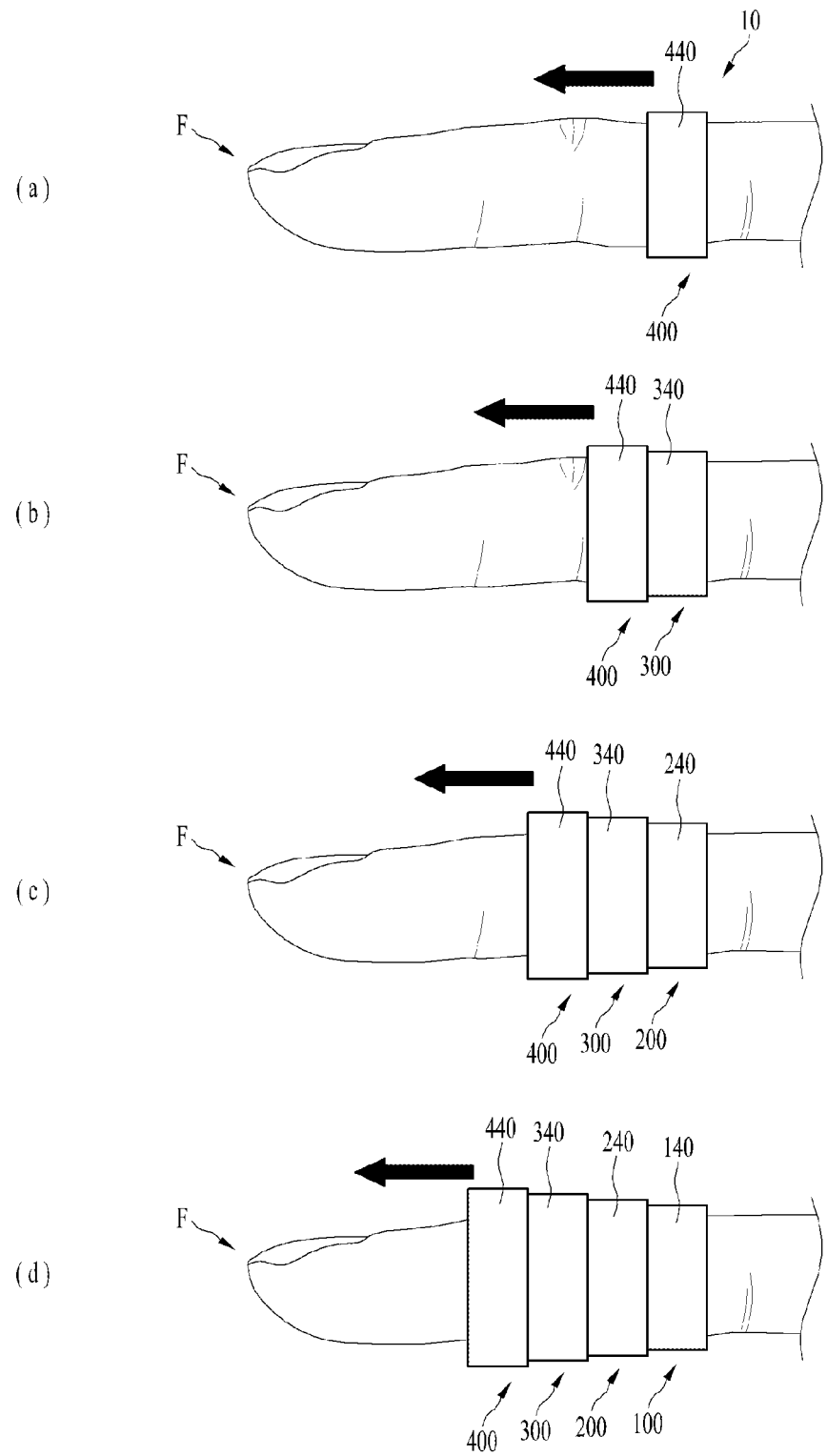
FIG. 21 is a schematic diagram showing steps of indicating an operation using extensions of outer rings of a wearable smart device.
Figure 22:
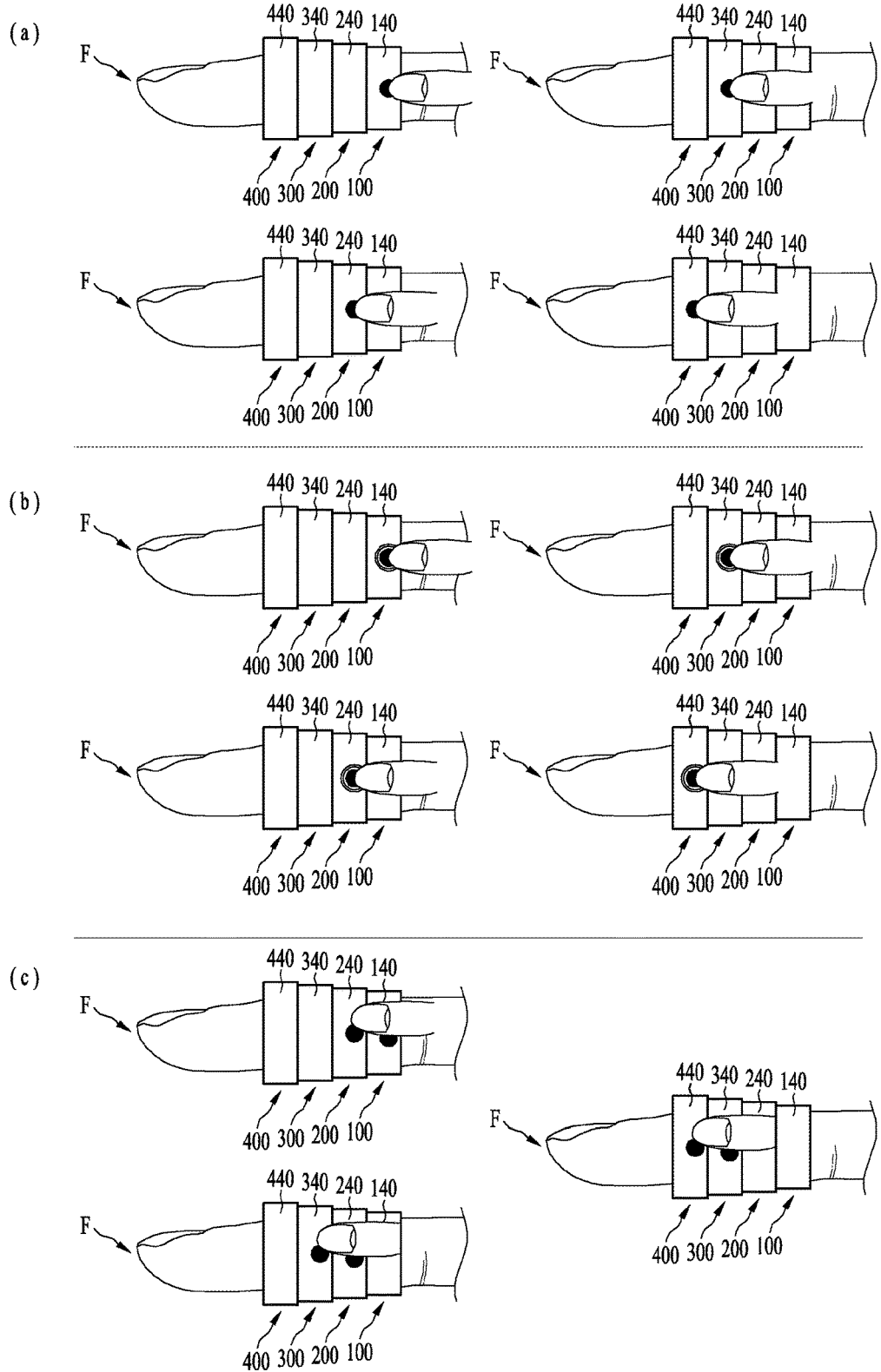
FIG. 22 is a schematic diagram showing steps of instructing an operation using display units of a wearable smart device.
Figure 23:
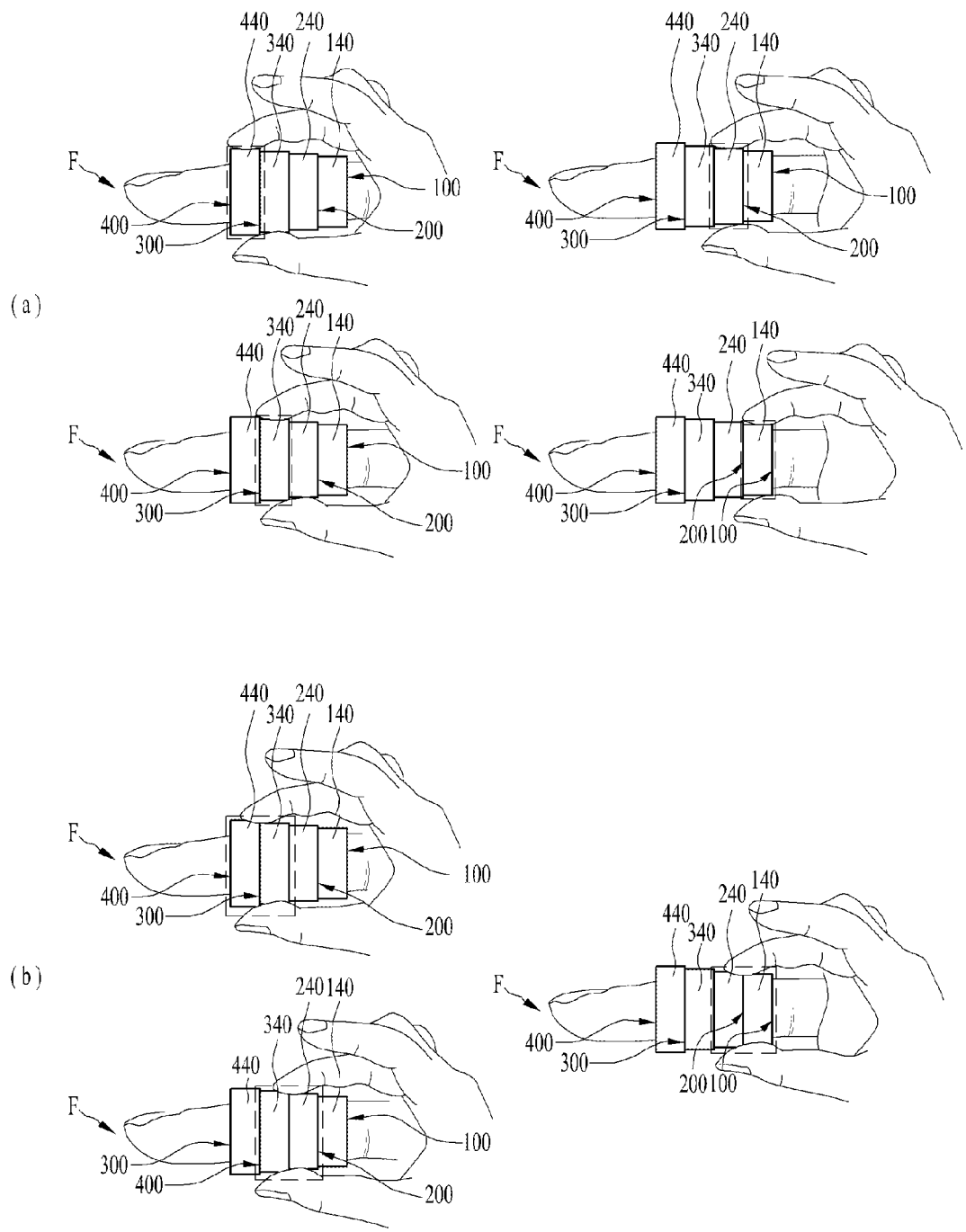
FIG. 23 is a schematic diagram showing steps of instructing an operation using rotations of outer rings of a wearable smart device.

Meanwhile, in order to perform the instructing step S2, as aforementioned, a user can manipulate the mechanical components of the wearable smart device 10. In particular, the rings 100 to 400 and display units 140 to 240 of the device 10 can be used by a user to input an instruction to the device 10. Hence, the instructing step S2 using the rings 100 to 400 and the display units 140 to 240 may be interpreted and regarded as a step of receiving an instruction of a desired operation in the device 10 by manipulations of the rings 100 to 400 and the display units 140 to 240. FIG. 21 is a schematic diagram showing steps of indicating an operation using extensions of outer rings of a wearable smart device. FIG. 22 is a schematic diagram showing steps of instructing an operation using display units of a wearable smart device. FIG. 23 is a schematic diagram showing steps of instructing an operation using rotations of outer rings of a wearable smart device. FIG. 24 is a schematic diagram showing steps of instructing an operation using turnings of outer rings of a wearable smart device. With reference to these drawings, a manipulation of the wearable smart device 10 in the instructing step S2 is described as follows.

As aforementioned, each of the display units 140 and 240 may include a touchscreen capable of a prescribed input. Referring to FIG. 22 (a), a user can touch at least one display unit in the instructing step S2. In this touch step, as shown in the drawing, the user an input a prescribed instruction to the wearable smart device 10 by touching one of the first to fourth display units 140 to 440. Moreover, as shown in FIG. 22 (b), a user can press at least one display unit strongly. In the pressing step, different instructions may be inputted according to levels of the inputs applied to the display units 140 to 440, respectively. Or, different instructions may be inputted according to times of presses, respectively. Furthermore, as shown in FIG. 22 (c), in the instructing step S2, a user can simultaneously touches two or more displays. In particular, in the touch step of FIG. 22 (c), for user's facilitated touch, two display units adjacent to each other can be touched simultaneously. For example, as shown, the first and second display units 140 and 240, the second and third display units 240 and 340, or the third and fourth display units 340 and 440 may be touched simultaneously.

Particularly, owing to the identifiable structure of the wearable smart device 10, the rings 100 to 400 can perform various motions such as extension, rotation, turning and the like. Hence, such motions enhance manipulability of the device 10. And, in association with the instructing step S2, the control method can provide a user interface expanded for instruction based on the enhanced manipulability to provide a user with an intended function more easily and conveniently. Substantially, when the aforementioned motions are performed, the wearable smart device 10 senses the performed motions using various sensors and/or switches and the sensed motions can be then recognized as prescribed instructions by the device 10.

Referring to FIG. 21, in the instructing step S2, a user can extend at least one outer ring. Namely, by extending a prescribed one of the outer rings 200 to 400, a prescribed instruction can be inputted to the device 10. In particular, the outer rings 200 to 400 are telescopically coupled with the main ring 100 and may have gradually increasing diameters, respectively. From the fully retracted device 10 shown in FIG. 21 (a), as shown in FIGS. 21 (b) to 21 (d), the third to first outer rings 400 to 200 can be sequentially extended by staring with the third outer ring 400. According to the respective extensions, different instructions can be inputted to the device 10, respectively. Moreover, in order to input an instruction to the wearable smart device 10 in the instructing step S2, two or more outer rings adjacent to each other may be simultaneously extended [not shown].

Moreover, referring to FIG. 23, in the instructing step S2, a user may revolve or rotate at least one outer ring. In such a rotating step, as shown in FIG. 23 (a), a user can input a prescribed instruction to the wearable smart device 10 by rotating a prescribed one of the outer rings 200 to 400 except the main ring 100 fixed to a finger F of the user. In particular, the outer rings 200 to 400 can be rotated relatively to another ring adjacent centering on a center axis of the device 10 or the outer ring itself. Moreover, the outer rings 200 to 400 may be rotated in a first direction and a second direction opposite to the first direction, e.g., counterclockwise and clockwise. Furthermore, if necessary, the main ring 100 can be rotated relatively to the outer rings 200 to 400 for an input of an instruction. Meanwhile, referring to FIG. 23 (b), in order to input an instruction to the wearable smart device 10, a user may simultaneously rotate two or more outer rings. Although FIG. 23 (b) shows that 2 outer rings are simultaneously rotated, 3 outer rings can be rotated simultaneously without additional consideration.

Moreover, as shown in FIG. 24, in the instructing step S2, a user can turn at least one outer ring for an instruction input. As aforementioned, such a tuning motion can be performed in a manner of flexing user's finger F. In particular, when the finger F is flexed, orientation of at least one of the first to third outer rings 200 to 400 may be changed against another ring. When the finger F is flexed, at least one of the first to third outer rings 200 to 400 can be rotated centering on an axis N (cf. FIG. 16) vertical to a center axis C of the device 10 or the rings. For example, as shown in FIG. 23 (a), the third outer ring 400 can be turned to enable a prescribed command to be inputted to the device 10 as the finger F is flexed. Moreover, as shown in FIG. 23 (b) and FIG. 23 (c), a user can simultaneously turn two or more outer rings. For example, as shown in FIG. 23 (b), the third outer ring 400 and the second outer ring 300 adjacent thereto can be turned together in response to the flex of the finger F. Moreover, as shown in FIG. 23 (c), the first to third outer rings 200 to 400 can be turned simultaneously, whereby an instruction can be inputted to the device 10.

The schematic control methods described with reference to FIGS. 20 to 24 can configured in detail according to situations to provide various function to a user in different situations, respectively. Therefore, by referring to the related drawing, a method of controlling the wearable smart device 10 for each situation is described as follows. Regarding a detailed control, since the performing step S3 corresponds to a step of generating a result or output according to an inputted instruction, a detailed control method according to each situation corresponds to a single set of the instructing step S2 (or, the receiving step S4) and the performing step S3 or a plurality sets thereof. Likewise, the detailed control methods may be described as a single set of a step of receiving an instruction of an operation corresponding to the instructing step S2 or a plurality of sets thereof.

Figure 25:
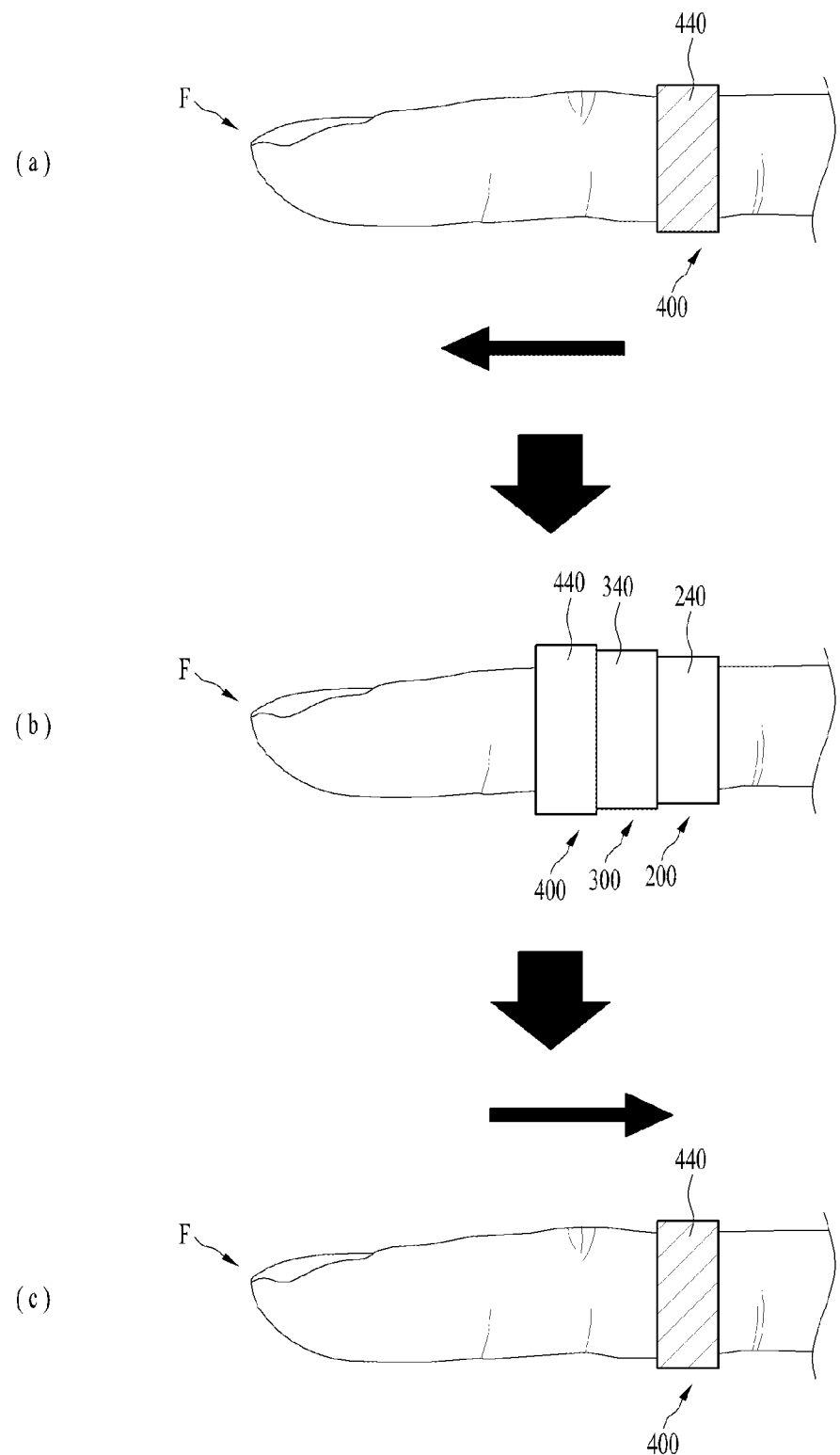
FIG. 25 is a schematic diagram showing steps of turning on or off a display unit of a wearable smart device.
Figure 26:
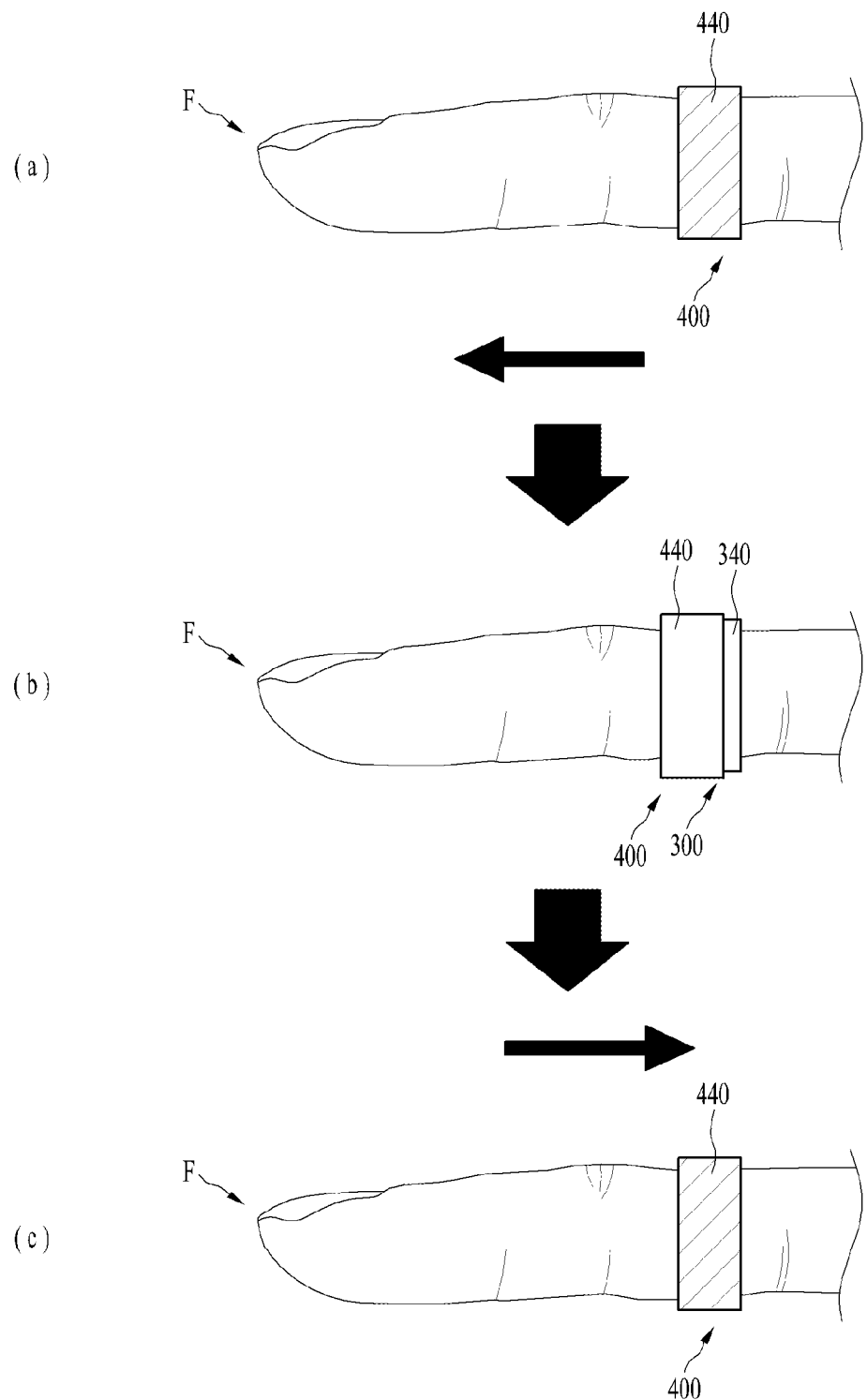
FIG. 26 is a schematic diagram showing a modified example of steps of turning on or off a display unit of a wearable smart device.

First of all, a method of turning on/off the display units 140 to 440 of the wearable smart device 10 is described. Regarding this, FIG. 25 is a schematic diagram showing steps of turning on or off a display unit of a wearable smart device. FIG. 26 is a schematic diagram showing a modified example of steps of turning on or off a display unit of a wearable smart device.

As shown in FIG. 25 (a), if the wearable smart device 10 is not used, the display units 140 and 240 may be turned off. For example, the exposed display unit 440 may be turned off. The display units 140 to 340 hidden, i.e., covered with the adjacent ring may be turned off when the exposed display 440 is turned off to use less power. Moreover, the display unit intentionally exposed by a user can be turned off. Furthermore, as shown in FIG. 25 (a), if the outer rings 200 to 400 are completely retracted, i.e., if the wearable smart device 10 gets shortest to function as a rising of an accessory, the display units 140 and 240 may be turned off all.

Thereafter, as shown in FIG. 25 (b), by exposing specific display units among the display units 140 to 440 from the wearable smart device 10, a user can turn on the exposed display units. In order to expose specific display units 140 to 440, outer rings 200 to 400 covering the specific display unit can be extended. For example, as shown in the drawing, if a user extends the third and fourth outer rings 300 and 400, the second third display units 240 and 340 as exposed and turned on. Since the fourth display unit 340 is always exposed, it can be turned on together with the second and third display units 240 and 340. Moreover, if a user extends the third outer ring 300 only, the second display unit 240 is exposed only so as to be turned on together with the fourth display unit 440 [not shown]. Furthermore, likewise, as the first to third outer rings 200 to 400 are extended all, the first to fourth display units 140 to 440 are exposed and turned on.

Thereafter, the user can turn off the hidden display unit by hiding a specific one of the display units 140 to 440. In order to hide the specific display unit 140 to 440, the outer ring 200 to 400 adjacent to the specific display unit, i.e., the outer ring 200 to 400 having covered the specific display unit can be retracted again. In particular, referring to FIG. 25 (b), if the user retracts the second outer ring 300, the second display unit 240 can be turned off by being covered with the second outer ring 300. If the third outer ring 400 is retracted, the third display unit 340 can be turned off by being covered. If the third outer ring 400 is retracted, since the wearable smart device 10 is completely retracted, as shown in FIG. 25 (c), the fourth display unit 440 can be turned off together. On the other hand, by simultaneously retracting all the outer rings 100 to 400, as shown in FIG. 25 (c), all the display units 140 to 440 can be turned off at a time.

By the control method according to FIG. 25, a user can turn on/off by selectively exposing/hiding a desired one of the display units 140 to 440 according to the selective extension and retraction of the outer ring 100 to 400. Therefore, the user can use the wearable smart device 10 more conveniently.

Meanwhile, for a simple information check or simple instructions, it is necessary for a user to turn on a single display unit only. Hence, FIG. 26 shows a method of turning on or off a specific display unit only.

First of all, referring to FIG. 26 (a), like FIG. 25 (a), all display units 140 to 440 of the wearable smart device 10 are turned off. Thereafter, by extending a specific outer ring partially and then retracting it, a display unit installed in the specific ring can be turned on. In particular, as shown in FIG. 26 (b), the specific outer ring may become the third outer ring 400 that is always exposed externally in the wearable smart device 10. The third outer ring 300, as shown in FIG. 26 (b), may be extended in part. Namely, the third outer ring 300 is not extended fully and can make a motion with a stroke smaller than that required for a full extension. Thereafter, as shown in FIG. 26 (c), the third outer ring 300 can be fully retracted and the fourth display unit 440 installed in the third outer ring 300 can be turned on. On the contrary, by extending a specific outer ring in part and then retracting it again, a display unit installed in the specific ring can be turned off. Namely, the fourth display unit 440 turned on in FIG. 26 (c) can be then turned off, as shown in FIG. 26 (a), in a manner of partially extending the third outer ring 300 in FIG. 26 (b) and then retracting it. Therefore, using an extension motion of a ring distinguished from FIG. 25, a user can turn on/off a desired display only more easily and conveniently.

FIG. 27 is a schematic diagram showing steps of adjusting a screen displayed on a display unit of a wearable smart device. With reference to this drawing, a method of adjusting a size and shape of a screen or image outputted from the wearable smart device 10 is described as follows.

As shown in FIG. 27 (a), the wearable smart device 10 can be oriented in a horizontal direction. Namely, the device 10 can extend long in the horizontal direction. As aforementioned, screens of the first to fourth display units 140 to 440 can be connected to each other contextually or visually, whereby a single extended screen displaying a single content can be formed substantially. In this case, the device 10 may have a single screen extended long in a horizontal direction. Hence, the device 10 can output a screen or image extended long in horizontal direction (i.e., width direction) and short in vertical direction (i.e., length direction) to fit the above screen. Meanwhile, as shown in FIG. 27 (b), if the device is oriented in the vertical direction, i.e., if extended long in the vertical direction, the device 10 can output an image or screen short in the horizontal direction (i.e., width direction) and long in the vertical direction (i.e., length direction) to fit the formed screen. Hence, the device 10 can adjust a size of the outputted screen, and more particularly, an aspect ratio according to orientation of its own. Namely, in response to an orientation of the device 10 and a size of a screen formed according to the orientation, the device 10 can adjust an outputted screen or image to fit the size of the screen. By the control method shown in FIG. 27, a screen or a substantially outputted image can be automatically adjusted according to the orientation of the wearable smart device 10, whereby a user can use the device 10 conveniently.

As described in association with the receiving and displaying step S4 of FIG. 20, the wearable smart device 10 receives prescribed information through communications with an external network and other devices and displays the received information to a user, thereby providing it as a basic function of a smart device. The wearable smart device 10 can display information, which is stored in the device 10, to a user in the same manner as aforementioned. FIGS. 28 to 31 are schematic diagrams showing steps of displaying different informations depending on the number of exposed display units. FIG. 32 is a schematic diagram showing a modified example of a display step according to FIGS. 28 to 31. With reference to the above drawings, a method of displaying prescribed informations is described in detail as follows.

As sequentially shown in FIGS. 28 to 31, according to the number of display units 140 to 440 exposed for user's convenience, the wearable smart device 10 can control different informations to be displayed on the exposed display units 140 to 440, respectively.

Figure 28:
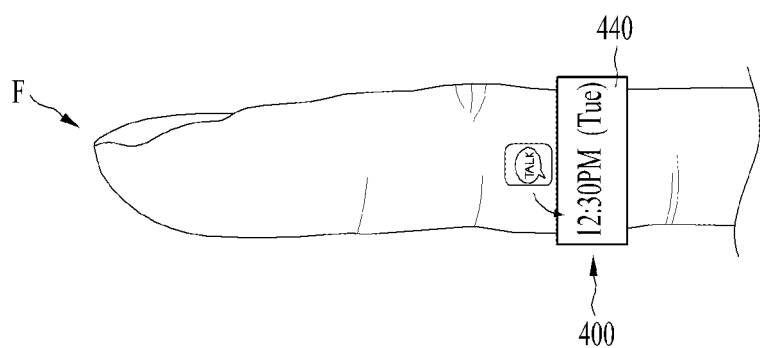
FIGS. 28 to 31 are schematic diagrams showing steps of displaying different information depending on the number of exposed display units.

First of all, as shown in FIG. 28, if one display unit is exposed, the wearable smart device 10 can display a basic information on the exposed display unit. In particular, for example, since the fourth display unit 440 is always exposed, as aforementioned, the outer rings 220 to 400 need not to be extended for the exposure of the display unit and the device 10 can provide a function as a most compact shape, i.e., an accessory. Hence, to be appropriate for the most basic shape of the device 10, as shown, the fourth display unit 440 can display basic informations such hour, date, weather and the like. Moreover, an unread or unconfirmed notification can be displayed on the exposed single display unit 440. The unread notification may include simple information such as a name of a corresponding application, a sender and the like. In order for a possibly large volume of information to be displayed on the limited single display unit 440, the basic information and/or the unread notification may be sequentially displayed in a manner of moving from one end of the display unit 440 to the other end. Namely, the basic information and/or the unread notification may include an icon instead of a name of a corresponding application in order to reduce a displayed region. Moreover, the basic information and/or the unread notification may be displayed continuously or for a prescribed time only. Particularly, the unread notification may be displayed for a prescribed time only after an occurrence of a related event, i.e., a reception of the notification by the device 10. Moreover, when the notification is received by the device 10, the display unit 440 may have been turned off. And, the display unit 440 may be turned on to display a notification after reception.

Figure 29:
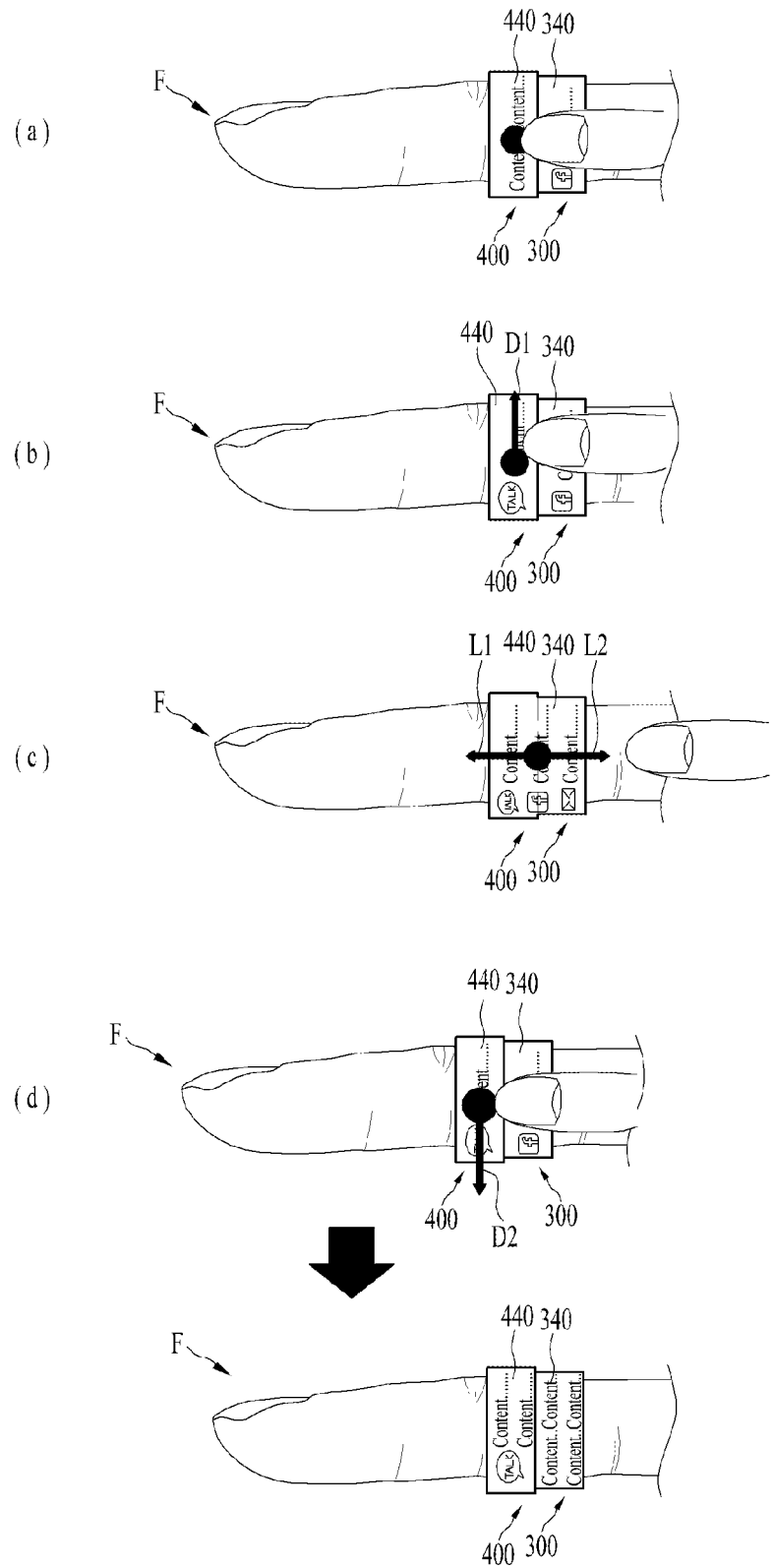

Moreover, as shown in FIG. 29, if 2 display units are exposed, the wearable smart device 10 can display unread notifications on the exposed display units. In particular, as shown in FIG. 29 (a), the unread notifications can be displayed on the display units 440 and 340, respectively. To expose the third display unit 340, the third outer ring 400 located adjacent to the third display unit 340 by covering the third display unit 340 can be extended. The unread notifications may be generated from applications such as a message, an SNS, a phone and the like. As aforementioned, in order to display a volume as large as possible, the unread notifications can be displayed together with icons of the corresponding applications. Moreover, if a user touches a specific display, e.g., the fourth display unit 440, as shown in the drawing, the full content of the notification can be displayed sequentially in a manner of flowing along the fourth display unit 440.

Referring to FIG. 29 (b), if a user swipes a specific display unit in a specific direction, an unread notification within the specific display unit can be deleted. For example, if a user swipes the fourth display unit 440 in a first direction D1 along a circumferential direction, as shown, the unread notification displayed on the fourth display unit 440 can be deleted. Such a circumferential-direction swipe may be described as a swipe in a tangential direction of the circumferential direction of the device 10, i.e., in a direction vertical to a center axis of the device 10. Moreover, the first direction D1 may include an upward direction in the drawing. Considering a ring shape of the device 10, when the device 10 is viewed in front direction, i.e., in front of a fingertip T (cf. FIG. 16), the first direction D1 may correspond to a counterclockwise direction. Meanwhile, as shown in FIG. 29 (d), if a user swipes a specific display unit in a specific direction, a content of an unread notification may be displayed across the exposed display units overall. For example, if a user swipes the fourth display unit 440 in a second direction D1 along a circumferential direction, a content of the unread notification displayed on the fourth display unit 440 can be displayed across both of the exposed third and fourth display units 340 and 440. The displayed content of the notification may include all details indicated by a corresponding application instead of simply summary information. The second direction D2 may include a downward direction in the drawing. Considering a ring shape of the device 10, when the device 10 is viewed in front direction, i.e., in front of a fingertip T (cf. FIG. 16), the first direction D1 may correspond to a clockwise direction.

Referring to FIG. 29 (c), if a user swipes a specific display unit in a specific direction, unread notifications may be scrolled in the specific direction. And, unread notifications that were not displayed can be then displayed in sequence in response to such a scroll. For example, as shown, if a user swipes the exposed third and fourth display units 340 and 440 in a first direction L1 or a second direction L2 along a direction of a center axis of the device 10, unread notifications displayed on the third and fourth display units 340 and 440 can be scrolled in the corresponding direction. As initially displayed unread notifications are scrolled, the non-displayed unread notifications can be displayed on the third and fourth display units 340 and 440 in addition. The first direction L1 may become a direction toward the user's fingertip T (cf. FIG. 16), and the second direction L2 may become a direction opposite to the first direction L1, i.e., a direction toward the user's knuckle K (cf. FIG. 16).

Figure 30:
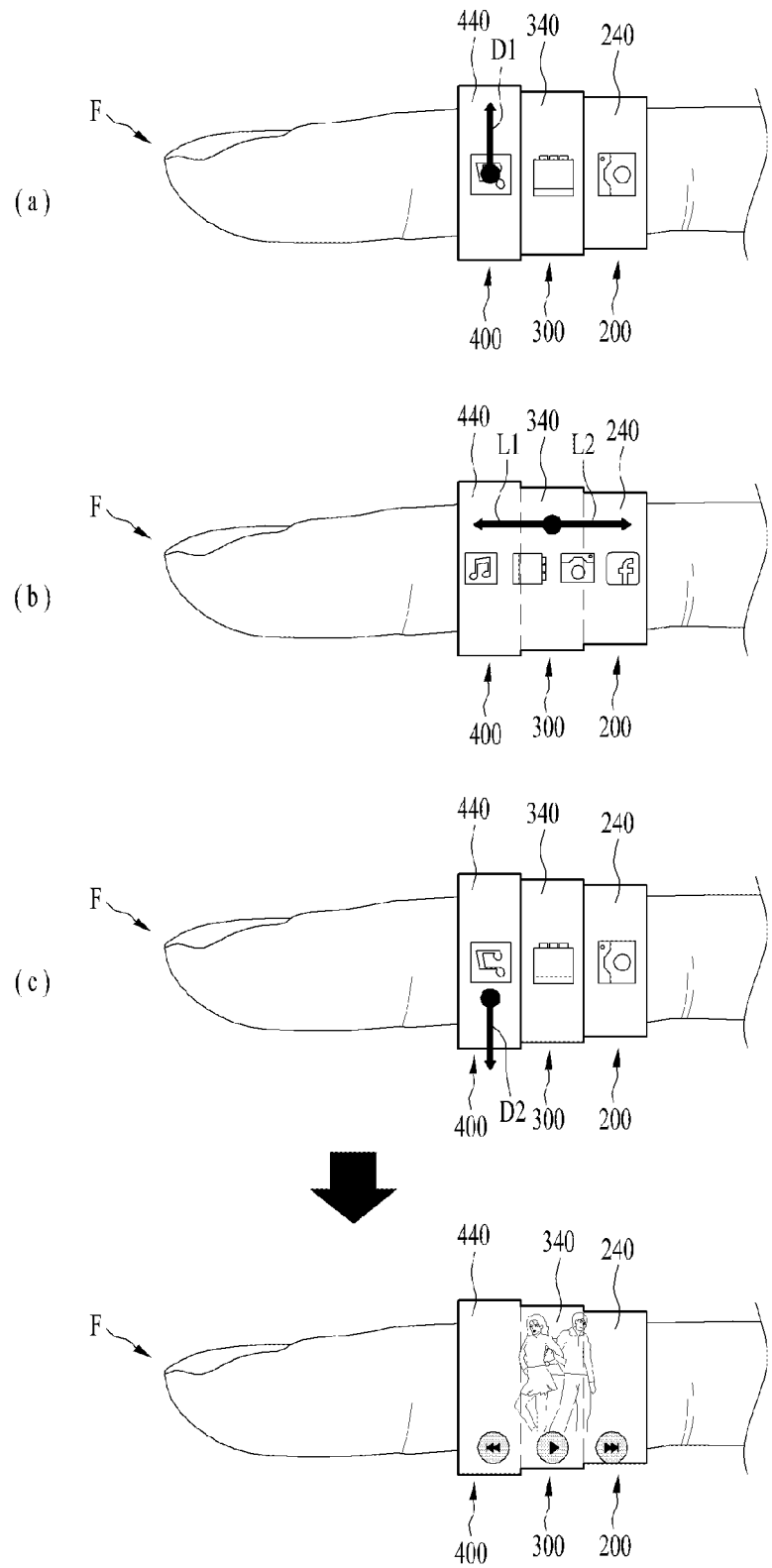

Moreover, as shown in FIG. 30, if 3 display units are exposed, the wearable smart device 10 can display recently used application, and more particularly, identifiers of used applications on the exposed display units, respectively. In particular, as shown in FIG. 30 (a), recently used applications can be displayed on the second to fourth display units 240, 340 and 440, respectively. In order to expose the second display unit 240, the second outer ring 300 adjacent to the second display unit 240 by covering the second display unit 240 can be extended. Since the number of the exposed display units 240, 340 and 440 is limited, the display units 240 to 440 can gradually display a most recently used application and applications executed earlier than the most recently used application in order. For the same reason, the displayed applications can be displayed as icons instead of relatively long names.

Referring to FIG. 30 (a), if a user swipes a specific display unit in a specific direction, a display of an application within the specific display unit can be deleted. Moreover, instead of the deleted application, a non-displayed application in temporally next order can be displayed. For example, as shown, if a user swipes the fourth display unit 440 in a first direction D1 along a circumferential direction, a user application displayed on the fourth display unit 440, and more particularly, an icon of the application can be deleted and an icon of a next used application can be displayed instead. Meanwhile, as shown I FIG. 30 (c), if a user swipes a specific display unit in a specific direction, an application displayed on the specific display unit can be run. For example, if a user swipes the fourth display unit 440 in a second direction D2 along a circumferential direction, the used application displayed on the fourth display unit 440 is run again and a running screen of the application can be displayed across the display units 240 to 440. Finally, referring to FIG. 30 (b), if a user swipes a specific display unit in a specific direction, a list of recently used applications, and more particularly, a list of marks of the recently used applications can be scrolled in the specific direction. Moreover, non-displayed applications can be displayed in sequence according to such a scroll. For example, as shown, if a user swipes the exposed second to fourth display units 240 to 440 in a first direction L1 or a second direction L2 along a center axis direction of the device 10, the used applications displayed on the second to fourth displays units 240 to 440 can be scrolled in the corresponding direction. As the initially displayed used applications are scrolled, used application failing to be displayed can be displayed on the second to fourth display units 240 to 440 in addition.

Figure 31:
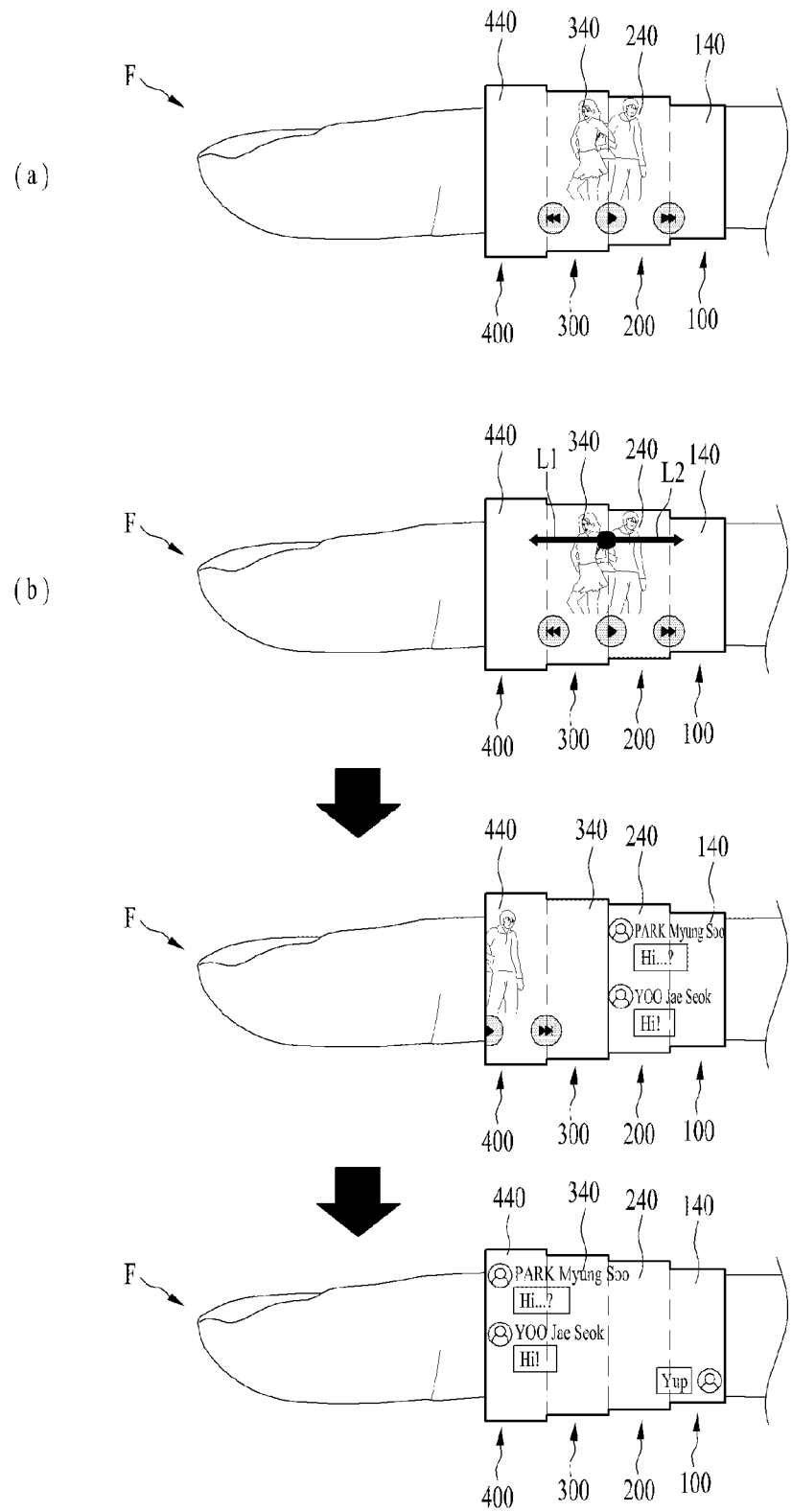
Figure 32:
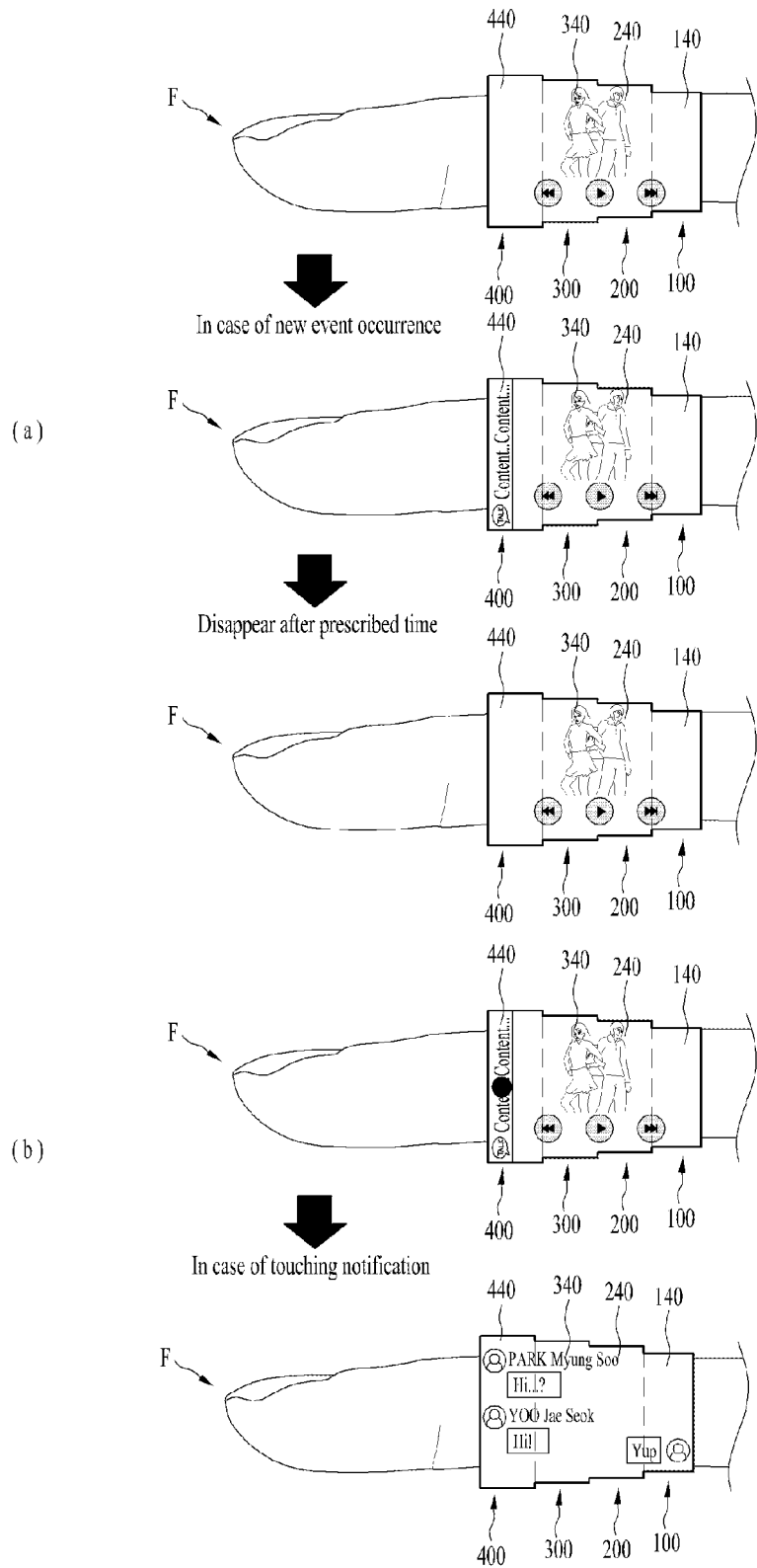
FIG. 32 is a schematic diagram showing a modified example of a display step according to FIGS. 28 to 31.

Finally, as shown in FIG. 31, if 4 display units are exposed, the wearable smart device 10 can run a most recently used application. If 4 displays are exposed, as all the display units 140 to 440 of the device 10 are exposed, a largest screen can be formed. Hence, in order to effectively use such an extended screen, a most recently used application is run and a running screen of the application is preferably displayed on the exposed display units 140 to 440. In particular, as shown in FIG. 31 (a), if 4 display units, i.e., all the display units 140 to 440 are exposed, the device 10 re-runs a most recently run application and is able to display a running screen of the application on the display units 140 to 440. Such a running and screen display may be performed without additional instruction as soon as the display units are exposed. In order to expose the first display unit 140 finally, the first outer ring 200 adjacent to the first display unit 140 by covering it can be extended. Moreover, referring to FIG. 31 (b), if a user swipes an exposed display unit in a specific direction, an application used right before a currently run application can be run. Moreover, a running screen can be displayed on the exposed display units 140 to 440 as soon as such an application is run. For example, if a user swipes the exposed first to fourth display units 140 to 440 in a first direction L1 or a second direction L2 along a center axis direction of the device 10, a screen of a currently run application is scrolled in the corresponding direction and a different application used right before can be run directly. Moreover, a running screen of the different application is displayed on the exposed display units 140 to 440 and is then scrolled on a screen of the currently run application continuously. Finally, the running screen of the different application can be displayed on all the exposed display units 140 to 440 instead.

Meanwhile, as shown in FIG. 32, while a prescribed number of display units or more are exposed, if a notification is received, the unread notification can be displayed on a specific display unit. If 2 display units are exposed, the exposed display units may not be enough to display the notification and other informations. Hence, the display of the new notification can be performed when 3 or more display units are exposed. In particular, as shown in FIG. 32 (a), while 4 display units 140 to 440 are exposed, if a new notification is received, the device 10 can display the new notification on one (e.g., fourth display unit 440) of the exposed display units 140 to 440. If such a notification continues to be displayed, since it disturbs a use of an already displayed application or information, it can disappear after being displayed for a prescribed time. Moreover, as shown in FIG. 32 (b), by selecting the displayed new notification, a content of the new notification can be checked. In particular, if a user touches the fourth display unit 440, all contents of the displayed new notification can be displayed across the display units 140 to 440 all in detail. Moreover, if necessary, an application linked to the new notification is run and a running screen of the application can be displayed in detail across all the display units 140 to 440.

The control method shown in FIGS. 28 to 32 displays different informations depending on the number of the exposed display units. Hence, such a control method uses the limited display units efficiently, thereby providing a user with necessary informations as many as possible. Therefore, the user can use the wearable smart device 10 more conveniently.

The wearable smart device 10 can provide a function as a wireless phone. Particularly, since the device 10 has a small size worn on a user's finger or wrist, it is very useful to receive an incoming call conveniently. Hence, in the following description, a step of controlling a phone using the device 10, and more particularly, steps of answering or declining a phone call are described in detail with reference to the related drawings. Yet, the wearable smart device 10 can make a phone call based on the structure, interface and methods described in association with answering or declining a phone call.

Figure 33:
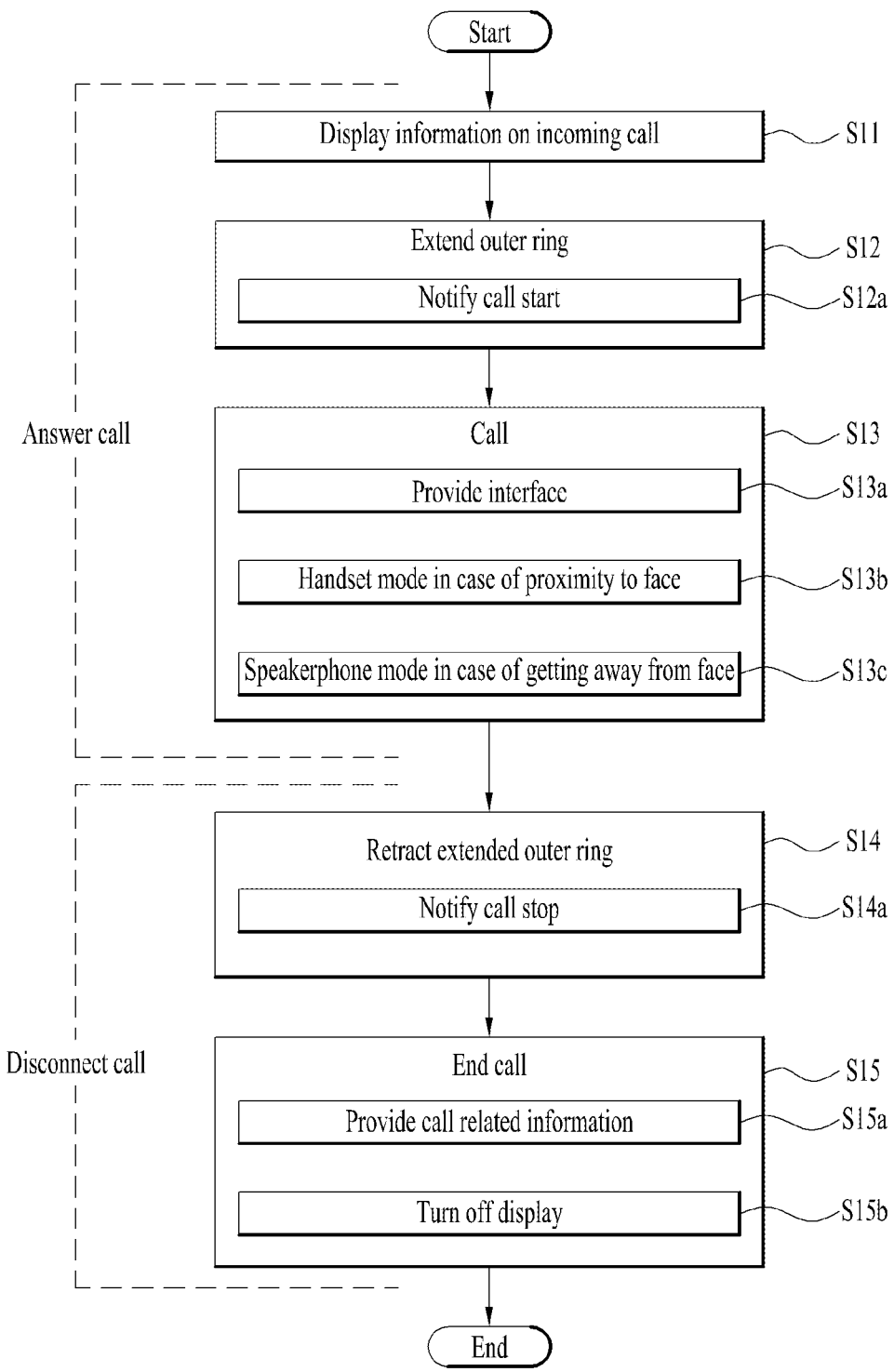
FIG. 33 is a flowchart showing steps of answering or declining a phone in a wearable smart device.
Figure 34:
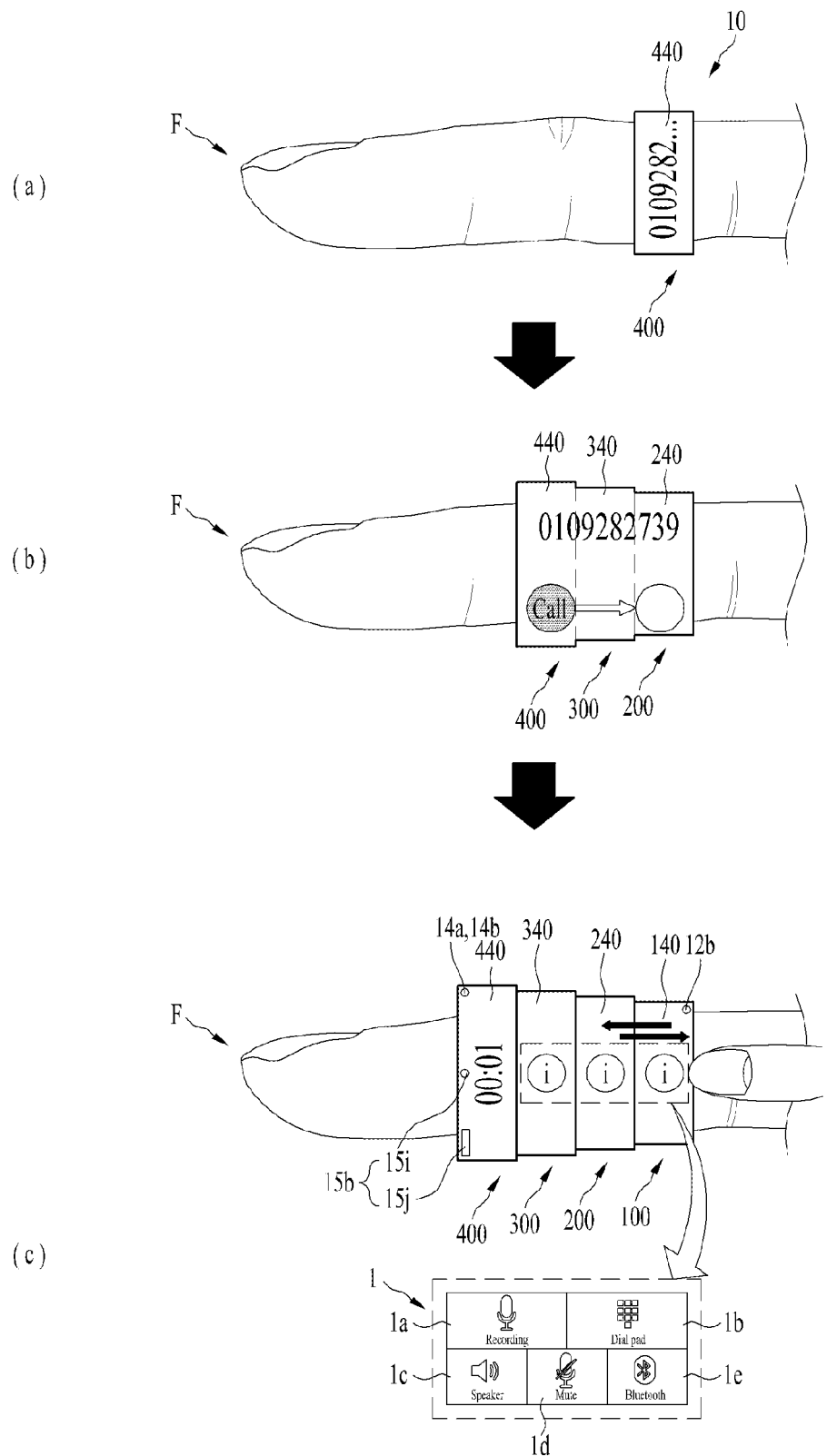
FIG. 34 is a schematic diagram showing details of steps of answering a phone in a wearable smart device.
Figure 36:
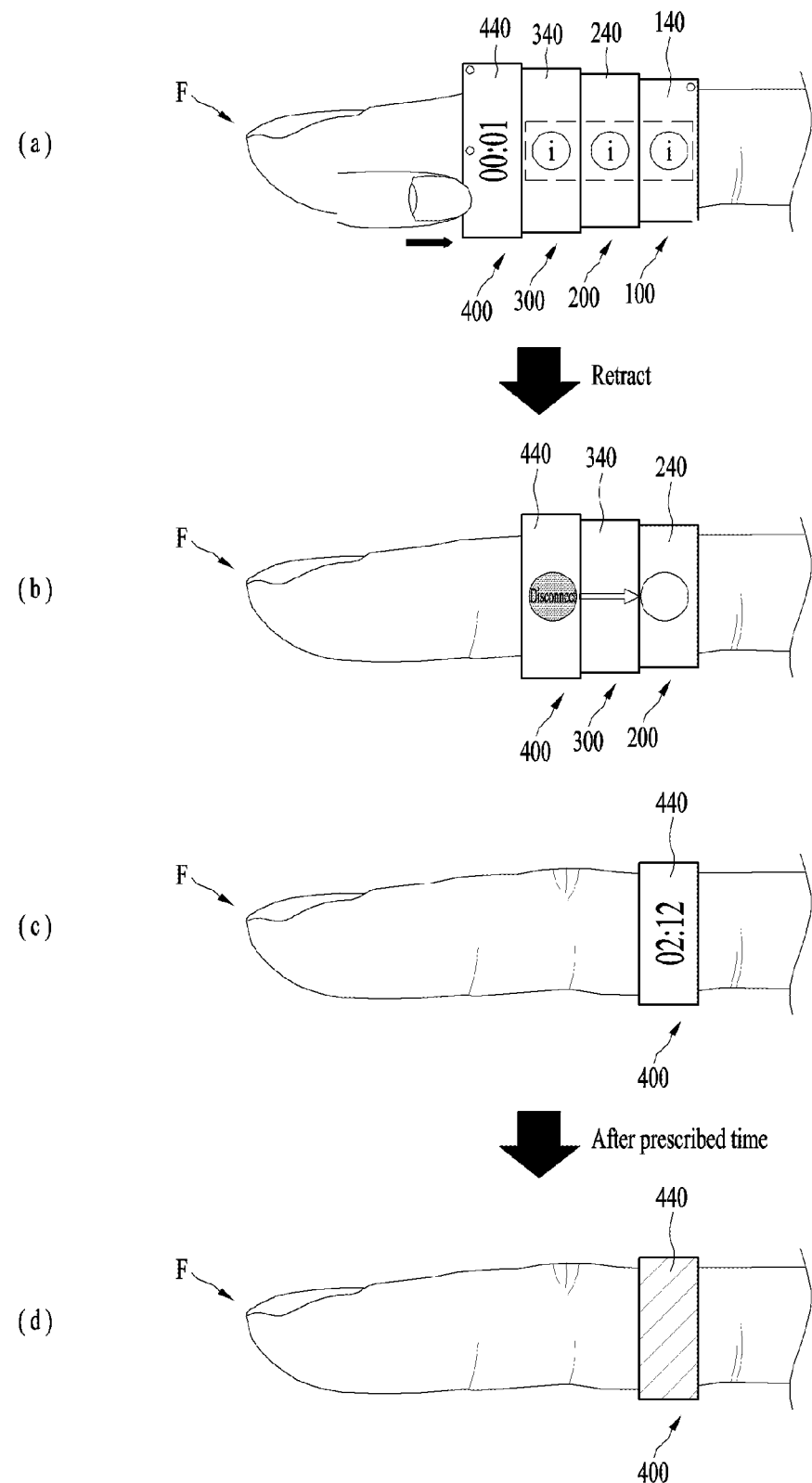
FIG. 36 is a schematic diagram showing details of steps of disconnecting a phone in a wearable smart device.

FIG. 33 is a flowchart showing steps of answering or declining a phone in a wearable smart device. FIG. 34 is a schematic diagram showing details of steps of answering a phone in a wearable smart device. FIG. 35 is a schematic diagram showing details of steps of making a phone call in a wearable smart device. FIG. 36 is a schematic diagram showing details of steps of disconnecting a phone in a wearable smart device. Since all steps performed in association with a phone in the wearable smart device 10 are sequentially shown in FIG. 33, FIG. 33 is basically referred to for all descriptions.

Referring to FIG. 33, as the instructing and performing steps S2 and S3 shown in FIG. 2, a user can answer an incoming call to the user, and more particularly, to the wearable smart device 10.

In such a call reception, the wearable smart device 10 can display information on the incoming call [S11]. Particularly, the device 10 can display a name, a phone number and the like of a person making a phone call in association with the incoming call. And, informations can be displayed a prescribed exposed one of the display units 140 to 440. Such a displaying step S11 may be performed before a user substantially answers a phone call. For instance, as shown in FIG. 34 (a), as a user uses the device 10 as an accessory when the device 10 is not in use, when there is an incoming call, the device 10 may generally have a most compact shape, i.e., a fully retracted shape. Hence, information of the incoming call may be displayed on the fourth display unit 440 that is always exposed. Yet, if a user is currently using the device 10, such information may be displayed a prescribed exposed one of the display units 140 to 440. If all the information cannot be displayed on the exposed display unit 440, as aforementioned, the entire content of the information can be sequentially displayed in a manner that the information moves along the display unit 440.

Thereafter, in order to answer the incoming call, the user may extend at least one outer ring [S12]. In particular, one of the extendable first to third outer rings 200 to 400 can be extended. By such an extension, a user or the device 10 can answer an incoming call. For example, as shown in FIG. 34 (c), in order to answer an incoming call, all the outer rings 200 to 400 can be extended. Such an extension may be recognized as an instruction of a call reception by the device 10. Although FIG. 34 (c) shows that all the outer rings 200 to 400 are extended, one of the outer rings be extended or an arbitrary number of the outer rings can be extended. The extending step S12 may become a substantial step for answering an incoming call, and the aforementioned display step S11 may be performed preliminarily and selectively prior to the extending step S12. Moreover, while the extending step S12 is performed, the wearable smart device 10 can notify a user that a call will start [S12a]. In the notifying step S12a, the device 10 can notify the user of the call start in various ways including text information. Moreover, such a notification can be displayed one of all the exposed displays including the display exposed in the extending step S12. For example, as shown in FIG. 34 (b), while the third and fourth outer rings 300 and 400 are extended, the notification of the call start can be displayed on the exposed display units 240 to 440. Such a notification can be provided as a full sentence such as 'A call is to start'. Yet, the notification, as shown, may be provided as an icon to facilitate user's recognition. For user's convenience, the information (i.e., name and phone number of a caller) on the incoming call displayed in the displaying step S11 may be displayed as well. Moreover, since the device 10 can have a screen extended in a horizontal direction through the extending step S12, all the aforementioned informations can be outputted as an image or screen long in a horizontal direction (i.e., width direction) and short in a vertical direction (i.e., length direction) to fit the extended screen. Namely, an aspect ratio of the outputted image or screen can be changed to fit an orientation of the screen formed by the display unit.

Thereafter, the user can call a counterpart using the wearable smart device 10 [S13]. The wearable smart device 10, as shown in FIG. 34 (c), may basically include the microphone 12b and the audio output module 15b for conversation. The microphone 12b can convert all sounds (e.g., human voice, etc.) inputted to the device 10 into electric signals. And, the audio output module 15b may include a receiver 15i delivering an electrically delivered call sound to user's ear. Moreover, a loud speaker 15j for outputting various sounds externally may be installed as an additional audio output module in the wearable smart device 10. Using the microphone 12b and the audio output module 15b, the user can speak with the counterpart. Moreover, while the calling step S13 is performed, the wearable smart device 10 can provide an interface related to the call [S13a]. The interface may provide functions (e.g., disconnecting a call, etc.) directly related to a call. Moreover, through the interface, various additional functions may be provided. The interface may include a sort of GUI (graphic user interface), and may be displayed on of the exposed display units. For example, as shown in FIG. 34 (c), during the calling step S13, the device 10 can provide an interface 1 through the exposed display units 140 to 440. Moreover, the interface 1 has a GUI form to be conveniently used by a user. In particular, through the interface 1, various additional functions such as a recording 1a, a dial pad 1b, a speaker 1c, a mute 1d, a Bluetooth 1e and the like can be provided. Moreover, a function (e.g., call disconnect) directly related to a call may be provided through the interface 1. Yet, since the device 1 can disconnect a call more conveniently using its motion, as described later, the interface 1 shown in FIG. 34 (c) does not provide an interface for a call disconnect. Moreover, a call time, as shown, can be provided through the exposed display units 140 to 440 for user's convenience.

Moreover, in the calling step S13, as shown in FIG. 35 (c) and FIG. 35 (a), if a substantial call is ready, a user can bring the wearable smart device 10 to be proximate to a face. Thus, if the device 10 is proximate to the user's face, it can enter a handset mode [S13b]. Referring to FIG. 35 (a), as mentioned with reference to FIG. 1, the device 10 can include the proximity sensor 14a and the illumination sensor 14b, which can sense whether the user's face gets proximate to the device 10. If the device 10 determines that the user's face is disposed proximate to the device 10 using the sensors 14a and 14b, it is able to activate the microphone 12b and the receiver 15i. As shown, the microphone 12b and the receiver 15i are disposed at both end portion of the extended device 10, respectively. If the user gets the device 10 proximate to the face, as shown in FIG. 35 (b), the microphone 12b and the receiver 15i can be disposed close to user's mouth and ear, respectively. And, the user can have conversation using the microphone 12b and the receiver 15i. Therefore, in the handset mode 13b, the device 10 can function as an independent handset having the microphone 12b and the receiver 15i. Moreover, as the device 10 is proximate to user's face in the handset mode 13b, the user is unable to watch the display units 140 to 440 of the device 10. Therefore, if the sensors 14a and 14b sense the proximity of the user's face, the device 10 can turn off the display units 140 to 440 to save power.

Meanwhile, in the calling step S13, the user can space the wearable smart device 10 apart from the face to have conversation. Thus, if the device 10 is spaced apart from the user's face, the device 10 can enter a speakerphone mode [S13c]. As shown in FIG. 35 (c), if the device 10 determines that the user's face is disposed to be spaced apart from the device 10 using the sensors 14a and 14b, the microphone 12b and the loud speaker 15j can be activated. The microphone 12b has enough sensitivity so as to receive user's voice despite that the user's face, i.e., a mouth is spaced far away from the microphone 12b. Since the loud speaker 15j has an enough output unlike the receiver 15i, it is able to output a sound loud enough to arrive at user's spaced ears. Hence, in the speakerphone mode 13c, the device 10 can function as an independent speaker phone having the microphone 12b and the loud speaker 15j. Moreover, since the user can still watch the display units 140 to 440 in the speakerphone mode 13c, as shown in the drawing, the use time and the interface 1 can be displayed identically in the speakerphone mode 13c as well.

Through the aforementioned calling step S13, the user can speak with a counterpart for a desired time and then disconnect the call. In the call disconnecting step, the user can retract at least one of the extended outer rings to end the call [S14]. In particular, since the first to third outer rings 200 to 400 are extended to answer the incoming call in the extending step S12, one of the rings can be retracted again. By such retraction, the call can be ended. For example, as shown in FIG. 36 (a), in order to end a call, one of the extended first to third outer rings 200 to 400 can be retracted again. Such a retraction can be recognized as an instruction of the call end and the call disconnection to the device 10. One or more outer rings can be retracted. As shown in FIG. 36 (c), all the extended outer rings 200 to 400 can be retracted at a time. Moreover, while the retracting step S14 is performed, the wearable smart device 10 can notify a user that the call will be ended [S14a]. In the notifying step S14a, the device 10 can notify the user of the call end in various ways including text information. Moreover, such a notification can be displayed one of all the exposed displays including the display exposed in the extending step S12. For example, as shown in FIG. 36 (b), while the outer rings 200 to 400 are extended, the notification of the call end can be displayed on the exposed display units 240 to 440. Such a notification can be provided as a full sentence such as 'A call is to end'. Yet, the notification, as shown, may be provided as an icon to facilitate user's recognition.

Thereafter, the call is ended according to the retraction of the extended ring and the phone is disconnected. In the call ending step S15, the device 10, as shown in FIG. 36 (c), can provide the user with a real call time for user's convenience after the retracting step S14 through the exposed display unit [S15a]. For example, since all the extended outer rings 200 to 4000 can be retracted in the retracting step S14, the call time can be displayed on the fourth display unit 440 that is always exposed. After the call time has been provided for a prescribed time through the displaying step S15a, the device 10 can turn off the display unit to save power [S15b]. In order to save power substantially, as shown in FIG. 36 (d), the rest of the displays units 140 to 340 can be turned off as well as the fourth display unit 440 displaying the call time.

In association with the steps S11 to S14 of answering and disconnecting the call, the control method of the present application can hold an incoming call to the wearable smart device 10 in addition. Such a holding step is described with reference to FIG. 37 as follows.

Figure 37:
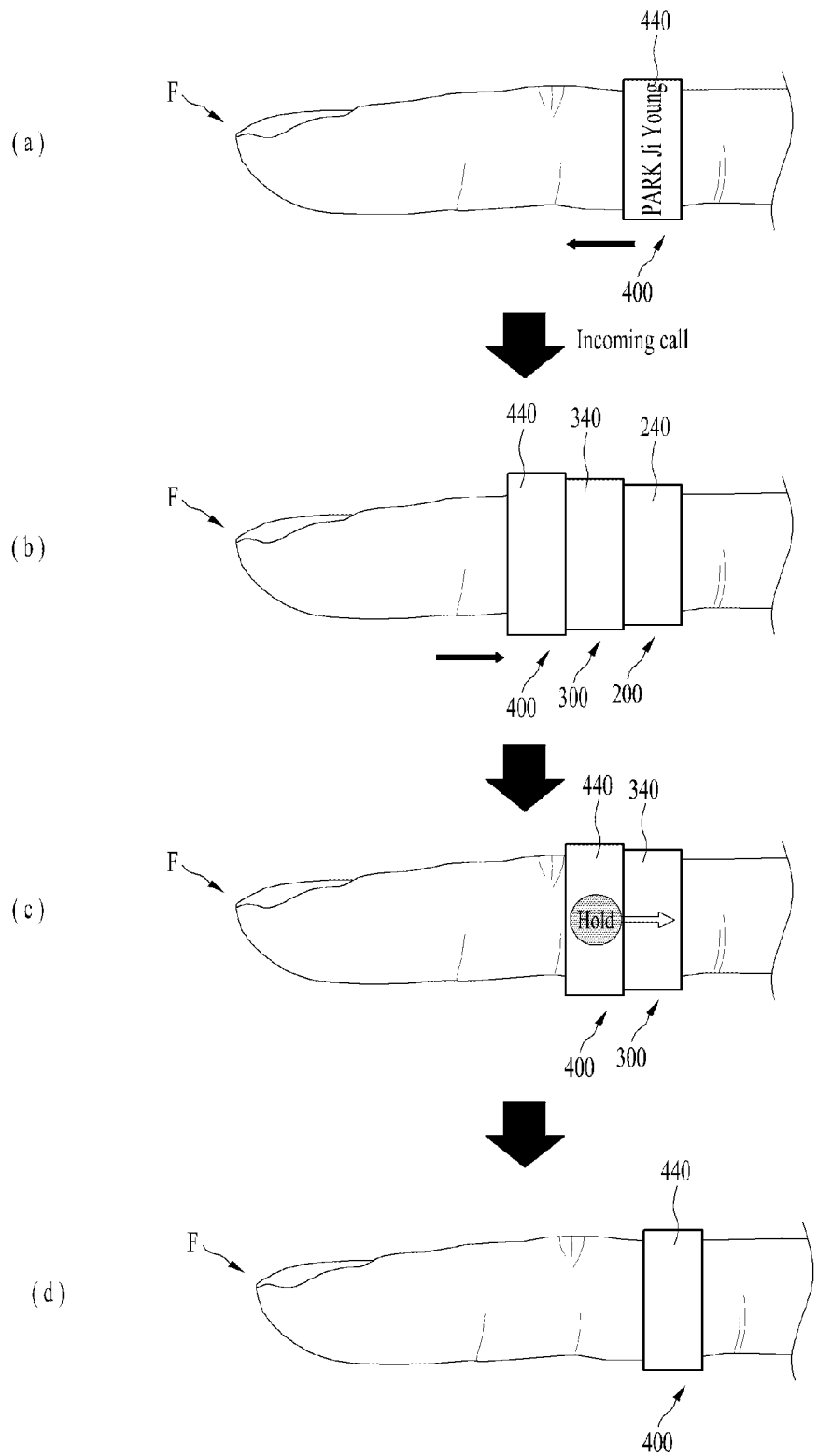
FIG. 37 is a schematic diagram showing steps of holding an incoming call in a wearable smart device.

Since the holding step is the step for a user not to answer a call temporarily without disconnecting the call, a motion distinguished from a call answering step, and more particularly, from the extending step S12 should be adopted. Hence, in the holding step, a user extends at least one outer ring first and is then able to retract the extended outer ring right after such an extension. For example, if a user or the device 10 has an incoming call [FIG. 37 (a)], the user can extend the second and third outer rings 300 and 400 [FIG. 37 (b)]. The second and third outer rings 300 and 400 can be then retracted right after having been extended [FIG. 37 (d)]. Although an arbitrary number of outer rings 200 to 400 are extendable, as shown, at least 2 outer rings can be extended in consideration of user's manipulability. Moreover, at least one of the extended outer rings may be retracted. Likewise, in consideration of user's manipulability, it is preferable that all the extended rings are retracted. During the extending step, the wearable smart display 10 can notify the user that the incoming call will be held. In the notifying step, as shown in FIG. 37 (c), the device 10 can notify the user of the call holding in various ways including text information. Moreover, such a notification can be displayed one of all the exposed displays including the display exposed in the extending step S12. For example, as shown in FIG. 37 (c), while the outer rings 300 and 400 are extended, the notification of the call holding can be displayed on the exposed display units 340 and 440. Such a notification can be provided as a full sentence such as 'A call is to be held'. Yet, the notification, as shown, may be provided as an icon to facilitate user's recognition.

The wearable smart display 10 has a small size but includes components necessary for a smart device, and more particularly, various wireless communication modules (i.e., the wireless communication unit 11 of FIG. 1). Hence, the device 10 can function as a wireless control device configured to control other devices in a long distance. Recently, users tend to frequently take photos using a mobile terminal or camera. Particularly, as shown in FIG. 39, when a user takes a photo of the user by holding a mobile terminal or camera C in one hand, it is difficult to manipulate the mobile terminal using the hand in which the mobile terminal or the camera C is held. Yet, since the wearable smart display 10 is always wearable on a user's finger or wrist and easily manipulable owing to a small size, the mobile terminal or camera C spaced to take a photo can be controlled conveniently. Hence, in the following, steps of controlling the mobile terminal and camera C remote from the device using the device 10 are described in detail with reference to the related drawings. The controlling steps are applicable to a case of taking a photo of another subject as well as a user. Moreover, although the controlling steps are described with regard to the camera C, they are identically applicable to every device having a camera module like a mobile terminal. Moreover, the controlling steps are applicable to controlling external devices other than the camera C without substantial modification.

Figure 38:
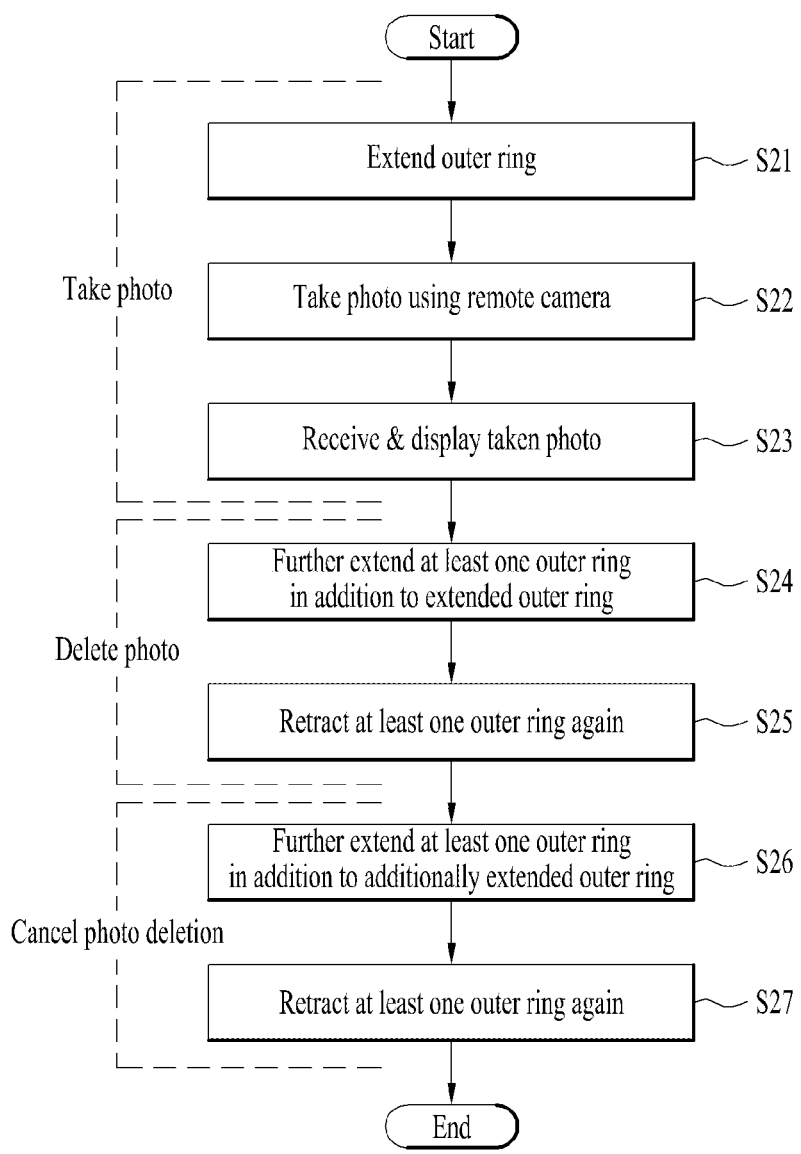
FIG. 38 is a flowchart showing steps of controlling a camera using a wearable smart device.
Figure 40:
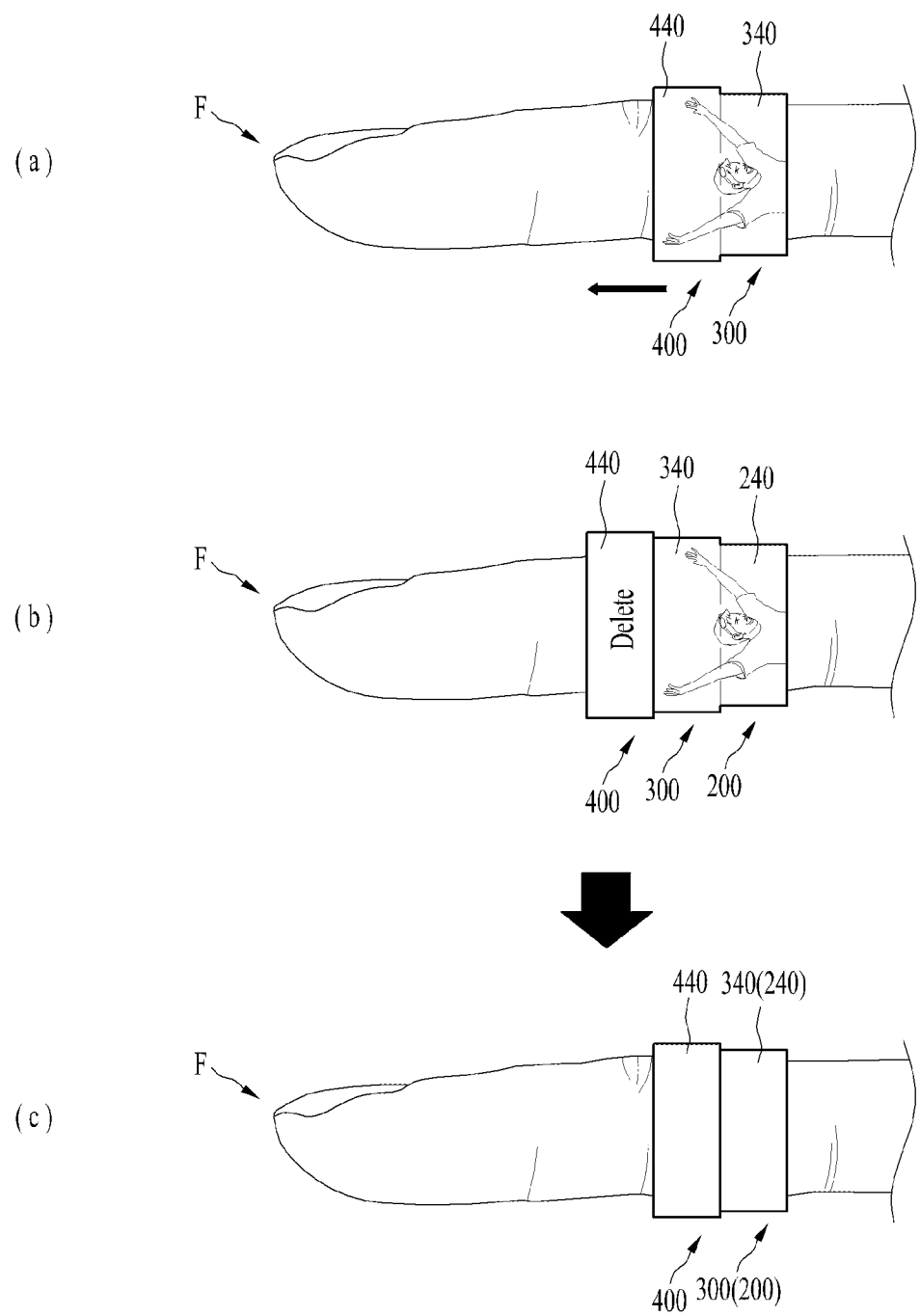
FIG. 40 is a schematic diagram showing details of steps of deleting a photo from a camera using a wearable smart device.
Figure 41:
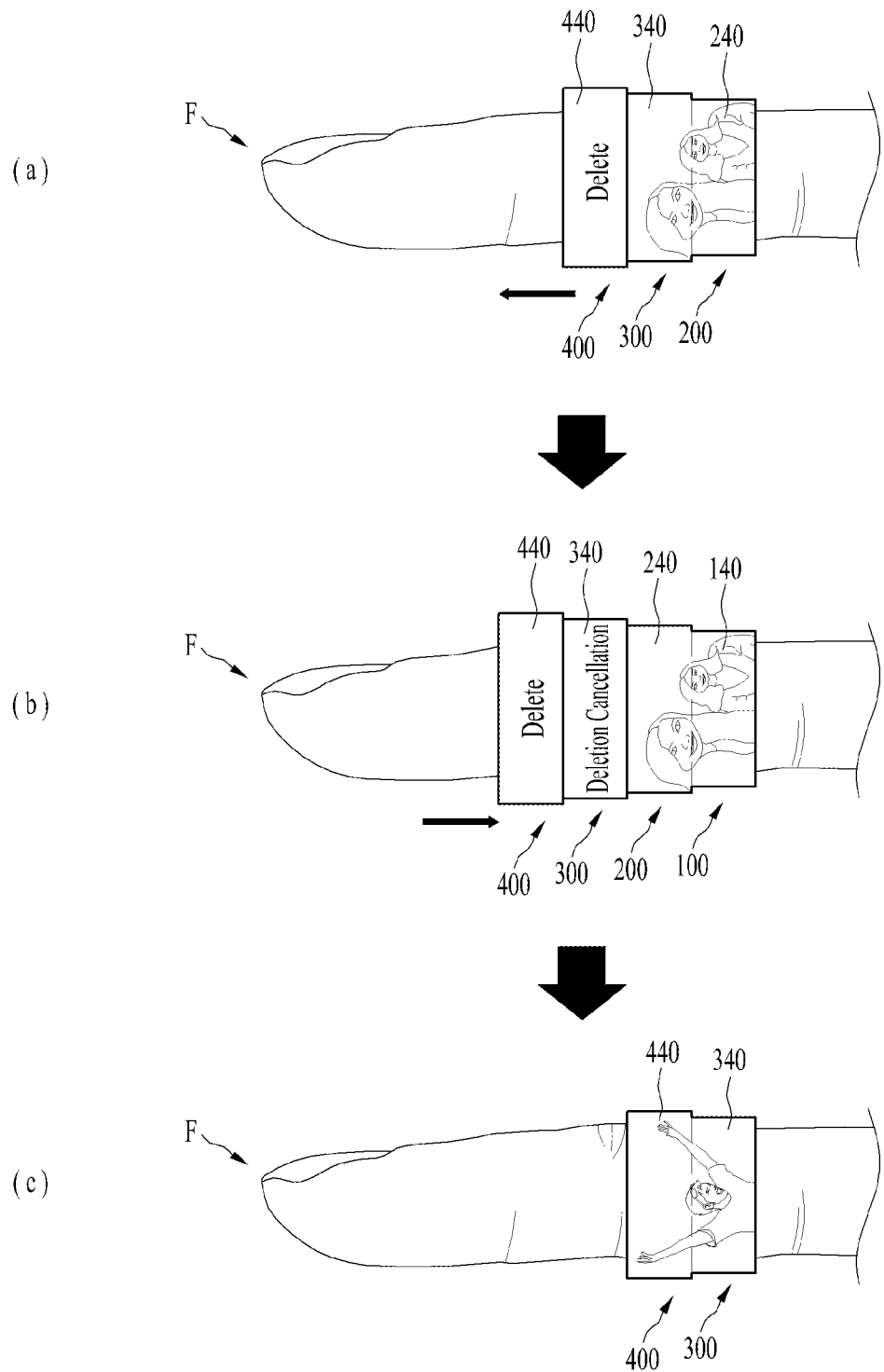
FIG. 41 is a schematic diagram showing details of steps of cancelling a deletion of a photo in a camera using a wearable smart device.

FIG. 38 is a flowchart showing steps of controlling a camera using a wearable smart device. FIG. 39 is a schematic diagram showing details of steps of taking a photo in a camera using a wearable smart device. FIG. 40 is a schematic diagram showing details of steps of deleting a photo from a camera using a wearable smart device. FIG. 41 is a schematic diagram showing details of steps of cancelling a deletion of a photo in a camera using a wearable smart device. Since all steps performed in association with a control of the camera C in the wearable smart display 10 appear in FIG. 38 sequentially, FIG. 38 is basically referred to for all descriptions.

Referring to FIG. 38, as the instructing and performing steps S2 and S3, a user can control a camera C located remote from the wearable smart device 10. In particular, the user can take a photo by controlling the remote camera C.

Regarding the above control, the user can extend at least one outer ring to instruct the remote camera to take a photo [S21]. In particular, one of the extendable first to third outer rings 200 to 400 can be extended. By such an extension, the remote camera C can take a photo. For example, as shown in FIG. 39 (a), in order for the remote camera C to take a photo, the third outer ring 400 can be extended. Although FIG. 39 (a) shows that one outer ring 400 is extended only, more outer rings 400 can be extended in the extending step S21 to give an instruction. Such an extension may be recognized as an instruction by the device 10. And, the device 10 can instruct the remote camera C to take a photo using the wireless communication module 11. In response to such an instruction, the camera C can take a photo [S22]. The device 10 can receive the taken photo [S23]. And, the device 10 may display the received photo to the user [S23]. In the receiving step S23, the device 10 may receive photos taken by the camera C using the wireless communication module 11 and save them to the memory 17 (cf. FIG. 1). Moreover, in the displaying step S23, the device 10 may display the received photo on the display units exposed in the extending step S21. In particular, as shown in FIG. 39 (a), by an extension of the third outer ring 400, the fourth and third display units 440 and 340 may be exposed from the device 10. Since the display units 340 and 440 configure an enough screen by being connected to each other, the received photo can be displayed on the screen formed as shown in the drawing.

Moreover, in the course of the displaying step S23, the wearable smart device 10 may sequentially display a multitude of the received photos. Through the steps S21 and S22, a multitude of photos can be consecutively taken by the camera C. The device 10 can receive and save the photos to the memory 17. Hence, in order for a user to check a multitude of the photos, the device 10 can display the received and saved photos on the display unit. In particular, referring to FIG. 39 (b), if a user swipes at least one of the exposed display units 340 and 440 in a specific direction, a multitude of photos can be scrolled in the specific direction. For example, if a user swipes one of the third and fourth display units 340 and 440 in a first direction D1 or a second direction D2, photos failing to be displayed can be sequentially displayed by moving in the swipe direction. Hence, the user can conveniently check a multitude of the taken photos.

The user can delete the photos taken and displayed through the steps S21 to S23 if necessary. In such a deleting step, in order to delete a displayed photo, the user can extend the outer rings amounting to the number of extended outer rings different from the number of the outer rings extended in the photo-taking step, and more particularly, in the extending step S21 [S24]. By having the different number of the extended outer rings, the extending step S24 can be distinguished from the extending step S21 for taking a photo. The extending step S24 can be implemented in various ways. In a simplest way, at least one outer ring can be further extended in addition to the outer ring extended in the extending step S21. In particular, as shown in FIG. 40 (a), in order to take a photo in the extending step S21 and display it in the displaying step S23, the third outer ring 400 can be extended. Hence, in continuation with the displaying step, as shown in FIG. 40 (b), the second outer ring 300 can be additionally extended to delete the displayed photo. In order to inform a user that the deletion is in progress, a deletion notification such as 'Delete' can be displayed on at least one exposed display unit, i.e., the fourth display unit 400 for example.

Thereafter, the user can retract at least one extended outer ring again [S25]. An instruction, which is distinguished from the extending step S21 for taking a photo, is already provided to the device 10 in the extending step S24. And, the retracting step S25 may become a step of finally confirming a deletion of a displayed photo. Hence, it is not necessary for the retracting step S25 to be specially discriminated from other previous steps, and any motion and a signal generated from such a motion may be enough for the confirmation of the deletion. For such a reason, the retracting step S25 requires a retraction of a single outer ring to the minimum and more outer rings can be retracted additionally. In particular, as shown in FIG. 40 (c), the second outer ring 300 can be retracted for the confirmation of the deletion, whereby the first outer ring 200 may be covered. Meanwhile, since the user can easily manipulate the third outer ring 400 located on the edge of the device 10, the third outer ring 400 can be retracted by covering the second outer ring 300, whereby the third outer ring 400 and the first outer ring 200 can be exposed. Thereafter, according to the retraction of the extended rings, as shown in FIG. 40 (c), the displayed photo is deleted and disappears from the exposed display units 440 and 340.

After the deleting step, the user may need to restore the deleted photo due to various reasons. For example, if the user deletes a photo by mistakes, the deleted photo should be restored appropriately. Hence, the device 10 can cancel the photo deletion to restore the deleted photo.

In order to restore the deleted photo in the deletion cancelling step, the user can extend the outer rings to have the number of the extended outer rings different from the number of the outer rings extended in the photo taking step (i.e., the extending step S210) or the deleting step (i.e., the additionally extending step S24) [S26]. By having the different numbers of the extended outer rings, the extending step S265 for the deletion cancellation and the extending step S21/S24 for taking/deleting a photo can be distinguished from each other. The extending step S26 can be implemented in various ways. In a simplest way, at least one outer ring may be further extended in addition to the outer ring extended in the additionally extending step S24. In particular, as shown in FIG. 41 (a), since the photo was deleted in the deleting steps S24 and S25, another photo may be displayed on the exposed display units 340 and 240. Moreover, in the additionally extending step S24, the second outer ring 300 is also extended in a manner of exposing the first outer ring 200. FIG. 41 (a) shows the device 10 intentionally extended up to the second outer ring 300 to depict the outer rings previously extended in the additionally extending step S24. Hence, as shown in FIG. 41 (b), the first outer ring 200 can be additionally extended for restoration of the deleted photo by exposing the main ring 100. Moreover, in order inform a user that the deletion cancellation is in progress, a cancellation notification such as 'deletion cancellation' may be displayed on the at least one exposed display unit, e.g., the third and fourth display units 340 and 440.

Thereafter, the user can retract at least one extended outer ring again [S27]. An instruction, which is distinguished from the extending steps S21 and S24, is already provided to the device 10 in the extending step S26. And, the retracting step S27 may become a step of finally confirming a cancellation of a deleted photo. Hence, it is not necessary for the retracting step S27 to be specially discriminated from other previous steps, and any motion and a signal generated from such a motion may be enough for the confirmation of the deletion. For such a reason, the retracting step S27 requires a retraction of a single outer ring to the minimum and more outer rings can be retracted additionally. In particular, as shown in FIG. 41 (c), the first and second outer rings 200 and 300 can be retracted for cancellation, whereby the main ring 100 and the first outer ring 200 may be cove red. Thereafter, according to the retraction of the extended ring, as shown in FIG. 41 (c), the deleted photo is restored and displayed on the exposed display units 440 and 340 again.

Figure 42:
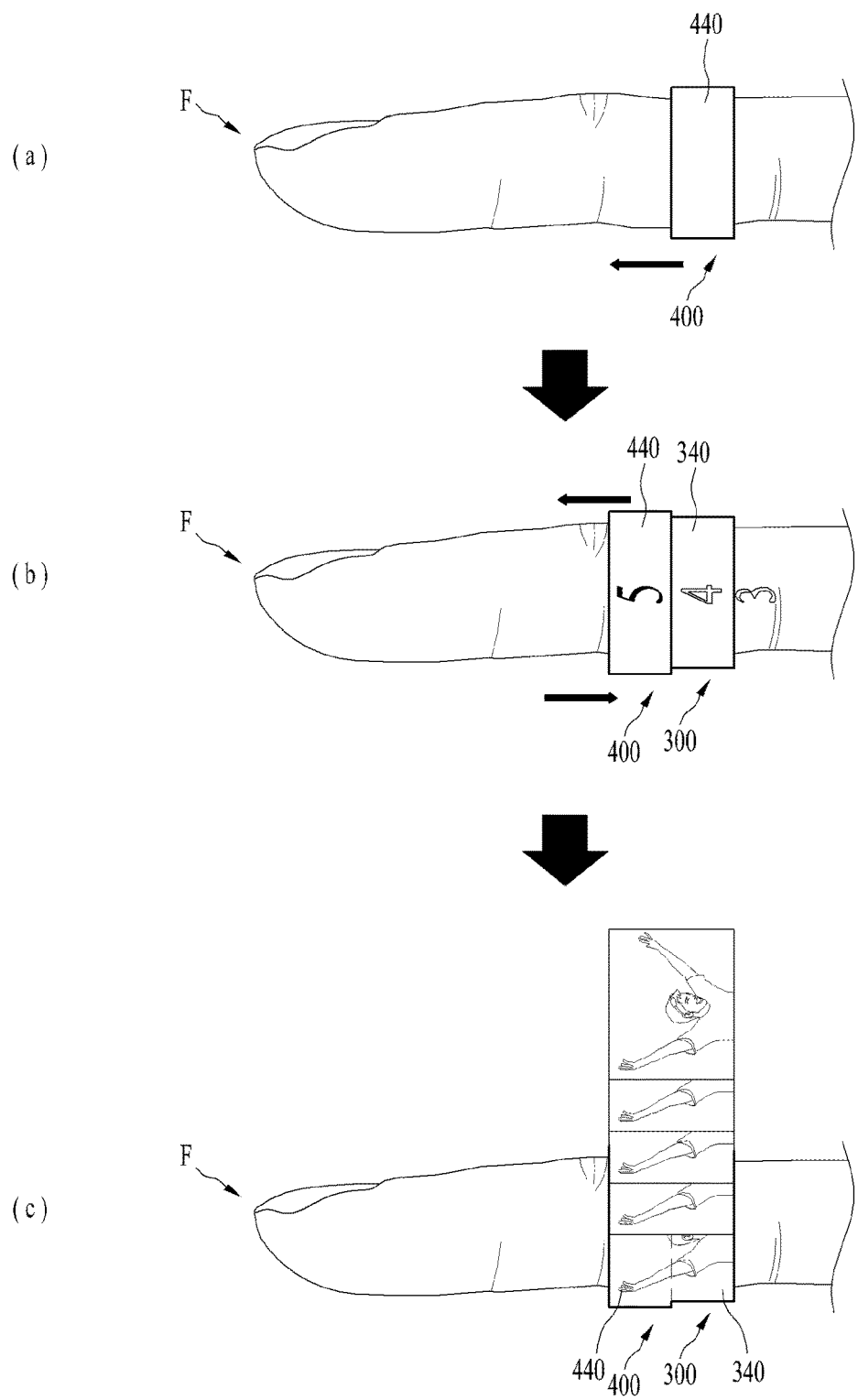
FIG. 42 is a schematic diagram showing details of steps of taking a multitude of photos in a camera using a wearable smart device.
Figure 43:
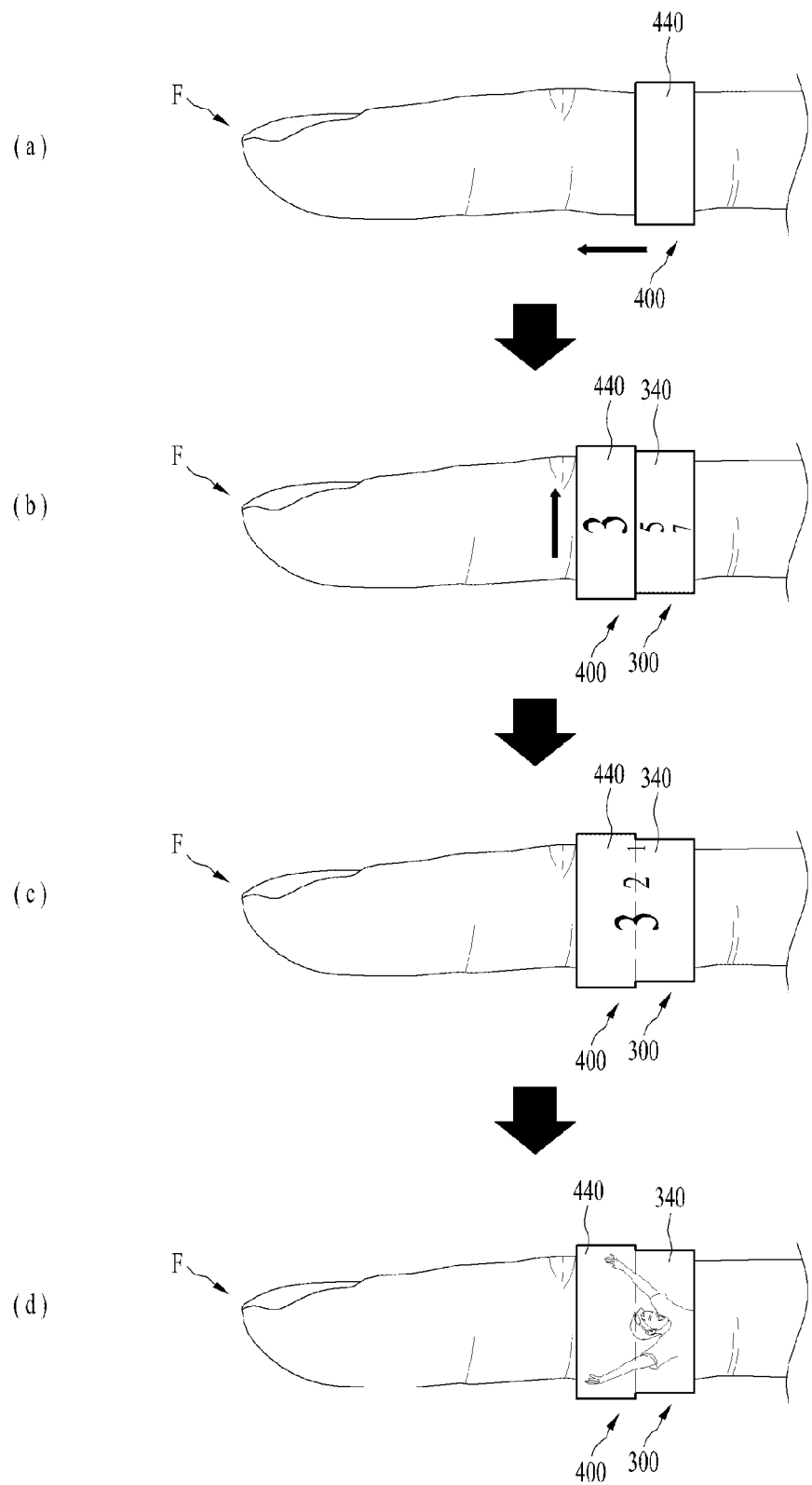
FIG. 43 is a schematic diagram showing details of steps of using a wearable smart device as a camera timer.
Figure 44:
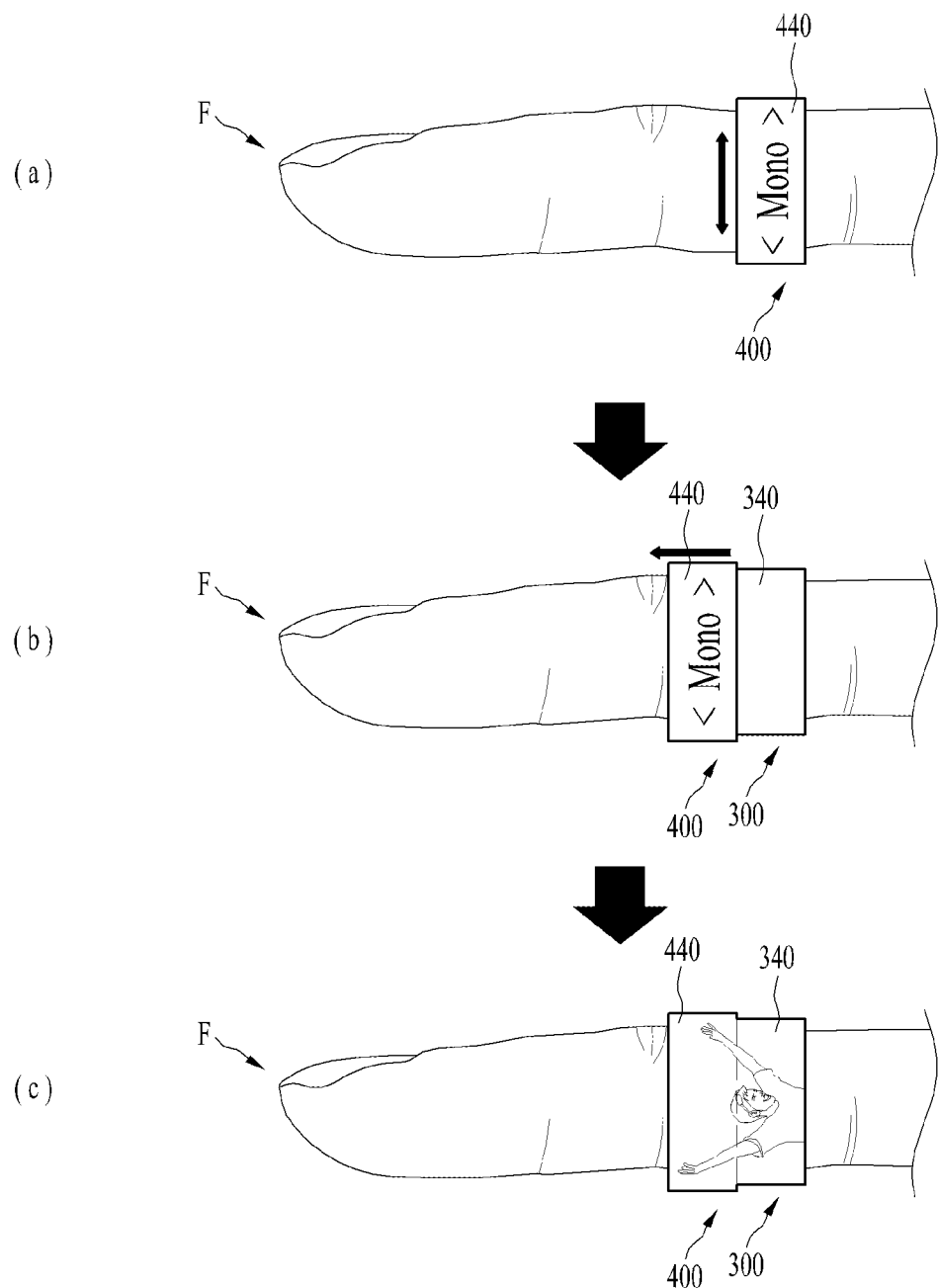
FIG. 44 is a schematic diagram showing details of steps of giving an effect to a taken photo using a wearable smart device.
Figure 45:
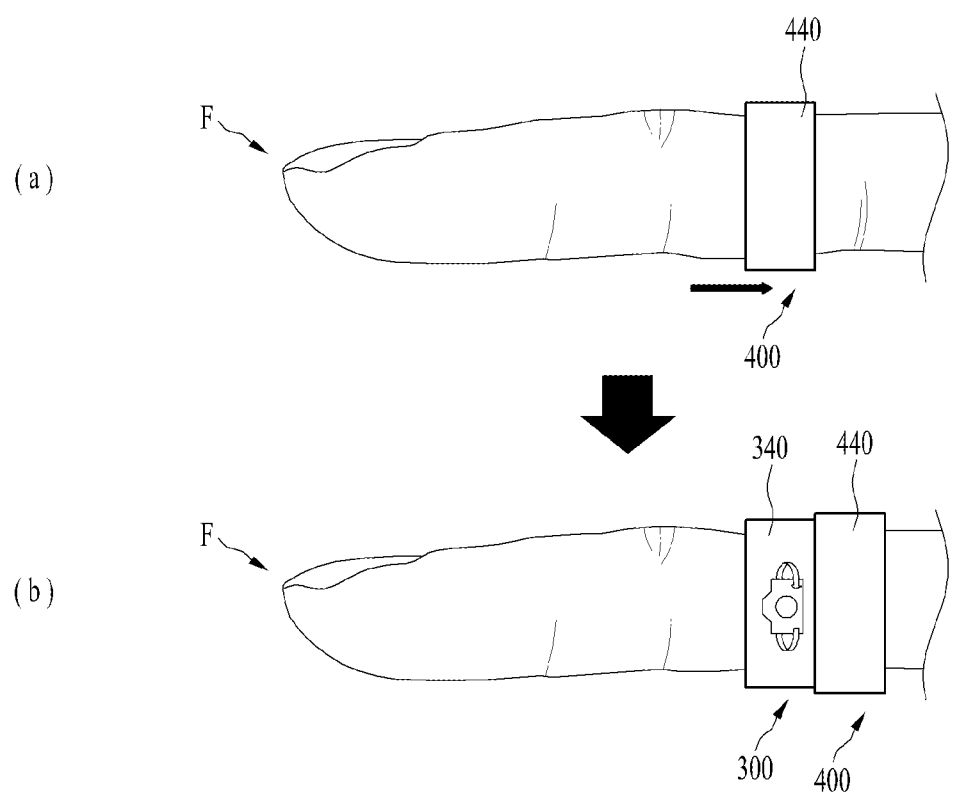
FIG. 45 is a schematic diagram showing details of steps of switching a camera using a wearable smart device.

Meanwhile, a method of controlling the wearable smart device 10 can provide a user with various additional functions in association with a photo. FIG. 42 is a schematic diagram showing details of steps of taking a multitude of photos in a camera using a wearable smart device. FIG. 43 is a schematic diagram showing details of steps of using a wearable smart device as a camera timer. FIG. 44 is a schematic diagram showing details of steps of giving an effect to a taken photo using a wearable smart device. FIG. 45 is a schematic diagram showing details of steps of switching a camera using a wearable smart device. Methods of providing an additional function related to a photo are described with reference to the above drawings as follows.

First of all, referring to FIG. 42, a user can take several photos at a time by consecutively extending and retracting a specific outer ring multiple times. For example, as shown in FIG. 42 (a) and FIG. 42 (b), the third outer ring 400 easily manipulable can be repeatedly extended and retracted multiple times. Such a repetition of extension and retraction can be performed consecutively. Moreover, the count of the extension and retraction may be displayed on the exposed display unit, e.g., the fourth display unit 440 so as to be checked by a user. Thereafter, if the user stops the extension and retraction, a finally repeated count is displayed on the fourth display unit 440. And, the device instructs the remote camera C to take photos consecutively as many as the repetition count. In response to the given instruction, the camera C takes photos amounting to the repetition count and the device receives the photos taken by the camera C. Finally, as shown in FIG. 42 (*c*), a multitude of the taken photos can be displayed contiguously on the exposed display units 340 and 440.

Referring to FIG. 43, a user can delay a photographing by a prescribed time in a manner of extending at least one outer ring to take a photo and then rotating the extended ring immediately. In particular, referring to FIG. 43 (*a*), as described in the extending step S21 (cf. FIG. 38), the user can extend the third outer ring 440 to take a photo. Right after extending the third outer ring 440, the user, as shown in FIG. 43 (*b*), can rotate the extended third outer ring in a prescribed direction. As described in the extending step S21, a photo is supposed to be taken by the camera C as soon as the outer ring 400 is extended. Yet, due to such a rotation, the photographing may be delayed. Furthermore, according to a rotation count of the extended outer ring 440, a delayed time may be adjusted. For example, a delay time may be set to 3 seconds per 1 rotation, 7 seconds per 3 rotations, or 10 seconds per 3 rotations. Such a delay time, as shown in FIG. 43 (*b*) may be displayed on the exposed display units 340 and 440. Moreover, if the rotation stops, as shown in FIG. 43 (*c*), the photographing is delayed by the set time. Namely, if the rotation stops, a photo can be taken after the set time. Expiration of the set time can be displayed as a decreasing number on the display units 340 and 440. If the set time expires, as shown I FIG. 43 (*d*), a photo is taken and then displayed on the device 10. Since such steps are described in the above steps S22 and S23 in detail, they will be omitted from the following description.

Referring to FIG. 44, a user can give a specific effect to a photo in a manner of rotating a specific outer ring. In order to give a specific effect to a photo, as shown in FIG. 44 (*a*), the user can rotate at least one outer ring, e.g., the third outer ring 400 easily manipulable. According to a rotation direction of the third outer ring 400, various effects can be sequentially displayed on the exposed display unit, e.g., the fourth display unit 440. If the rotation of the third outer ring 400 stops, an effect of a photo to be taken can be set to the effect displayed on the fourth display unit 440. For example, the effect of the photo can be set to 'mono', i.e., black & white photo. Thereafter, as shown in FIG. 44 (*b*), in the same manner as the extending step S21 (cf. FIG. 38), the user can extend the third outer ring 440 to take a photo. Although FIG. 44 shows that the rotating step for the effect setting is performed before the extending step S21, like the delay time setting described with reference to FIG. 43, the rotating step for the effect setting may be performed after the extending step S21. If the third outer ring 400 is extended, as shown in FIG. 43 (*c*), a photo can be taken to have the set effect and then displayed on the device 10. Such steps are described in detail in the former description of the steps S22 and S23 and shall be omitted from the following.

Finally, referring to FIG. 45, by extending a specific outer ring, a user can switch a camera. Recently, a mobile terminal tends to have both a front camera and a rear camera installed at a front part and a rear part of a body, respectively. The front camera is used to take a photo of a user, but the rear camera is mainly used to take a photo of a thing other than a user. By manipulating an outer ring, a camera used by the device 10 can be switched from a front camera to a rear camera, and vice versa. Moreover, since a camera switching instruction is special in comparison with other instructions, it is necessary to be distinguished from the aforementioned extending steps. Hence, the outer ring can be extended in a direction different from the extension direction of the aforementioned extending step. In particular, as shown in FIG. 45 (*a*), the third outer ring 400 can be extended not in a direction toward a user's fingertip T (cf. FIG. 16) but in a direction toward a user's knuckle K (cf. FIG. 16). Such a reverse extension can be easily achieved by slightly modifying a structure of the device 10. Thereafter, as shown in FIG. 45 (*b*), if the third outer ring 400 is extended in the direction of the knuckle K by exposing the second outer ring 300, a camera currently used by the device 10 can be switched from a front to a rear, and vice versa. Namely, the device 10 can use another camera C provided to a mobile terminal C for a photographing instead of a currently used camera. Moreover, in order for a user to easily grasp the camera switching, as shown in FIG. 45 (*b*), an icon or text indicating the switching can be displayed on the exposed display units 340 and 440.

As the wearable smart device 10 has various components and functions, it should be appropriately set to have optimal performance. Moreover, in order to meet user's taste, settings for components, i.e., the device 10 and functions thereof are required. Hence, steps of changing settings in the device 10 are described in detail with reference to the related drawings as follows.

Figure 46:
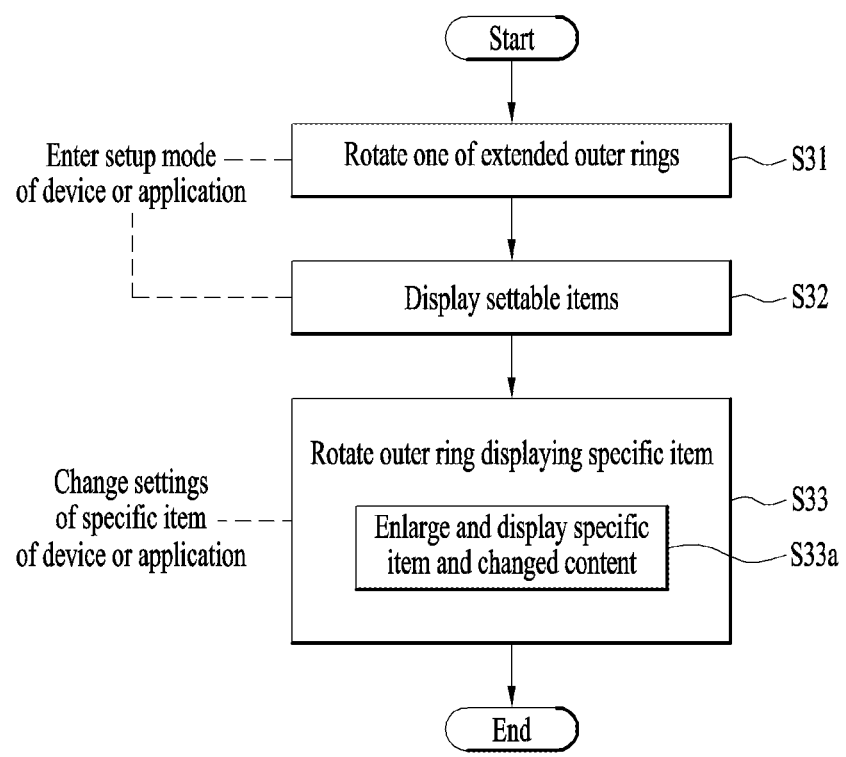
FIG. 46 is a flowchart showing steps of changing settings in a wearable smart device.
Figure 47:
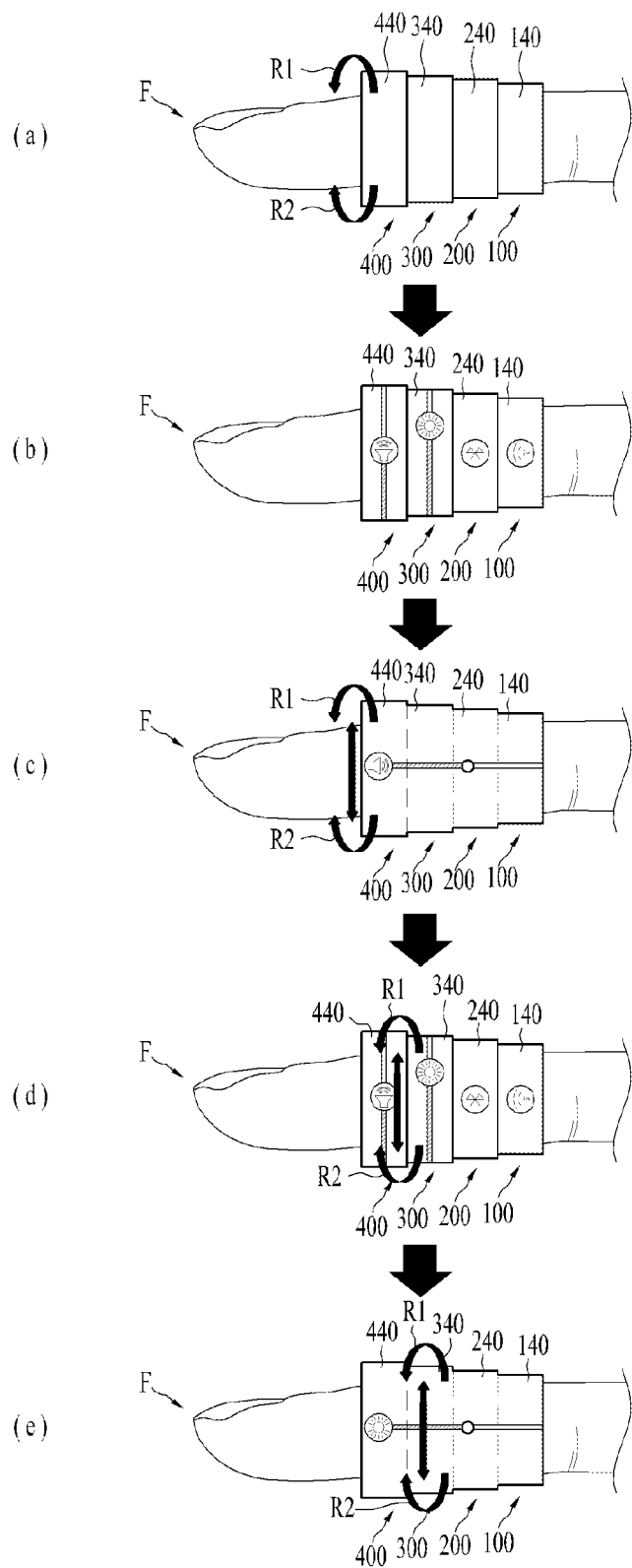
FIG. 47 is a schematic diagram showing details of steps of changing settings of a device in a wearable smart device.
Figure 48:
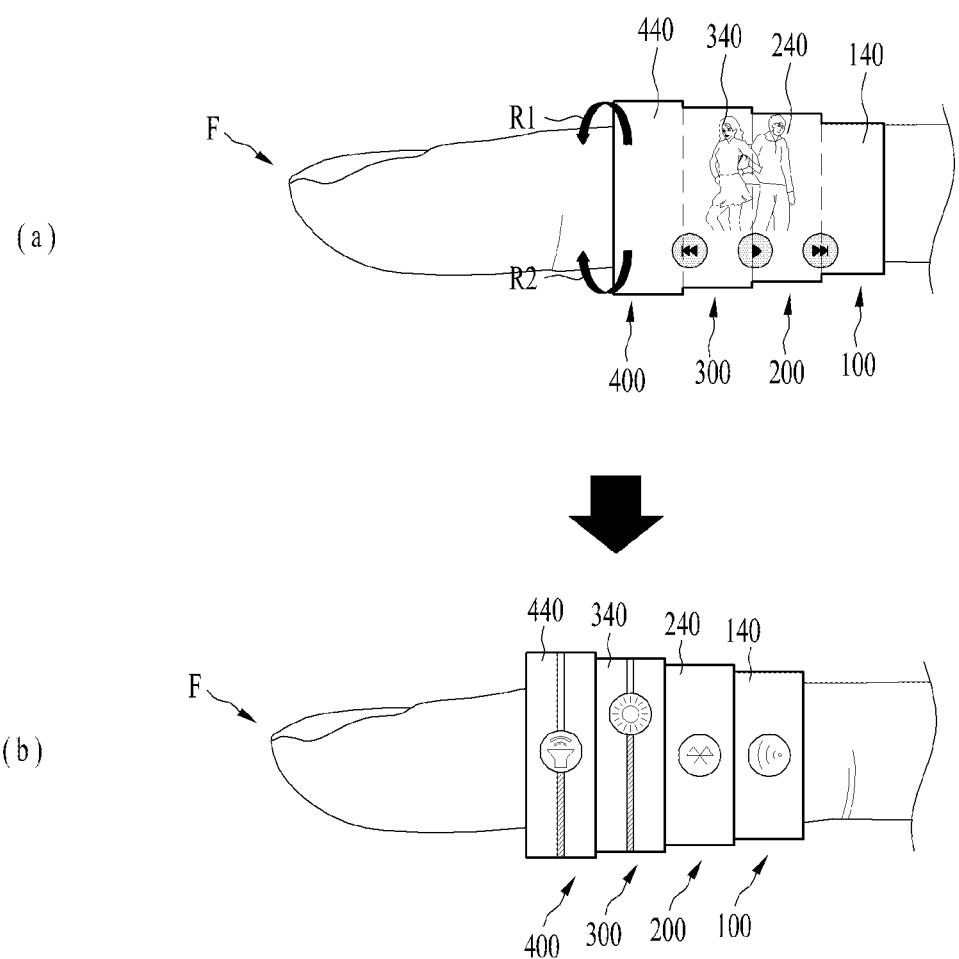
FIG. 48 is a schematic diagram showing details of steps of changing settings of an application in a wearable smart device.

FIG. 46 is a flowchart showing steps of changing settings in a wearable smart device. FIG. 47 is a schematic diagram showing details of steps of changing settings of a device in a wearable smart device. FIG. 48 is a schematic diagram showing details of steps of changing settings of an application in a wearable smart device. As all the steps performed in association with the change of settings in the wearable smart device 10 sequentially appear in FIG. 46, FIG. 46 is basically referred to by all description.

Referring to FIG. 46, as the instructing and performing steps S2 and S3 shown in FIG. 20, a user can enable the wearable smart device 10 to enter a setup mode for changing settings. For example, the setup mode may include a mode for changing the settings of the device 10 and a mode for changing settings of an application run in the device 10. Besides, settings of various objects may have control modes to be changed for best performance, respectively. And, the device 10 can enter each control mode and change settings, by steps according to the following description.

In the mode entry, a user can rotate one of extended outer rings [S31]. As described later, in order to display various set items, the outer rings 200 to 400 need to be extended to form a screen in appropriate size. Hence, prior to the rotating step S31, at least one of the outer rings 200 to 400 can be extended. By the rotation of the extended outer ring, the device 10 can enter a mode for changing into settings of the device itself or a mode for changing settings of an executed application. In particular, as shown in FIG. 47 (*a*), in order to form a screen as wide as possible, all the outer rings 200 to 400 can be extended. Moreover, one of the extended outer rings 200 to 400, e.g., the easily manipulable third outer ring 400 can be rotated in a prescribed direction. As aforementioned, the rotation can be performed in a counterclockwise direction and a clockwise direction both when the device 10 is viewed in a front direction, i.e., a direction of a fingertip T (cf. FIG. 16). Hence, the third outer ring 400 can be rotated in a first direction R1 (counterclockwise) or a second direction R2 (clockwise) opposite to the first direction R1. In FIG. 47 (a), the device 10 can enter a mode for changing settings of the device itself in response to any one of the first direction and the second direction. Thereafter, as a port of the mode entering step, the device 10 can display settable items [S32]. As shown in FIG. 47 (b), the settable items are assigned to the extended outer rings 200 to 400 and the main ring 100 and may be displayed on the display units 140 to 440 of the rings, respectively. Meanwhile, as shown in FIG. 48 (a), in a state that all the outer rings 200 to 400 are extended, an application can be run. While the application is run, one of the extended outer rings 200 to 400, e.g., the easily manipulable third outer ring 400 can be rotated in the first direction R1 or the second direction R2. In FIG. 48 (a), in response to the rotation in any one of the first direction R1 and the second direction R2, the device 10 can enter a mode for changing the settings of the currently run application. Thereafter, as a part of the mode entry, as shown in FIG. 48 (b), the device 10 can display the settable items on the display units 140 to 440, respectively.

The user enters the setup ode through the aforementioned steps S31 and S32 and is then able to change settings of a specific item. For the change of the settings, the user can rotate an outer ring that displays the specific item [S33]. For example, in order to change the settings of the item included in the third outer ring 400 shown in FIG. 47 (b), as shown in FIG. 47 (c), the third outer ring 400 can be rotated in one of the first direction R1 and the second direction R2. In particular, by the rotation in the first direction R1, a setting value may be increased. By the rotation in the second direction R2, a setting value may be decreased. Moreover, during the rotating step S33, the device 10 can enlarge and display a changed content of the specific item [S33a]. As shown in FIG. 47 (c), once the third outer ring 400 is rotated, an item included in the ring 400 can be considerably enlarged to facilitate user's adjustment. And, the enlarged item may be displayed across all the exposed display units 140 to 440 instead of other items. Furthermore, if the settings in FIG. 47 (c) are completed, the user rotates another outer ring, e.g., the second outer ring 300 shown in FIG. 48 (d) so as to adjust an item included therein as shown in FIG. 48 (e). Hence, the aforementioned rotating and displaying steps S33 and S33a are identically applicable to all other items. Moreover, the rotating and displaying steps S33 and S33a described with reference to FIGS. 47 (c) to 47 (e) are identically applicable to the change of settings of an application shown in FIG. 48.

Meanwhile, owing to a telescopic structure, the wearable smart device 10 can make a turning motion. The turning motion can be made by a motion of a finger, on which the device 10 is worn, only, whereas other motions require a use of a hand on which the device 10 is not worn. Hence, using the turning motion, a function of the device 10 can be controlled more efficiently and conveniently. In the following description, steps of controlling functions of the device 10 using the turning motions are described. The described steps are exemplary and a directly applicable to other functions without special modifications.

Figure 49:
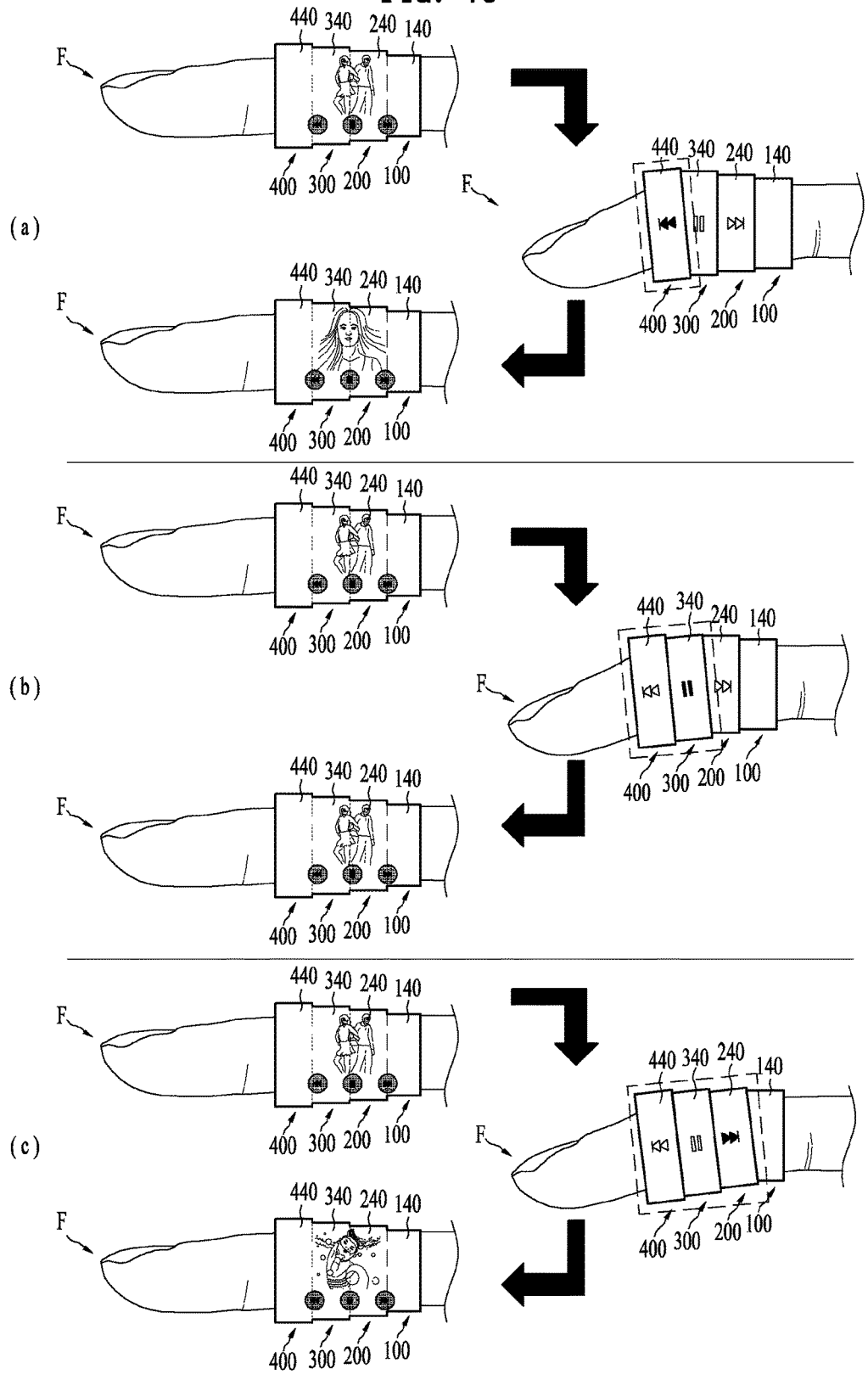
FIG. 49 is a schematic diagram showing details of steps of controlling an application using a turning motion of an outer ring in a wearable smart device.

FIG. 49 is a schematic diagram showing details of steps of controlling an application using a turning motion of an outer ring in a wearable smart device. FIG. 50 is a schematic diagram showing details of steps of controlling a phone using a turning motion of an outer ring in a wearable smart device.

According to the controlling methods of FIG. 49 and FIG. 50, by turning at least one of the outer rings 200 to 400 basically, a currently launched function can be controlled. In order to launch a function, e.g., an application or phone described later, the outer rings 200 to 400 need to be extended to form a screen in appropriate size. Hence, prior to the controlling sub-steps in the following, at least one of the outer rings 200 to 400 can be extended. First of all, referring to FIG. 49, a user can control an operation of an application by turning at least one of the extended outer rings 200 to 400. As shown in FIG. 49 (a), the first to third outer rings 200 to 400 are extended all, and a running screen of an application, i.e., a video viewer can be displayed on the display units 140 to 440 connected to each other. If the user turns at least one ring, e.g., the third outer ring 400 by flexing a finger F, the device is instructed to show a previous video, whereby the previous video can be displayed on the display units 140 to 440. Moreover, as shown in FIG. 49 (b), if the user further flexes the finger F, 2 outer rings, e.g., the third and second outer rings 400 and 300 can be turned, whereby the device 10 may be instructed to pause a display of the video. According to such an instruction, the display of the video can be paused. Finally, as shown in FIG. 49 (c), if the user further flexes the finger F, 3 outer rings, e.g., the first to third outer rings 200 to 400 can be turned, whereby the device 10 may be instructed to show a next video. According to such an instruction, the next video can be displayed. In FIGS. 49 (a) to 49 (c), if the outer rings 200 to 400 are turned, executable instructions can be directly displayed on the display units 140 to 440 and preferably have icon types to facilitate user's recognition. If a specific instruction given by a turning motion is executed, items of the displayed instructions may disappear from the display units 140 to 440 to display a result of the instruction execution.

Moreover, referring to FIG. 50, a user can control an incoming call in the course of running an application by turning at least one of the extended outer rings 200 to 400. As shown in FIG. 50 (a), all the first to third outer rings 200 to 400 are extended, and a running screen of an application, i.e., a video viewer can be displayed on the display units 140 to 440 connected to each other. In the course of running such an application, there may be an incoming call to the user, i.e., the device 10. If the user turns at least one ring, e.g., the third outer ring 400 by flexing a finger F, the device 10 is instructed to answer the call, whereby the call with a counterpart can start. For example, as described in the calling step S13 (cf. FIG. 33), an interface for the call can be provided to the user through the display units 140 to 440. Since the sub-steps related to the call are already described in the calling step S13, they identically apply to the controlling steps of FIG. 50 and detailed description shall be omitted. Moreover, as shown in FIG. 50 (b), if the user further flexes the finger F, 2 outer rings, e.g., the third and second outer rings 400 and 400 can be turned, whereby the device 10 may be instructed to decline or reject the call reception. Moreover, a list of messages for notifying the rejection of the call reception to the counterpart may be displayed on the display units 140 to 440. The user touches one of the messages, thereby sending the selected message to a caller together with the rejection of the call reception. Finally, as shown in FIG. 50 (c), if the user further flexes the finger F, 3 outer rings, e.g., the first to third outer rings 200 to 400 can be turned, whereby the device 10 may be instructed to disconnect the call. According to the instruction, the device 10 can disconnect the call by ending the call. After the call has been disconnected, the application previously run before the incoming call may be run again and its running screen may be displayed on the display units 140 to 440 again. In FIGS. 50 (a) to 50 (c), if the outer rings 200 to 400 are turned, executable instructions, e.g., 'call', 'call rejection', 'disconnect' and the like can be directly displayed on the display units 140 to 440. If a specific instruction given by a turning motion is executed, items of the displayed instructions may disappear from the display units 140 to 440 to display a result of the instruction execution.

The controlling methods of FIG. 49 and FIG. 50 can control various functions with minimum motions of a finger using turning motions. Hence, a user can use the device 10 by such a controlling method more easily and conveniently.

As described with reference to FIGS. 20 to 50, the controlling method of the present application efficiently uses various motions enables by the structural features of the wearable smart device 10, thereby controlling each function optimally. Therefore, the controlling method effectively achieves facilitation and convenience of use as well as functions as a smart device.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A wearable smart device, comprising:
a first ring worn on a body of a user;
a first display unit disposed on an outer circumference of the first ring; and
a second ring enclosing the outer circumference of the first ring and movably coupled with the first ring, the second ring configured to selectively move to a first position covering the first display unit or a second position exposing the first display unit,
wherein the first ring includes:
a first flange provided at a first end of the first ring and limiting a movement of the second ring beyond the first position; and
a second flange provided at a second end opposite to the first end and limiting a movement of the second ring beyond the second position,
wherein the second ring includes a first flange provided at a first end thereof, and
wherein the first flange of the second ring engages with the first flange of the first ring when the second ring moves to the first position and engages with the second flange of the first ring when the second ring moves to the second position.

2. The wearable smart device of claim 1, wherein the second ring is movable on the first ring along a center axis direction.

3. The wearable smart device of claim 1, wherein the second ring is movable on the first ring in a circumferential direction.

4. The wearable smart device of claim 1, wherein the first ring includes:
an inner frame;
an outer frame spaced apart from the inner frame; and
electric components disposed within a space between the inner and outer frames.

5. The wearable smart device of claim 1, wherein the second ring is configured to return to the first position from the second position automatically.

6. The wearable smart device of claim 1, further comprising an elastic member installed between the first ring and the second ring, the elastic member configured to be compressed when the second ring moves to the second position.

7. The wearable smart device of claim 1, wherein the second ring is configured to continue to maintain the second position.

8. The wearable smart device of claim 1, wherein one of the first ring and the second ring comprises a rib configured to be coughed on the other when the second ring moves to the second position.

9. The wearable smart device of claim 1, wherein the second ring comprises a shock absorbing member formed of an elastic material to come into contact with the first ring when returning to the second position.

10. The wearable smart device of claim 1, further comprising an indicator configured to display various operational states, the indicator installed at the first ring.

11. The wearable smart device of claim 10, wherein the indicator is projected in a prescribed length from the first ring and wherein the second ring comprises a seat portion configured to accommodate the projected indicator.

12. The wearable smart device of claim 1, further comprising a terminal installed at the first ring, the terminal configured to charge a battery or exchange data with an external device.

13. The wearable smart device of claim 1, further comprising a second display unit installed on an outer circumference of the second ring, the second display unit configured to selectively provide a screen connected to a screen of the first display unit.

14. The wearable smart device of claim 13, wherein the second display unit further comprises an extension part disposed adjacent to the first display unit to disperse the screen of the second display unit to be connected to the screen of the first display unit.

15. The wearable smart device of claim 14, wherein the extension part comprises a prism.

16. The wearable smart device of claim 1, further comprising a multitude of additional rings provided to the second ring to be telescopically coupled with the second ring.

17. The wearable smart device of claim 16, wherein the second ring and additional rings are configured to be turned together with a flexed finger of the user.

18. The wearable smart device of claim 17, wherein at least one of the second ring and additional rings comprises a switch configured to be pressed by a ring adjacent to the user's finger when the user's finger is flexed.

* * * * *